United States Patent
Honda et al.

(10) Patent No.: US 8,592,049 B2
(45) Date of Patent: Nov. 26, 2013

(54) HIGH STRENGTH HOT DIP GALVANIZED STEEL SHEET AND HIGH STRENGTH GALVANNEALED STEEL SHEET EXCELLENT IN SHAPEABILITY AND PLATEABILITY

(75) Inventors: Kazuhiko Honda, Chiba (JP); Tetsuo Nishiyama, Chiba (JP); Yoshihiro Suemune, Chiba (JP); Takeo Itoh, Chiba (JP); Koki Tanaka, Chiba (JP); Yoichi Ikematsu, Chiba (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 504 days.

(21) Appl. No.: 12/162,739

(22) PCT Filed: Jul. 31, 2006

(86) PCT No.: PCT/JP2006/015552
§ 371 (c)(1),
(2), (4) Date: Jul. 30, 2008

(87) PCT Pub. No.: WO2007/086158
PCT Pub. Date: Aug. 2, 2007

(65) Prior Publication Data
US 2010/0304183 A1    Dec. 2, 2010

(30) Foreign Application Priority Data

Jan. 30, 2006 (JP) .................................. 2006-021426
Jun. 30, 2006 (JP) .................................. 2006-181747
Jul. 11, 2006 (JP) .................................. 2006-190555

(51) Int. Cl.
*B32B 15/04* (2006.01)
*B32B 15/18* (2006.01)
*B32B 15/20* (2006.01)

(52) U.S. Cl.
USPC ............ 428/659; 428/684; 428/639; 428/641

(58) Field of Classification Search
USPC ......... 428/659, 658, 681, 684, 685, 639, 640, 428/641
See application file for complete search history.

(56) References Cited

U.S. PATENT DOCUMENTS

2006/0269776 A1* 11/2006 Tanaka et al. ................. 428/659
2006/0292391 A1* 12/2006 Ikematsu et al. ............. 428/659

FOREIGN PATENT DOCUMENTS

| EP | 1 149 928 | 10/2001 |
| EP | 1 612 288 | 1/2006 |

(Continued)

OTHER PUBLICATIONS

Machine Translation, Honda et al., JP 2005-060743, Mar. 2005.*

(Continued)

*Primary Examiner* — Michael La Villa
(74) *Attorney, Agent, or Firm* — Dorsey & Whitney LLP

(57) ABSTRACT

Hot dip galvanized steel sheet excellent in shapeability and plateability comprised of high strength steel sheet according to the present invention can be provided containing, by mass % about, C: 0.05 to 0.25%, Si: 0.3 to 2.5%, Mn: 1.5 to 2.8%, P: 0.03% or less, S: 0.02% or less, Al: 0.005 to 0.5%, N: 0.0060% or less and the balance of Fe and unavoidable impurities. The exemplary steel sheet can have thereon a galvanized layer containing, e.g., about Al: 0.05 to 10 mass % and Fe: 0.05 to 3 mass % and the balance of Zn and unavoidable impurities. Such exemplary hot dip galvanized steel sheet can have oxides containing Si in an average content of about 0.6 to 10 mass % at the crystal grain boundaries and in the crystal grains at the sheet steel side 5 μm or less from the interface between the high strength steel sheet and the plating layer and by the presence of Fe—Zn alloy with an average grain size of about 0.5 to 3 μm at the plating side.

10 Claims, 6 Drawing Sheets

(56) References Cited

FOREIGN PATENT DOCUMENTS

| | | | |
|---|---|---|---|
| JP | 60 039153 | | 2/1985 |
| JP | 09-041111 | * | 2/1997 |
| JP | 09-310163 | * | 12/1997 |
| JP | 10 204580 | | 8/1998 |
| JP | 2001-279412 | * | 10/2001 |
| JP | 2001295018 A | | 10/2001 |
| JP | 2004-124187 | | 4/2004 |
| JP | 2004323970 A | | 11/2004 |
| JP | 2005060742 A | | 3/2005 |
| JP | 2005060743 A | | 3/2005 |
| JP | 2005-213643 | * | 8/2005 |
| JP | 2006-233333 A | | 9/2006 |
| JP | 2006233333 | | 9/2006 |
| JP | 2008007842 | | 1/2008 |
| JP | 2008019465 | | 1/2008 |
| KR | 1020050118306 | | 12/2005 |
| WO | 2004/087983 | | 10/2004 |
| WO | WO 2004/090187 | * | 10/2004 |
| WO | WO 2005/017214 | | 2/2005 |

OTHER PUBLICATIONS

Machine Translation, Ikematsu et al., JP 2005-213643, Aug. 2005.*
Machine Translation, Honda et al., JP 2005-060742, Mar. 2005.*
Machine Translation, Honda et al., JP 2001-295018, Oct. 2001.*
Machine Translation, Honda et al., JP 2001-279412, Oct. 2001.*
Machine Translation, Suzuki et al., JP 09-310163, Dec. 1997.*
Machine Translation, Miyaoka et al., JP 09-041111, Feb. 1997.*
Russian Official Action dated Feb. 19, 2010 for Application No. 2008135330/02 and English-language translation thereof.
English language International Search Report for International Application No. PCT/JP2006/315552filed Jul. 31, 2006, (Nov. 2006).
European Search Report dated Oct. 13, 2011 for European Application No. 06782398.9.

* cited by examiner

HIGH STRENGTH HOT DIP GALVANIZED STEEL SHEET AND HIGH STRENGTH GALVANNEALED STEEL SHEET EXCELLENT IN SHAPEABILITY AND PLATEABILITY

CROSS REFERENCE TO RELATED APPLICATION(S)

The present application is a national phase application of International Application PCT/JP2006/315552 filed on Jul. 31, 2006 and published as International Publication WO 2007/086158 on Aug. 2, 2007. This application claims priority from the International Application pursuant to 35 U.S.C. §365. The present application also claims priority from Japanese Patent Application Nos. 2006-021426, 2006-181747 and 2006-190555, filed on Jan. 30, 2006, Jun. 30, 2006 and Jul. 11, 2006, respectively, under 35 U.S.C. §119. The disclosures of these applications are incorporated herein in their entireties.

FIELD OF THE INVENTION

The present invention relates to high strength hot dip galvanized steel sheet and high strength galvannealed steel sheet and methods for production of the same, and more particularly to an exemplary plated steel sheet having non-plating-free good appearance and excellent plating adhesion and shapeability and corrosion resistance and able to be used for various applications such as steel sheet for building materials or automobiles.

BACKGROUND INFORMATION

The steel sheet generally used as good corrosion resistance plated steel sheet is hot dip galvanized steel sheet. This hot dip galvanized steel sheet can usually be produced by degreasing steel sheet, then preheating it in a non-oxidizing furnace, reduction annealing it in a reduction furnace to clean the surface and secure quality, dipping it in a hot dip zinc bath, and controlling the amount of deposition. This can provide excellent shapeability, corrosion resistance, plating adhesion, etc., so is widely being used for automobiles, building material applications, etc.

In particular, recently, in the automobile sector, to both secure the function of protecting the passengers at the time of impact and reducing the weight for improving the fuel economy, plated steel sheet is being required to be made of a higher strength.

To increase the strength of steel sheet without detracting from the workability, it can be effective to add elements such as Si, Mn, and P. Among these, Si is particularly easily oxidized even compared with Fe, so it is known that if plating steel sheet containing Si under ordinary hot dip galvanization conditions, during the annealing process, the Si in the steel may concentrate at the surface and cause non-plating defects and a drop in plating adhesion. Further, the addition of these elements can delay the alloying, and thus the higher temperature, the longer the time of alloying required compared with mild steel. This higher temperature, longer time alloying generally causes the austenite remaining in the steel sheet to transform to pearlite, and can lower the workability. Thus, as a result, the effects of the added elements are cancelled out.

As technology for suppressing non-plating defects in steel sheet containing Si, Japanese Patent Publication (A) No. 55-122865 describes the method of oxidizing steel so that the surface is formed with an oxide film of a thickness of 400 to 10000 Å, then annealing and plating it in an atmosphere containing hydrogen. However, in this document, the adjustment of the reduction time of the iron oxide film is difficult in practice. If the reduction time is too long, surface concentration of Si is likely caused, while if too short, iron oxide film generally remains on the steel surface. Thus, there may be a problem that this does not completely eliminate plating defects and the problem that if the iron oxide film on the surface becomes too thick, the peeled off oxides may likely stick to the rolls and cause flaws in the appearance.

To deal with these problems, Japanese Patent Publication (A) No. 2001-323355 and Japanese Patent Publication (A) No. 2003-105516 has been provided which describe a method of production preventing surface concentration of Si by oxidizing the steel sheet surface, then reducing it in a reducing furnace controlled in atmosphere. Further, Japanese Patent Publication (A) No. 2001-295018 describes the use of Si-containing high strength hot dip galvanized steel sheet excellent in corrosion resistance comprised of steel sheet having an Si content of 0.2 to 2.0 mass % formed on its surface with a hot dip Zn—Al—Mg plating layer comprised of Al: 2 to 19 mass %, Mg: 1 to 10 mass %, and the balance of Zn and unavoidable impurities and further. Further, for example, Japanese Patent Publication (A) No. 2004-323970 describes a high strength hot dip galvanized steel sheet excellent in plateability comprising steel sheet having an Si content of 0.2 to 3.0 mass % containing inside its surface oxide particles of one or more of Si oxides, Mn oxides, or Si and Mn composite oxides.

Further, Japanese Patent Publication (A) Nos. 56-33463 and 57-79160 describe methods for suppressing non-plating defects by pre-plating a steel sheet surface with Cr, Ni, Fe, etc. Further, Japanese Patent Publication (A) No. 2002-161315 describes a method for forming an internal oxide layer directly under the surface of steel sheet on a continuous annealing line, removing the simultaneously formed surface oxides by pickling, then plating the sheet on a continuous hot dip galvanization line.

OBJECTS AND SUMMARY OF EXEMPLARY EMBODIMENTS

However, the production technology disclosed above and elsewhere cannot completely prevent non-plating defects and poor adhesion. Japanese Patent Publication (A) No. 55-122865 describes an adjustment of the reduction time of the iron oxide film is difficult in practice. If the reduction time is too long, surface concentration of Si is caused, while if too short, iron oxide film remains on the steel surface, so this may not completely eliminate non-plating defects.

Japanese Patent Publication (A) Nos. 2001-323355 and 2003-105516 have been provided to describe a control to reduce atmosphere and make the $SiO_2$ an internal oxidation state so as to suppress the non-plating defects formed due to the surface concentration of Si. This exemplary method facilitates the reduction of the non-plating defects arising due to surface concentration of Si; however, non-plating defects and poor adhesion may not be completely prevented.

This can be because even if the methods described in the above publication can prevent the Si concentration at the surface due to external oxidation, the exposure of $SiO_2$ at the steel sheet surface may not be completely prevented. Therefore, to prevent non-plating defects or poor adhesion, strict control of the $SiO_2$ may be needed.

Further, Japanese Patent Publication (A) No. 2004-323970 describes a control the reduction of atmosphere to introduce at least one type of oxide particles selected from Si oxides, Mn oxides, and Si and Mn composite oxides into the steel sheet surface so as to improve the plateability. However, while this method can considerably reduce the non-plating defects caused by Si concentrating at the surface, it cannot completely prevent the exposure of $SiO_2$ at the steel sheet surface, so cannot completely prevent non-plating defects and poor adhesion.

Hot dip galvanized steel sheet may not be expected to be improved in adhesion due to alloying like with galvannealed steel sheet, so it is difficult to improve the plating adhesion of steel sheet like steel sheet containing Si where the adhesion of the plating/steel sheet interface easily falls. For this reason, even with the methods described in Japanese Patent Publication (A) Nos. 2001-323355, 2003-105516, and 2004-323970, while a plating adhesion of an extent where the plating does not peel off in a bending test is secured, a plating adhesion based on a strict evaluation such as the Dupont impact test may not be sufficiently secured.

Further, with the pre-plating method such as described in Japanese Patent Publication (A) Nos. 56-33463 and 57-79160, plating facilities may become necessary. Thus, such method may likely not be employed when there is no space for them. Further, there may also be a problem that installation of the pre-plating facilities causes the production costs to rise. Further, double annealing such as described in Japanese Patent Publication (A) No. 2002-161315 can also cause a problem of a rise in the production cost.

Further, the technology for production of steel sheet containing Si described up to now has focused on securing plateability and did not consider improvement of shapeability and various other aspects of performance at the time of use as plated steel sheet.

Therefore, exemplary embodiments of the present invention may solve the above-described problems, and describe high strength hot dip galvanized steel sheet and high strength galvannealed steel sheet good in appearance and excellent in plating adhesion, shapeability, and corrosion resistance and methods for production of the same.

Research has been performed on plating of high strength steel sheet, and it was determined that by plating steel to which Si and Mn have been added in certain amounts or more by a continuous hot dip galvanization facility optimized in heat treatment conditions and plating conditions, it is possible to control the types and positions of the Si oxides and produce high strength hot dip galvanized steel sheet and high strength galvannealed steel sheet good in appearance and excellent in plating adhesion, shapeability, and corrosion resistance and thereby completed the present invention. Thus, certain exemplary embodiments of the present invention can be described as follows:

According to one exemplary embodiments of the present invention, hot dip galvanized steel sheet excellent in shapeability and plateability can include high strength steel sheet containing, by mass %, C: 0.05 to 0.25%,
Si: 0.3 to 2.5%,
Mn: 1.5 to 2.8%,
P: 0.03% or less,
S: 0.02% or less,
Al: 0.005 to 0.5%,
N: 0.0060% or less and
the balance of Fe and unavoidable impurities, and which can have a galvanized layer containing Al: 0.05 to 10 mass % and Fe: 0.05 to 3 mass % and the balance of Zn and unavoidable impurities. The hot dip galvanized steel sheet may be characterized by the presence of oxides containing Si in an average content of 0.6 to 10 mass % at the crystal grain boundaries and in the crystal grains at the sheet steel side 5 μm or less from the interface between the high strength steel sheet and the plating layer and by the presence of Fe—Zn alloy with an average grain size of 0.5 to 3 μm at the plating side.

According to another exemplary embodiments of the present invention, hot dip galvanized steel sheet excellent in shapeability and plateability can include high strength steel sheet containing, by mass %, C: 0.05 to 0.25%,
Si: 0.3 to 2.5%,
Mn: 1.5 to 2.8%,
P: 0.03% or less,
S: 0.02% or less,
Al: 0.005 to 0.5%,
N: 0.0060% or less, and
the balance of Fe and unavoidable impurities, and having a galvanized layer containing Al: 0.05 to 10 mass % and Fe: 0.05 to 3 mass % and the balance of Zn and unavoidable impurities, said hot dip galvanized steel sheet characterized by the presence of oxides containing Si in an average content of 0.6 to 10 mass % at the crystal grain boundaries and in the crystal grains at the sheet steel side 5 μm or less from the interface between the high strength steel sheet and the plating layer and by the presence of Fe—Zn alloy with an average grain size of 0.5 to 3 μm at the plating side in a ratio of 1 grain/500 μm or more.

According to still another exemplary embodiments of the present invention, hot dip galvanized steel sheet excellent in shapeability and plateability can include high strength steel sheet containing, by mass %, C: 0.05 to 0.25%,
Si: 0.3 to 2.5%,
Mn: 1.5 to 2.8%,
P: 0.03% or less,
S: 0.02% or less,
Al: 0.005 to 0.5%,
N: 0.0060% or less and
the balance of Fe and unavoidable impurities, and having a galvanized layer containing Al: 0.05 to 10 mass % and Mg: 0.01 to 5 mass % and the balance of Zn and unavoidable impurities, said hot dip galvanized steel sheet characterized by the presence of oxides containing Si in an average content of 0.6 to 10 mass % at the crystal grain boundaries and in the crystal grains at the sheet steel side 5 μm or less from the interface between the high strength steel sheet and the plating layer.

According to yet another exemplary embodiments of the present invention, hot dip galvanized steel sheet excellent in shapeability and plateability can include high strength steel sheet containing, by mass %, C: 0.05 to 0.25%,
Si: 0.3 to 2.5%,
Mn: 1.5 to 2.8%,
P: 0.03% or less,
S: 0.02% or less,
Al: 0.005 to 0.5%,
N: 0.0060% or less and the balance of Fe and unavoidable impurities, and having a galvanized layer containing Al: 4 to 20 mass %, Mg: 2 to 5 mass %, and Si: 0 to 0.5 mass % and the balance of Zn and unavoidable impurities, said hot dip galvanized steel sheet characterized by the presence of oxides containing Si in an average content of 0.6 to 10 mass % at the crystal grain boundaries and in the crystal grains at the sheet steel side 5 μm or less from the interface between the high strength steel sheet and the plating layer.

According to a further exemplary embodiments of the present invention, galvannealed steel sheet excellent in shapeability and plateability can include high strength steel sheet containing, by mass %, C: 0.05 to 0.25%,
Si: 0.3 to 2.5%,
Mn: 1.5 to 2.8%,
P: 0.03% or less,
S: 0.02% or less,
Al: 0.005 to 0.5%,
N: 0.0060% or less and
the balance of Fe and unavoidable impurities, and having a zinc alloy plating layer containing Fe and the balance of Zn and unavoidable impurities, said steel sheet characterized by the presence of oxides containing Si in an average content of 0.6 to 10 mass % at the crystal grain boundaries and in the crystal grains at the sheet steel side 5 μm or less from the interface between the high strength steel sheet and the plating layer and by the presence of oxides containing Si in an average content of 0.5 to 1.5 mass % in the plating layer.

In addition, with the high strength hot dip galvanized steel sheet excellent in shapeability and plateability as set forth herein, the oxides containing Si can be one or more types selected from $SiO_2$, $FeSiO_3$, $Fe_2SiO_4$, $MnSiO_3$, and $Mn_2SiO_4$. Further, at least one type of Si oxides selected from $FeSiO_3$, $Fe_2SiO_4$, $MnSiO_3$, and $Mn_2SiO_4$ in the plating layer and at the steel sheet surface and $SiO_2$ at the inside surface side of the steel sheet can be present. In addition, at least one type of Si oxides selected from $FeSiO_3$, $Fe_2SiO_4$, $MnSiO_3$, and $Mn_2SiO_4$ in the plating layer and $SiO_2$ at the steel sheet side of the plating layer and in the steel sheet can be present. At least one type of Si oxides selected from $FeSiO_3$, $Fe_2SiO_4$, $MnSiO_3$, and $Mn_2SiO_4$ at the steel sheet surface or surface side and $SiO_2$ at the inside surface side of the steel sheet can also be present. According to one variant of the present invention, a relationship between tensile strength F (MPa) and elongation L(%) can satisfy the following formula:

$$L \geq 51\ 0.035 \times F$$

According to yet another exemplary embodiment of the present invention, a method of production of high strength hot dip galvanized steel sheet excellent in shapeability and plateability can be provided, in which high strength steel sheet containing Si and Mn can be continuously hot dip galvanized during which causing the presence of at least one type of Si oxides selected from $FeSiO_3$, $Fe_2SiO_4$, $MnSiO_3$, and $Mn_2SiO_4$ at the steel surface or an interface of the steel sheet and plating and causing the presence of oxides of $SiO_2$ at the inside surface side of the steel sheet so as to form a galvanized layer or zinc alloy plating layer on the high strength steel sheet.

According to still another exemplary embodiment of the present invention, a method of production of high strength galvannealed steel sheet excellent in shapeability and plateability can be provided in which high strength steel sheet containing Si and Mn can be continuously hot dip galvanized during which causing the presence of at least one type of Si oxides selected from $FeSiO_3$, $Fe_2SiO_4$, $MnSiO_3$, and $Mn_2SiO_4$ at the steel surface or an interface of the steel sheet and plating and causing the presence of oxides of $SiO_2$ at the inside surface side of the steel sheet so as to form a galvanized layer on the high strength steel sheet and then galvannealing the same.

According to a further exemplary embodiment of the present invention, a method of production of high strength hot dip galvanized steel sheet excellent in shapeability and plateability can be provided in which high strength steel sheet containing C, Si, and Mn can be continuously hot dip galvanized during which causing the presence of at least one type of Si oxides selected from $FeSiO_3$, $Fe_2SiO_4$, $MnSiO_3$, and $Mn_2SiO_4$ at the steel surface or an interface of the steel sheet and plating and causing the presence of oxides of $SiO_2$ at the inside surface side of the steel sheet so as to form a galvanized layer or form a zinc alloy plating layer on the high strength steel sheet.

According to a still further exemplary embodiment of the present invention, a method of production of high strength galvannealed steel sheet excellent in shapeability and plateability can be provided in which high strength steel sheet containing C, Si, and Mn can be continuously hot dip galvanized during which causing the presence of at least one type of Si oxides selected from $FeSiO_3$, $Fe_2SiO_4$, $MnSiO_3$, and $Mn_2SiO_4$ at the steel surface or an interface of the steel sheet and plating and causing the presence of oxides of $SiO_2$ at the inside surface side of the steel sheet so as to form a galvanized layer, then galvannealing the same.

In addition, the high strength hot dip galvanized steel sheet and high strength galvannealed steel sheet can be comprised, by mass %, of C: 0.05 to 0.25%, Si: 0.3 to 2.5%, Mn: 1.5 to 2.8%, P: 0.03% or less, S: 0.02% or less, Al: 0.005 to 0.5%, N: 0.0060% or less, and the balance of Fe and unavoidable impurities.

According to another exemplary embodiment of the present invention, a method of production of high strength galvannealed steel sheet excellent in shapeability and plateability can be provided in which high strength steel sheet containing C, Si, and Mn can be continuously hot dip galvanized during which reducing it in a reduction zone with an atmosphere comprised of $H_2$ in 1 to 60 vol % and the balance of one or more of $N_2$, $H_2O$, $O_2$, $CO_2$, and CO and unavoidable impurities and controlled to a log $PO_2$ of oxygen partial pressure in the atmosphere of:

$$-0.000034T^2+0.105T-0.2[\text{Si }\%]^2+2.1$$
$$[\text{Si }\%]-98.8 \leq \log PO_2 \leq -0.000038T^2+0.107T-90.4 \quad \text{(equation 1)}$$

$$923 \leq T \leq 1173 \quad \text{(equation 2)}$$

where,
T: maximum peak temperature (K) of steel sheet
[Si %]: Si content in steel sheet (mass %).

Further, it is possible to oxidize the sheet in an oxidation zone before the reduction zone in an atmosphere of (i) a combustion air ratio of 0.9 to 1.2 and/or (ii) a dew point of 273K or more, then reducing it in the reduction zone.

In another exemplary embodiment of the present invention a method to produce high strength hot dip galvanized steel sheet excellent in shapeability and plateability can be provided which comprise final rolling a steel slab containing C, Si, and Mn at an $Ar_3$ point or more in temperature, cold rolling the sheet by 50 to 85%, then hot dip galvanizing it during which using a continuous hot dip galvanization facility having a reduction zone with an atmosphere comprised of $H_2$ in 1 to 60 vol % and the balance of one or more of $N_2$, $H_2O$, $O_2$, $CO_2$, and CO and unavoidable impurities and controlled to a log $PO_2$ of oxygen partial pressure in the atmosphere of:

$$-0.000034T^2+0.105T-0.2[\text{Si }\%]^2+2.1$$
$$[\text{Si }\%]-98.8 \leq \log PO_2 \leq -0.000038T^2+0.107T-90.4 \quad \text{(equation 1)}$$

$$923 \leq T \leq 1173 \quad \text{(equation 2)}$$

where,
T: maximum peak temperature (K) of steel sheet
[Si %]: Si content in steel sheet (mass %).

annealing it in a dual-phase coexisting temperature range of ferrite and austeniste of 1023K to 1153K, cooling it from the maximum peak temperature to 923K by an average cooling rate of 0.5 to 10 degree/second, then cooling it from 923K to 773K by an average cooling rate of 3 degree/second or more and further from 773K by an average cooling rate of 0.5 degree/second or more for hot dip galvanization so as to thereby for a hot dip galvanized layer on the surface of said cold rolled steel sheet, said the method of production characterized by controlling the time from the 773K to the 623K after plating to 25 seconds to 240 seconds.

In still another exemplary embodiment, a method to produce high strength galvannealed steel sheet excellent in shapeability and plateability can be provided comprising final rolling a steel slab containing C, Si, and Mn at an $Ar_3$ point or more in temperature, cold rolling the sheet by 50 to 85%, then hot dip galvanizing it during which using a continuous hot dip galvanization facility having a reduction zone with an atmosphere comprised of $H_2$ in 1 to 60 vol % and the balance of one or more of $N_2$, $H_2O$, $O_2$, $CO_2$, and CO and unavoidable impurities and controlled to a log $PO_2$ of oxygen partial pressure in the atmosphere of:

$$-0.000034T^2+0.105T-0.2[Si\%]^2+2.1$$
$$[Si\%]-98.8 \le \log PO_2 \le -0.000038T^2+0.107T-90.4 \quad \text{(equation 1)}$$

$$923 \le T \le 1173 \quad \text{(equation 2)}$$

where,
T: maximum peak temperature (K) of steel sheet
[Si %]: Si content in steel sheet (mass %).
annealing it in a dual-phase coexisting temperature range of ferrite and austeniste of 1023K to 1153K, cooling it from the maximum peak temperature to 923K by an average cooling rate of 0.5 to 10 degree/second, then cooling it from 923K to 773K by an average cooling rate of 3 degree/second or more and further from 773K by an average cooling rate of 0.5 degree/second or more down to 693K to 733K and holding it from 773K to the plating bath for 25 seconds to 240 seconds, then hot dip galvanizing it so as to thereby form a hot dip galvanized layer on the surface of said cold rolled steel sheet, then alloying said steel sheet on which said hot dip galvanized layer is formed so as to form a zinc alloy plating layer on the surface of the steel sheet.

For example, the method for producing galvannealed steel sheet can include performing the hot dip galvanization in a hot dip galvanization bath of a composition comprised of an effective bath Al concentration of 0.07 to 0.105 wt % and the balance of Zn and unavoidable impurities and performing said galvannealing at a temperature T (K) satisfying the following formula:

$$720 \le T \le 690 \times \exp(1.35 \times [Al\%])$$

where, [Al %]: effective bath Al concentration in galvanization bath (wt %).

In addition, the high strength hot dip galvanized steel sheet and high strength galvannealed steel sheet can be comprised, by mass %, of C: 0.05 to 0.25%, Si: 0.3 to 2.5%, Mn: 1.5 to 2.8%, P: 0.03% or less, S: 0.02% or less, Al: 0.005 to 0.5%, N: 0.0060% or less, and the balance of Fe and unavoidable impurities. Further, the method to produce high strength galvannealed steel sheet can include annealing the sheet, cooling it to 673K to 723K, then reheating it to 703K to 743K for galvannealing. It is also possible to control the time from plating to cooling to 673K or less in temperature to 30 seconds to 120 seconds.

According to a further exemplary embodiment of the present invention, a production facility for hot dip galvanized steel sheet having a nonoxidizing furnace or direct-fired furnace and continuously hot dip galvanizing steel sheet can be provided. For example, the production facility can be provided by installing in a reducing furnace a device for introducing a gas comprised of $CO_2$ in 1 to 100 vol % and the balance of $N_2$, $H_2O$, $O_2$, CO and unavoidable impurities.

According to yet another exemplary embodiment of the present invention, a production facility for hot dip galvanized steel sheet having a nonoxidizing furnace or direct-fired furnace and continuously hot dip galvanizing steel sheet can be provided. For example, the production facility for hot dip galvanized steel sheet can be provided by installing in a reducing furnace a device for generating a gas comprised of $CO_2$ in 1 to 100 vol % and the balance of $N_2$, $H_2O$, $O_2$, CO and unavoidable impurities.

These and other objects, features and advantages of the present invention will become apparent upon reading the following detailed description of embodiments of the invention, when taken in conjunction with the appended claims.

BRIEF DESCRIPTION OF THE DRAWINGS

Further objects, features and advantages of the invention will become apparent from the following detailed description taken in conjunction with the accompanying figure showing illustrative embodiment(s), result(s) and/or feature(s) of the exemplary embodiment(s) of the present invention, in which.

DETAILED DESCRIPTION OF EXEMPLARY EMBODIMENTS OF INVENTION

Figure 1:
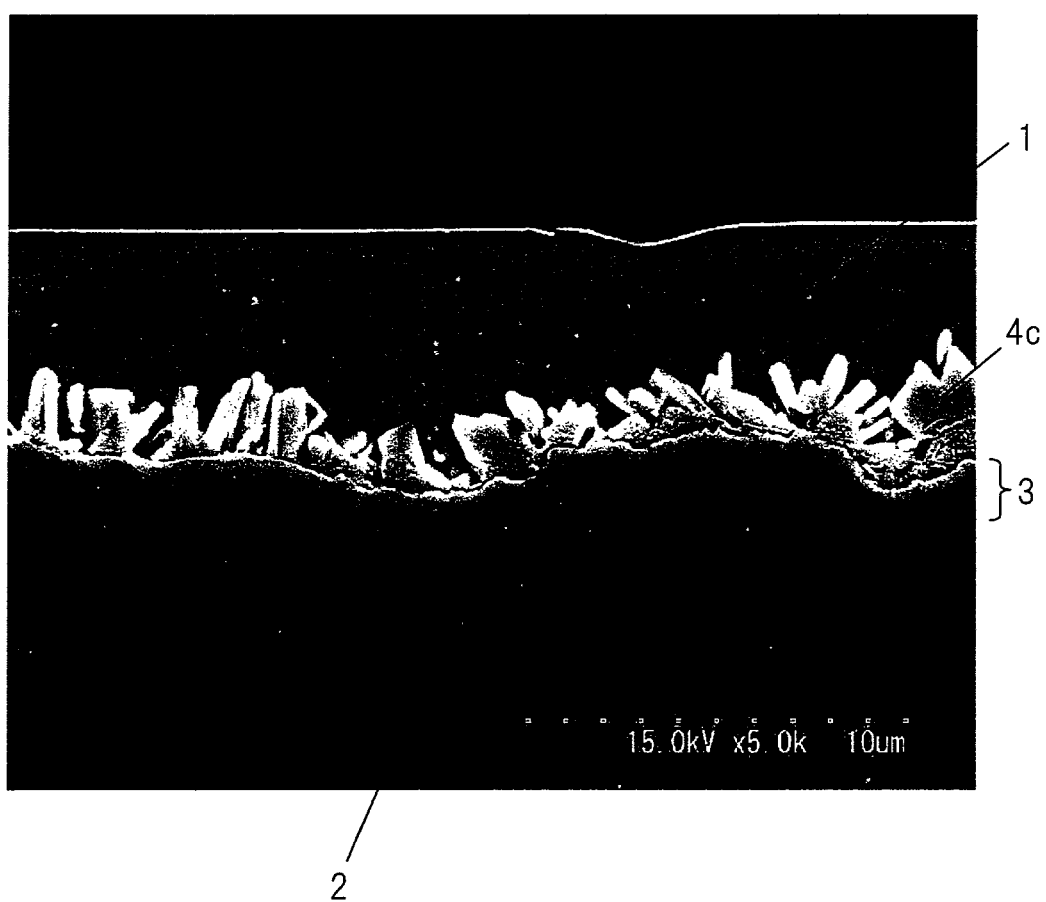
FIG. 1 is an illustration of exemplary results of embedding and polishing and etching of high strength hot dip galvanized steel sheet with good plateability and observation of the cross-section by an SEM image in accordance with exemplary embodiments of the present invention.

As an initial matter, the exemplary reasons for the numerical limitations of C, Si, Mn, P, S, Al, and N are described herein. For example, C is an important element when attempting to increase the strength of steel sheet by strengthening of the structure by martensite or retained austenite. One of the reasons for making the content of C 0.05% or more is that if C is less than 0.05%, cementite or pearlite easily forms on a hot dip galvanization line where it is difficult to rapidly cool the sheet from the annealing temperature using a mist or sprayed water as a cooling medium and securing the required tensile strength is difficult. On the other hand, one of the reasons for making the content of C 0.25% or less is that if C exceeds 0.25%, it may be difficult to form sound weld zones by spot welding and simultaneously the C becomes remarkably segregated and the workability is degraded.

Si can be added in an amount of 0.3 to 2.5% as an element increasing the workability of the steel sheet, in particularly the strength, without greatly impairing the elongation. One of the reasons for making the content of Si 0.3% or more is that if Si is less than 0.3%, securing the required tensile strength can be difficult. One of the reasons for making the content of Si 2.5% or less is that if Si exceeds 2.5%, the effect of increasing the strength become saturated and a drop in the ductility occurs. Preferably, by making this a mass % of about four times or more the C content, the progress of pearlite and bainite transformation due to the reheating for the alloying performed right after the plating is remarkably delayed and it is possible to obtain a metal structure with 3 to 20% by volume of martensite and retained austenite mixed in the ferrite even after cooling to room temperature.

Mn, along with C, can lower the free energy of austenite, and thus can be added in an amount of 1.5% or more for the purpose of stabilizing the austenite until the steel strip is dipped in the plating bath. Further, by adding this in a mass % of about 12 times or more of the C content, the advance of the pearlite and bainite transformation due to the reheating for alloying performed right after plating is remarkably delayed and even after cooling to room temperature, a metal structure is formed in which about 3 to 20% by volume of martensite and retained austenite is mixed in the ferrite. However, if the amount added becomes excessive, the slab easily cracks and the spot weldability also deteriorates, so 2.8% is made the upper limit.

P is in general included in steel as an unavoidable impurity. If the amount exceeds 0.03%, the spot weldability remarkably deteriorates. On top of this, with high strength steel sheet having a tensile strength exceeding 490 MPa like in the present invention, the toughness and the cold rollability also remarkably deteriorate, so the content is made about 0.03% or less. S is also in general included in steel as an unavoidable impurity. If the amount exceeds about 0.02%, MnS flattened in the rolling direction becomes conspicuously present and has a detrimental effect on the bendability of the steel sheet, so the content is made about 0.02% or less.

Al is a deoxidizing element of steel and acts to increase the grain refinement of the hot rolled material by MN and suppress the coarsening of the crystal grains in the series of heat treatment processes so as to improve the quality, and thus about 0.005% or more has to be added. However, if exceeding about 0.5%, not only does the cost become high, but also the surface properties are degraded, so the content is made about 0.5% or less. N is also in general included in steel as an unavoidable impurity. If the amount exceeds about 0.006%, the elongation and the brittleness are degraded, so the content is made about 0.006% or less.

Further, even if steel having these as main ingredients further contains Nb, Ti, B, Mo, Cu, Ni, Sn, Zn, Zr, W, Co, Ca, rare earth elements (including Y), V, Ta, Hf, Pb, Mg, As, Sb, and Bi in a total of about 1% or less, the effects of the present invention are not impaired. Depending on the amount, the corrosion resistance and the workability will be improved or other preferable cases will arise.

Further, the plating layer is described herein.

For example, one of the reasons for limiting the content of Al in the hot dip galvanized layer to about 0.05 to 10 mass % is that if the content of Al exceeds about 10 mass %, the Fe—Al alloying reaction will proceed too far and a drop in the plating adhesion will be observed. Further, one of the reasons for limiting the content of Al to 0.05 mass % or more is that with less than about 0.05 mass % of an amount of Al, if performing the usual hot dip plating, the Zn—Fe alloying reaction will proceed too far at the time of the plating, a brittle alloy layer will develop at the base iron interface, and the plating adhesion will be degraded.

One of the reasons for limiting the content of Fe to about 0.01 to 3 mass % is that if less than about 0.01 mass %, the effect of improvement of the plating adhesion will be insufficient, while if over about 3 mass %, a brittle alloy layer will develop at the base iron interface, and the plating adhesion will be degraded.

Even if the plating layer additionally contains Sb, Pb, Bi, Ca, Be, Ti, Cu, Ni, Co, Cr, Mn, P, B, Sn, Zr, Hf, Sr, V, Se, or an REM alone or in combination in an amount of about 0.5 mass % or less, the effects of the present invention will not be impaired. Depending on the amount, the appearance may be further improved or other preferable results will arise.

The amount of deposition of the hot dip galvanization is not particularly limited, but from the viewpoint of the corrosion resistance, it can be about 10 g/m$^2$ or more, while from the viewpoint of the workability, it can be about 350 g/m$^2$ or less.

Further, the high strength hot dip galvanized steel sheet according to an exemplary embodiment of the present invention can improve the plating adhesion by the presence of oxides containing Si in an average content 0.6 to 10 mass % at the crystal grain boundaries at the steel sheet side 5 μm or less from the interface between the high strength steel sheet and plating layer and in the crystal grains and by the presence of Fe—Zn alloy of an average grain size of about 0.5 to 3 μm at the plating side. One of the reasons why the plating adhesion is improved if oxides containing Si are present at the crystal grain boundaries and inside the crystal grains of high strength steel sheet is believed to be that there is no longer any exposure of the $SiO_2$ at the steel sheet surface causing the drop in the plating adhesion due to the formation of oxides containing Si in the steel sheet in the annealing process.

Further, the reason why the plating adhesion is improved due to the formation of Fe—Zn alloy of an average grain size of about 0.5 to 3 μm at the plating side from the interface between the high strength steel sheet and plating layer is believed to be that the adhesion is improved by the reaction between the steel sheet and the plating bath.

In general, in steel sheet having an Si content of less than about 0.3%, the steel sheet and the plating bath generally react to form Fe—Al—Zn-based intermetallic compounds which improve the adhesion. The inventors ran various experiments and as a result clarified that in steel sheet with an Si content of about 0.3% or more, the formation of Fe—Zn-based intermetallic compounds improves the plating adhesion. Therefore, when $SiO_2$ is exposed at the steel sheet surface, it is believed that this inhibits the reaction between the steel sheet and the plating bath, so Fe—Zn alloy is not formed and simultaneously the plating adhesion drops.

FIG. 1 shows an illustration of exemplary results of embedding and polishing and etching of high strength hot dip galvanized steel sheet with good plating adhesion and observation of the cross-section by an SEM image according to an exemplary embodiment of the present invention. As provided in FIG. 1, the Fe—Zn-based intermetallic compounds present in the plating layer may be clearly differentiated by observation under a microscope. If analyzing the Fe % of the intermetallic compounds, it is approximately 7%, so the Fe—Zn-based intermetallic compounds are believed to be the ζ-phase.

The ζ-phase has a monoclinic crystal structure, so if observed from the cross-section, forms a rectangular or parallelogram shape as shown in FIG. 1. Therefore, the average grain size of these Fe—Zn-based intermetallic compounds can be the average of the measured long axis and short axis of the rectangular or parallelogram shapes.

The reason for limiting the average grain size of the Fe—Zn-based intermetallic compounds to 0.5 to 3 μm is that if less than about 0.5 μm, the effect of improvement of the plating adhesion is not sufficient. If over about 3 μM, the Zn—Fe alloying reaction proceeds to far, a brittle alloy layer develops at the base iron interface, and the plating adhesion is likely degraded.

The Fe—Zn-based intermetallic compounds have been reviewed in numerous platings, and as a result it was confirmed that in high strength hot dip galvanized steel sheet with good plating adhesion, Fe—Zn-based intermetallic compounds are present at a rate of about 1 grain/500 μm or more at any cross-section.

Figure 2:
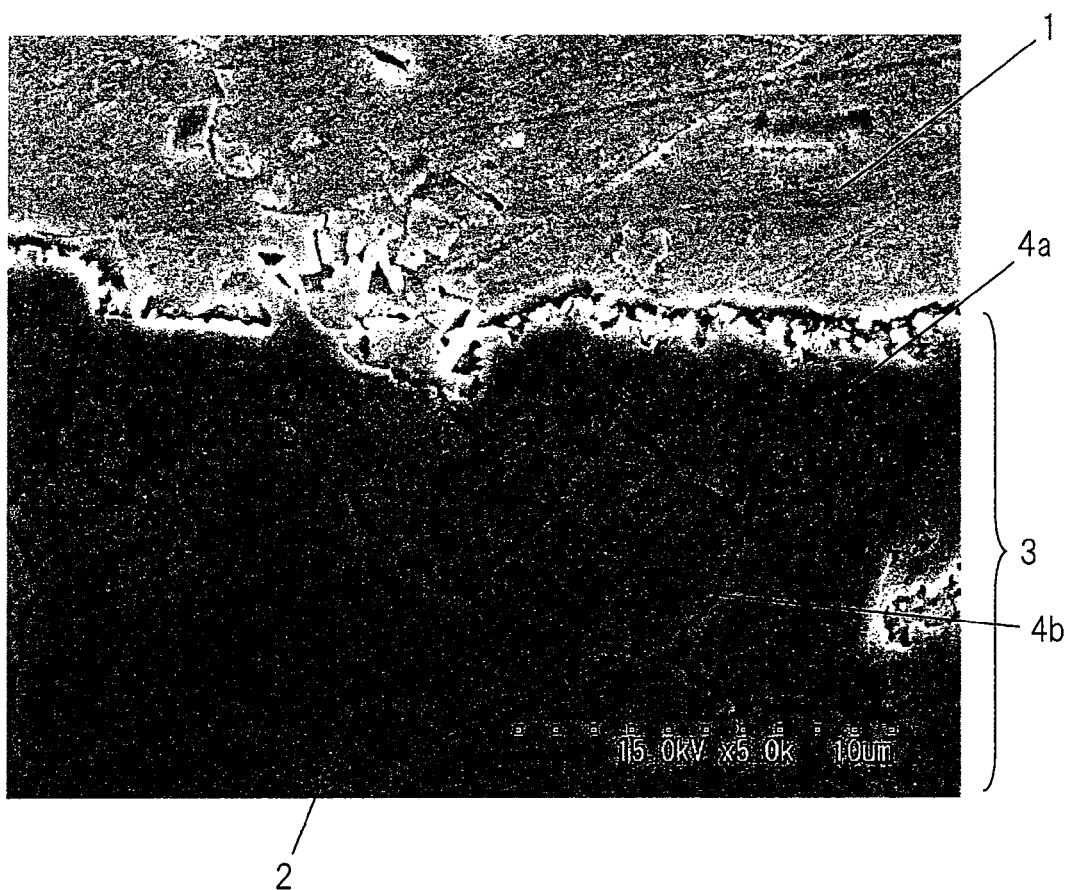
FIG. 2 is an illustration of exemplary results of embedding and polishing of the cross-section of high strength hot dip galvanized steel sheet with good plateability inclined by, e.g., about 10 degrees and observation of that cross-section by an SEM image in accordance with exemplary embodiments of the present invention.

Further, the oxides containing Si present at the crystal grain boundaries and in the crystal grains can be clearly differentiated under observation under a microscope. As an example of the oxides containing Si at the crystal grain boundaries and in the crystal grains of the steel sheet side 5 μm or less from the interface of the high strength steel sheet and the plating layer, results of cross-sectional observation are shown in FIG. 2. FIG. 2 shows an illustration of exemplary results of embedding and polishing of the cross-section of high strength hot dip galvanized steel sheet with good plating adhesion inclined by 10 degrees and observation of that cross-section by an SEM image according to exemplary embodiments of the present invention. As provided in FIG. 2, oxides containing Si present at the crystal grain boundaries and in the crystal grains of high strength steel sheet can be clearly differentiated by observation under a microscope.

Further, if analyzing the oxides at the crystal grain boundaries and in the crystal grains by EDX, the peaks of Si, Mn, Fe, and O are observed, so the observed oxides are believed to be $SiO_2$, $FeSiO_3$, $Fe_2SiO_4$, $MnSiO_3$, and $Mn_2SiO_4$.

Next, the reason for limiting the content of Al in the Zn—Al—Mg-based plating layer to 0.05 to 10 mass % is that if the content of Al exceeds about 10 mass %, a drop in the plating adhesion is seen, so the content of Al in a plating layer to which Si is not added must be reduced to 10 mass % or less. Further, the reason for limiting the content of Al to 0.05 mass % or more is that with less than about 0.05 mass % of an amount of Al, if performing the usual hot dip plating, an Zn—Fe alloying reaction will occur at the time of the plating, a brittle alloy layer will develop at the base iron interface, and the plating adhesion will be degraded.

Therefore, in the hot dip plated steel material in the present invention, in particular in the case where the Al concentration is a high concentration such as one over 10 mass %, Si must be added into the plating layer to secure plating adhesion.

On the other hand, one of the reasons for limiting the content of Al in the Zn—Al—Mg—Si-based plating layer to about 4 to 22 mass % is that 4 mass % or more of Al must be added to remarkably improve the corrosion resistance of the plating layer, while if over about 22 mass %, the effect of improvement of the corrosion resistance becomes saturated.

One of the reasons for limiting the content of Si to about 0.5 mass % or less (however, excluding 0 mass %) is that Si has an effect of improving the adhesion, but if exceeding about 0.5 mass %, the effect of improvement of the adhesion becomes saturated. Preferably, the content is about 0.00001 to 0.5 mass %, more preferably about 0.0001 to 0.5 mass %.

The addition of Si is essential in a plating layer having a content of Al of over 10 mass %, but even in a plating layer with a content of Al of about 10% or less, there is a great effect on improvement of the plating adhesion, so when used for a hard-to-work member etc. and high plating adhesion is otherwise required, it is effective to add Si. Further, due to the addition of Si, an [$Mg_2Si$ phase] precipitates in the solidified structure of the plating layer. This [$Mg_2Si$ phase] has the effect of improving the corrosion resistance, so it is more desirable to increase the amount of addition of Si and prepare a metal structure in which the solidified structure of the plating layer includes the [$Mg_2Si$ phase] mixed in.

The reason for limiting the content of Mg to about 0.01 to 5 mass % is that if less than 0.01 mass %, the effect of improvement of the corrosion resistance is insufficient, while if over 5 mass %, the plating layer becomes brittle and the adhesion falls. The corrosion resistance is improved the greater the amount of addition of Mg, so to greatly improve the corrosion resistance of the plating layer, the content of Mg is preferably made 2 to 5 mass %. Further, the above-mentioned [$Mg_2Si$ phase] precipitates more easily the greater the amount of addition of Mg, so it is more preferable to increase the amount of addition of Mg and prepare a metal structure with an [$Mg_2Si$ phase] mixed in the solidified structure of the plating layer.

Even if the plating layer additionally contains Fe, Sb, Pb, Bi, Ca, Be, Ti, Cu, Ni, Co, Cr, Mn, P, B, Sn, Zr, Hf, Sr, V, Sc, or an REM alone or together in an amount of within 0.5 mass %, the effects of exemplary embodiments of the present invention would likely not be impaired. Depending on the amount, the appearance will even be further improved etc. or other preferable cases may occur. The amount of deposition of the hot dip galvanization is not particularly limited, but from the viewpoint of the corrosion resistance, about 10 $g/m^2$ or more may be preferable, while from the viewpoint of the workability, about 350 $g/m^2$ or less can be preferable.

Further, the high strength hot dip galvanized steel sheet of the present invention may have non-plating defects eliminated from it by the presence of oxides containing Si in an average content of about 0.6 to 10 mass % at the crystal grain boundaries and in the crystal grains at the sheet steel side about 5 μm or less from the interface between the high strength steel sheet and the plating layer. The reason why non-plating defects can be eliminated if oxides containing Si are present at the crystal grain boundaries and in the crystal grains of the high strength steel sheet is that $SiO_2$ grains causing non-plating defects may no longer be exposed at the steel surface due to the formation of oxides containing Si in the steel sheet in the annealing process.

Figure 3:
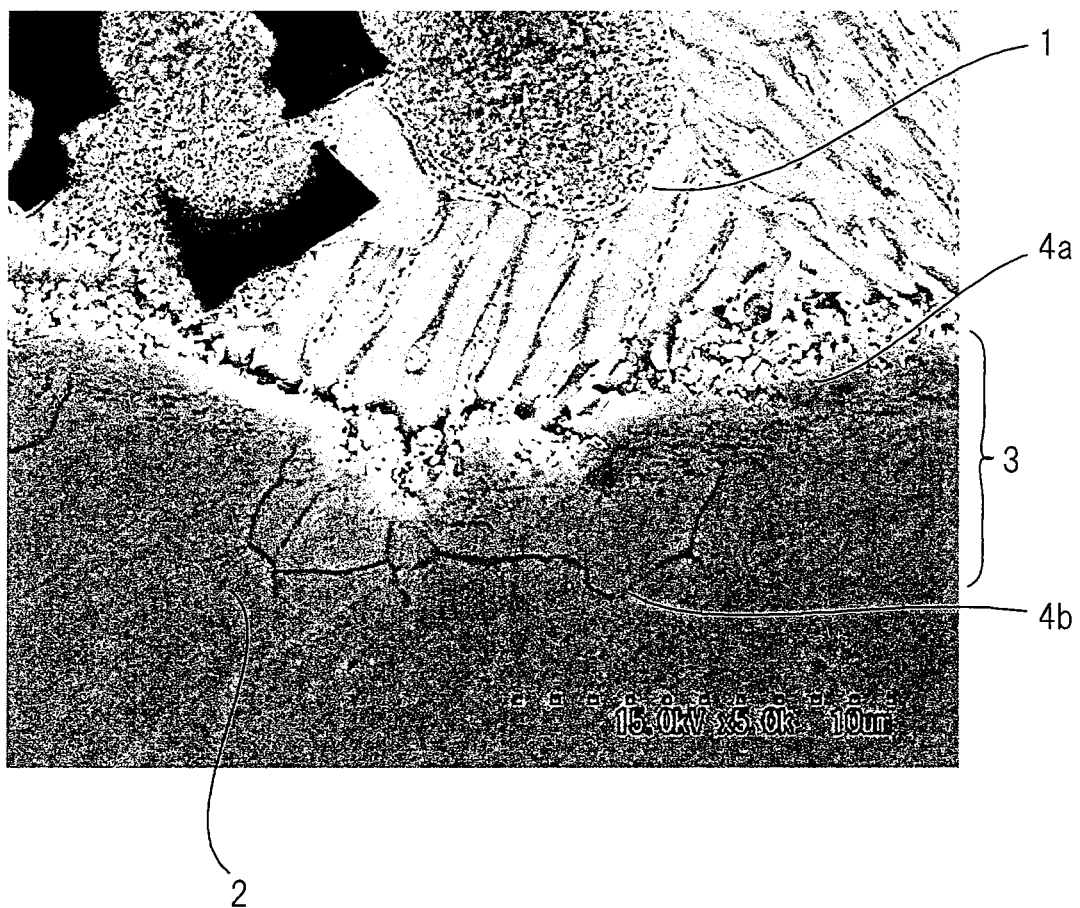
FIG. 3 is an illustration of exemplary results of embedding and polishing of the cross-section of high strength hot dip galvanized (Zn—Al—Mg—Si plated) steel sheet with good plateability inclined by, e.g., about 10 degrees and observation of that cross-section by an SEM image in accordance with exemplary embodiments of the present invention.

The oxides containing Si present at said crystal grain boundaries and in the crystal grains can be clearly differentiated under observation under a microscope. As an example of the oxides containing Si at the crystal grain boundaries and in the crystal grains of the steel sheet side 5 μm or less from the interface of the high strength steel sheet and the plating layer, results of cross-sectional observation are shown in FIG. 3. FIG. 3 shows an illustration of exemplary results of embedding and polishing of the cross-section of high strength hot dip galvanized steel sheet with no non-plating inclined by 10 degrees and observation of that cross-section by an SEM image according to exemplary embodiments of the present invention. As provided in FIG. 3, oxides containing Si present at the crystal grain boundaries and in the crystal grains of high strength steel sheet can be clearly differentiated by observation under a microscope.

Further, if analyzing the oxides at the crystal grain boundaries and in the crystal grains by EDX, the peaks of Si, Mn, Fe, and O are observed, so the observed oxides are believed to be $SiO_2$, $FeSiO_3$, $Fe_2SiO_4$, $MnSiO_3$, and $Mn_2SiO_4$.

Further, according to an exemplary embodiment of the present invention, the "zinc alloy plating layer" can mean but not limited to the plating layer mainly comprised of Fe—Zn alloy formed by the diffusion of the Fe in the steel into the Zn plating due to an alloying reaction. The content of the Fe is not particularly limited, but with an Fe content in the plating of less than about 7 mass %, a soft η phase remains at the plating surface and the press formability is degraded, while if the Fe content exceeds about 15 mass %, a brittle alloy layer will develop too far at the base iron interface and the plating adhesion will be degraded, thus about 7 to 15 mass % may be suitable.

Further, in general, when continuously applying hot dip galvanization, Al is added to the plating bath for the purpose of controlling the alloying reaction in the plating bath, so the plating can contain about 0.05 to 0.5 mass % of Al. Further, in the alloying process, simultaneous with the diffusion of Fe, the elements added to the steel also diffuse, so the plating also contains these elements.

Even if the steel sheet of the present invention contains or has mixed into it one or more elements of Pb, Sb, Si, Sn, Mg, Mn, Ni, Cr, Co, Ca, Cu, Li, Ti, Be, Bi, and rare earth elements in the hot dip galvanization bath or during the galvanization, the effects of the present invention will not be impaired. Depending on the amount, the corrosion resistance and workability will even be improved or other preferable cases will arise. The amount of deposition of the galvannealing is not particularly limited, but from the viewpoint of the corrosion resistance is preferably 20 $g/m^2$ or more and from the viewpoint of the economy may be 150 $g/m^2$ or less.

The high strength galvannealed steel sheet of the present invention can have non-plating defects eliminated by the presence of oxides containing Si in an average content of about 0.6 to 10 mass % at the crystal grain boundaries and in the crystal grains at the sheet steel side about 5 μm or less from the interface between the high strength steel sheet and the plating layer and the presence of oxides containing Si in an average content of about 0.05 to 1.5 mass % in the plating layer. One of the reasons why non-plating defects can be eliminated if oxides containing Si are present at the crystal grain boundaries and in the crystal grains of the high strength steel sheet is that Si causing non-plating defects are no longer exposed at the steel surface due to the formation of oxides containing Si in the steel sheet in the annealing process.

Further, the oxides in the plating layer may diffuse in the plating during the diffusion of the oxides containing Si formed in the steel sheet in the annealing process during the alloying process.

Figure 4:
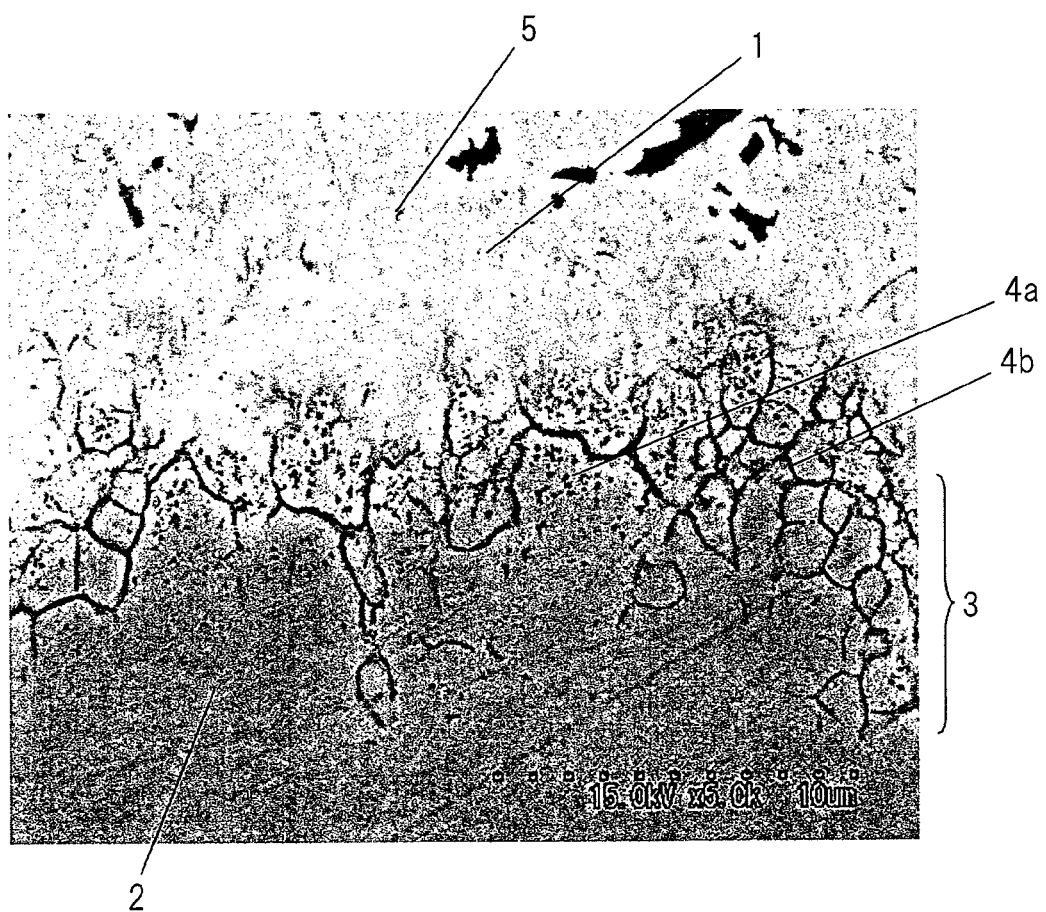
FIG. 4 is an illustration of exemplary results of embedding and polishing of the cross-section of high strength galvannealed steel sheet with good plateability inclined by, e.g., about 10 degrees and observation of that cross-section by an SEM image in accordance with exemplary embodiments of the present invention.

The oxides containing Si present at said crystal grain boundaries and in the crystal grains can be clearly differentiated under observation under a microscope. As an example of the oxides containing Si at the crystal grain boundaries and in the crystal grains of the steel sheet side 5 μm or less from the interface of the high strength steel sheet and the plating layer, results of cross-sectional observation are shown in FIG. 4. FIG. 4 shows an illustration of the exemplary results of embedding and polishing of the cross-section of high strength galvannealed steel sheet with no non-plating inclined by 10 degrees and observation of that cross-section by an SEM image according to exemplary embodiments of the present invention. As provided in FIG. 4, oxides containing Si present at the crystal grain boundaries and in the crystal grains of high strength steel sheet can be clearly differentiated by observation under a microscope.

Further the oxides containing Si present in the plating layer may also be clearly differentiated by observation under a microscope.

Further, if analyzing the oxides at the crystal grain boundaries and in the crystal grains and the oxides in the plating layer by EDX, the peaks of Si, Mn, Fe, and O are observed, the observed oxides are believed to be $SiO_2$, $FeSiO_3$, $Fe_2SiO_4$, $MnSiO_3$, and $Mn_2SiO_4$.

In the exemplary embodiments of the present invention, the "steel layer containing oxides containing Si" can be a layer at which oxides containing Si are observed under observation under a microscope. Further, the "average content of oxides containing Si" may indicate the content of the oxides contained in this steel layer, while the "thickness of the steel layer containing the oxides containing Si" can indicate the distance from the steel sheet surface to the part where these oxides are observed.

The content of the oxides containing Si may be measured by any sort of method so long as the mass % of the oxides can be measured, but the method of dissolving the layer containing the oxides containing Si by an acid, separating the oxides containing Si, then measuring the weight is reliable. Further, the method of measurement of the thickness of the steel layer containing the oxides containing Si according to an exemplary embodiment of the present invention is also not particularly limited, and the exemplary method of measurement from the cross-section by observation under a microscope is reliable.

In the exemplary embodiments of the present invention, one of the reasons why the average content of the oxides containing Si is limited to about 0.6 to 10 mass % is that with less than about 0.6 mass %, the suppression of the external oxide film is insufficient and no effect of preventing non-plating defects is seen, while if over about 10 mass %, the effect of prevention of non-plating defects becomes saturated.

Further, one of the reasons for limiting the thickness of the steel layer containing the oxides containing Si to about 5 μm or less is that if over about 5 μm, the effect of improving the plating adhesion becomes saturated.

Further, the reason for limiting the oxides containing Si in the galvannealed layer to an average content of about 0.05 to 1.5 mass % is that if less than about 0.05 mass %, the suppression of the external oxide film is insufficient and no effect of prevention of non-plating defects can be seen, while if over about 1.5 mass %, the effect of prevention of non-plating defects becomes saturated.

The content of the oxides containing Si in the plating layer may also be measured by any sort of method so long as the mass % of the oxides can be measured, but the method of dissolving only the plating layer by acid, separating the oxides containing Si, then measuring the weight is reliable.

In the present invention, the "high strength plating steel sheet excellent in workability" can mean but not limited to steel sheet having a performance of a tensile strength of about 490 MPa or more and a relationship of the tensile strength F (MPa) and elongation L (%) satisfying $$L \geq 51 - 0.035 \times F$$

One of the reasons for limiting the elongation L to [51−0.035×F]% or more is that when L is lower than [51−0.035×

F], the sheet breaks at the time of deep drawing or other extreme working and the workability is otherwise insufficient.

Next, the reasons for limiting the production conditions will be explained. In an exemplary embodiment of the present invention, to positively form the steel layer containing the oxides containing Si, the method of causing internal oxidation of the oxides containing Si in the annealing process on the continuous hot dip plating line may be effective.

Here, the "internal oxidation of the oxides containing Si" can be the phenomenon where the oxygen diffused in the steel sheet reacts with the Si near the surface of the alloy and oxides precipitate. The internal oxidation phenomenon may occur when the speed of diffusion of oxygen toward the inside is far faster than the speed of diffusion of Si toward the outside, that is, when the oxygen potential in the atmosphere is relatively high or the concentration of Si is low. At this time, the Si does not move much at all and is oxidized in place, so the concentration of oxides of Si at the steel sheet surface—which is a cause of a drop in plating adhesion—can be prevented.

However, even in steel sheet adjusted by the internal oxidation method, the subsequent plateability may differ depending on the type of the Si oxides and their positional relationship, so the Si oxides are defined as a state where at least one type of Si oxides selected from $FeSiO_3$, $Fe_2SiO_4$, $MnSiO_3$, and $Mn_2SiO_4$ are present at the steel sheet surface or surface side and $SiO_2$ is present at the inside surface side of the steel sheet. This can be because even if the $SiO_2$ is an internal oxidation state, if present at the steel sheet surface, it lowers the plateability.

$FeSiO_3$, $Fe_2SiO_4$, $MnSiO_3$, and $Mn_2SiO_4$ are stable in the region where the oxygen potential is larger than $SiO_2$, so to obtain a state where at least one type of Si oxides selected from $FeSiO_3$, $Fe_2SiO_4$, $MnSiO_3$, and $Mn_2SiO_4$ are present at the steel sheet surface or the surface side and where $SiO_2$ is present at the inside surface side of the steel sheet, the oxygen potential has to be made larger than the case of internal oxidation of $SiO_2$ alone.

The oxygen potential in the steel decreases from the steel sheet surface toward the inside, so if controlling the steel sheet surface to an oxygen potential where at least one type of Si oxides selected from $FeSiO_3$, $Fe_2SiO_4$, $MnSiO_3$, and $Mn_2SiO_4$ are formed at the steel sheet surface or surface side, at least one type of Si oxides selected from $FeSiO_3$, $Fe_2SiO_4$, $MnSiO_3$, and $Mn_2SiO_4$ will be formed at the steel sheet surface or surface side and $SiO_2$ will be formed at the inside surface side of the steel sheet where the oxygen potential is reduced.

By using the types of Si oxides and their positional relationships defined above, it is possible to prevent non-plating defects due to $SiO_2$ in the next process of dipping into the hot dip galvanization bath.

Further, by galvanizing and alloying the thus prepared steel sheet on which at least one type of Si oxides selected from $FeSiO_3$, $Fe_2SiO_4$, $MnSiO_3$, and $Mn_2SiO_4$ are formed at the steel sheet surface or surface side, at least one type of Si oxides selected from $FeSiO_3$, $Fe_2SiO_4$, $MnSiO_3$, and $Mn_2SiO_4$ are diffused into the plating layer.

The state of oxidation of Si can be determined by the oxygen potential in the atmosphere, so to form the oxides defined in the present invention under the desired conditions, it is necessary to directly manage the $PO_2$ in the atmosphere.

When the gas in the atmosphere is $H_2$, $H_2O$, $O_2$, and a balance of $N_2$, the following equilibrium reaction is believed to occur. $PH_2O/PH_2$ is proportional to the ½ power of $PO_2$ and the equilibrium constant $1/K_1$.

$$H_2O = H_2 + \tfrac{1}{2}O_2 : K_1 = P(H_2) \cdot P(O_2)^{1/2} / P(H_2O)$$

The equilibrium constant $K_1$ is a variable dependent on the temperature, so when the temperature changes, $PH_2O/PH_2$ and $PO_2$ separately change. That is, even a region of a ratio of a water partial pressure and hydrogen partial pressure corresponding to the oxygen partial pressure of the Si internal oxidation region in a certain temperature range will, in another temperature range, correspond to the oxygen potential of the region where iron oxidizes or will correspond to the oxygen potential of the Si external oxidation region.

Therefore, even if managing $PH_2O/PH_2$, the oxides defined in the exemplary embodiment of the present invention would likely not be formed.

Further, when the gas in the atmosphere is comprised of $H_2$, $CO_2$, $CO$, $O_2$, and the balance of $N_2$, the following equilibrium reaction is believed to occur. $PCO_2/PCO$ is proportional to the ½ power of $PO_2$ and the equilibrium constant $1/K_2$.

$$CO_2 = CO + \tfrac{1}{2}O_2 : K_2 = P(CO) \cdot P(O_2)^{1/2} / P(CO_2)$$

Further, at the same time, the following equilibrium reaction occurs, and thus it is believed that $H_2O$ is formed in atmosphere.

$$CO_2 + H_2 = CO + H_2O : K_3 = P(CO) \cdot P(H_2O) / P(CO_2) \cdot P(H_2)$$

Therefore, $PO_2$ is not determined unless $PH_2O$, $PH_2$, $PCO_2$, $PCO$, and the temperature are determined, so as to form the oxides defined in the exemplary embodiment of the present invention, it may be preferable to define the $PO_2$ or define all of the values.

Specifically, to reduce iron while suppressing external oxidation of Si in the reduction zone and form at least one type of Si oxides selected from $FeSiO_3$, $Fe_2SiO_4$, $MnSiO_3$, and $Mn_2SiO_4$ at the steel sheet surface or surface side, the reduction can be performed in a reduction zone with an atmosphere comprised of $H_2$ in about 1 to 60 vol % and the balance of one or more of $N_2$, $H_2O$, $O_2$, $CO_2$, and $CO$ and unavoidable impurities and controlled to a log $PO_2$ of oxygen partial pressure in the atmosphere of:

$$-0.0000034T^2 + 0.105T - 0.2[Si\%]^2 + 2.1[Si\%] - 98.8 \leq \log PO_2 \leq -0.000038T^2 + 0.107T - 90.4 \quad \text{(equation 1)}$$

$$923 \leq T \leq 1173 \quad \text{(equation 2)}$$

where,
T: maximum peak temperature (K) of steel sheet
[Si %]: Si content in steel sheet (mass %).

According to such exemplary embodiment of the present invention, the logs are all common logarithms.

The reason for limiting $H_2$ to 1 to 60 vol % is that if less than 1%, the oxide film formed on the steel sheet surface cannot be sufficiently reduced and the plating wettability cannot be secured, while if over 60%, no improvement in the reduction action is seen and the cost increases.

One of the reasons for limiting the log $PO_2$ to $-0.000038T^2 + 0.107T - 90.4$ is to reduce the oxides of iron in the reduction zone. If log $PO_2$ is over $-0.000038T^2 + 0.107T - 90.4$, the iron oxidation region is entered, so iron oxide film forms on the steel sheet surface and non-plating defects occur.

One of the reasons for limiting log $PO_2$ to $-0.000034T^2+0.105T-0.2[Si\%]^2+2.1[Si\%]-98.8$ or more is that if log $PO_2$ is less than $-0.000034T^2+0.105T-0.2[Si\%]^2+2.1[Si\%]-98.8$, the Si oxides $SiO_2$ are exposed at the surface and cause non-plating defects and a drop in plating adhesion.

By making log $PO_2$ $-0.000034T^2+0.105T-0.2[Si\%]^2+2.1[Si\%]-98.8$ or more, an oxidized state in which one or more types of Si oxides selected from $FeSiO_3$, $Fe_2SiO_4$, $MnSiO_3$, and $Mn_2SiO_4$ are present at the steel sheet surface or surface side and $SiO_2$ is present at the inside surface side of the steel sheet is obtained.

Further, in an atmosphere with a further smaller log $PO_2$, the Si external oxidation region is entered, so the plating adhesion remarkably falls.

In the exemplary embodiment of the present invention, the maximum peak temperature T of the steel sheet defining the log $PO_2$ of the oxygen partial pressure in the atmosphere is defined as about 923K to 1173K.

The reason for limiting T to about 923K or more is that if T is less than T, the oxygen potential for external oxidation of Si is small and becomes the oxidation region of Fe with the industrially feasible range of oxygen potential and FeO is formed on the steel sheet surface, so the plating adhesion falls. On the other hand, the reason for limiting T to about 1173K or less is that annealing at a temperature over about 1173K requires tremendous energy and is uneconomical. If the objective is to obtain the mechanical properties of the steel sheet, as explained later, a maximum peak temperature of about 1153K or less is sufficient.

Further, the higher the atmosphere temperature in the furnace, the easier it is to raise the temperature of the steel sheet and therefore the more advantageous, but if the atmosphere temperature is too high, the lifetime of the refractories in the furnace becomes shorter and the cost rises, so about 1273K or less is preferred.

In the exemplary embodiment of the present invention, $PO_2$ is controlled by introducing one or more of $H_2O$, $O_2$, $CO_2$, and CO. In the above-mentioned equilibrium reaction equations, if the temperature is determined, the equilibrium constant is determined and, based on the equilibrium constant, the oxygen partial pressure, that is, the oxygen potential, is determined. At an atmosphere temperature of 773K to 1273K, the reaction of a gas reaches the equilibrium state in a short time, so $PO_2$ is determined if the $PH_2$, $PH_2O$, $PCO_2$, PCO and the atmosphere temperature in the furnace are determined.

$O_2$ and CO do not have to be intentionally introduced, but when introducing $H_2O$ and $CO_2$ at the annealing temperature into a furnace containing $H_2$ to 1 vol % or more, $O_2$ and CO are formed due to an equilibrium reaction with part of this and $H_2$. So long as the preferred amounts of $H_2O$ and $CO_2$ can be introduced, the method of introduction is not particularly limited, but for example the exemplary method of burning a gas comprised of a mixture of CO and $H_2$ and introducing the produced $H_2O$ and $CO_2$, the method of burning $CH_4$, $C_2H_6$, $C_3H_8$, or another hydrocarbon gas and LNG or another hydrocarbon mixture and introducing the produced $H_2O$ and $CO_2$, the method of burning gasoline, diesel fuel, heavy oil, or another liquid hydrocarbon mixture and introducing the produced $H_2O$ and $CO_2$, the method of burning $CH_3OH$, $C_2H_5OH$, or other alcohol and their mixtures or various types of organic solvents and introducing the produced $H_2O$ and $CO_2$, etc. may be mentioned.

The exemplary method of burning only CO and introducing the produced $CO_2$ may also be considered, but if introducing $CO_2$ at the main annealing temperature into the furnace of this atmosphere, part will be reduced by the $H_2$ and CO and $H_2O$ can be produced, so there may be no inherent difference from the case of introduction of $H_2O$ and $CO_2$.

Further, in addition to the methods of burning substances and introducing the produced $H_2O$ and $CO_2$, the method may also be used of introducing a gas of a mixture of CO and $H_2$, $CH_4$, $C_2H_6$, $C_3H_8$, or another hydrocarbon gas, LNG or another hydrocarbon mixture, gasoline, diesel fuel, heavy oil, or another liquid hydrocarbon mixture, $CH_3OH$, $C_2H_5OH$, or another alcohol or their mixtures, various types of organic solvents, etc. simultaneously with the oxygen into the annealing furnace and burning it in the furnace to produce $H_2O$ and $CO_2$.

This method is simpler and superior in controllability compared with the method of using $N_2$ saturated with water vapor or $N_2$ raised in dew point to supply water vapor. Further, there is also no concern about condensation in the piping, so the work of insulating the piping etc. may also be eliminated.

In the present invention, the reduction time at the $PO_2$ and temperature defined in the claims is not particularly limited, but is preferably about 10 seconds to 3 minutes. If increasing the $PO_2$ in the reducing furnace, during the process of temperature rise, the sheet passes through a region where log $PO_2$ exceeds $-0.000038T^2+0.107T-90.4$, then is reduced in the region of $-0.000038T^2+0.107T-90.4$ or less, so the iron oxide film first produced is reduced. To obtain the targeted steel sheet having at least one type of Si oxides selected from $FeSiO_3$, $Fe_2SiO_4$, $MnSiO_3$, and $Mn_2SiO_4$ present at the steel sheet surface or surface side and having $SiO_2$ present at the inside surface side of the steel sheet, the sheet is preferably held there for about 10 seconds or more. However, even if held for over 3 minutes, not only is energy wasted, but also a drop in productivity is caused on a continuous line, so this is not preferred.

Further, if the $PO_2$ and the temperature of the reducing atmosphere are in the range of the present invention, the usual nonoxidizing furnace type hot dip plating method or hot dip plating using an all radiant tube type annealing furnace can be used. Whichever the exemplary method is used, in the process of raising the temperature, the sheet passes through a region where log $PO_2$ exceeds $-0.000038T^2+0.107T-90.4$ until the sheet temperature exceeds about 923K and an iron oxide film is formed on the steel sheet surface, so to reduce this and suppress the external oxidation of Si and to form at least one type of Si oxides selected from $FeSiO_3$, $Fe_2SiO_4$, $MnSiO_3$, and $Mn_2SiO_4$ at the steel sheet surface or surface side, it is sufficient to suitably control the $PO_2$ and temperature of the atmosphere in the reduction zone to within the range of the present invention.

For example, as described in Japanese Patent Publication (A) Nos. 55-122865 and 5-271891, the exemplary method of forming an oxide film on the steel sheet surface in advance, then annealing the sheet and reducing the iron oxide film may be used.

As the method for forming the iron oxide film, for example, the method of controlling the combustion air ratio to 0.9 to 1.2 in the oxidation zone so as to form an iron oxide film or the method of controlling the dew point of the oxidation zone to 273K or more to form an iron oxide film may be used.

The reason for adjusting the combustion air ratio to about 0.9 to 1.2 in range is that formation of an iron oxide film sufficient for suppressing external oxidation of Si requires a 0.9 or higher combustion air ratio. If less than about 0.9, a sufficient iron oxide film cannot be formed. Further, if the combustion air ratio exceeds about 1.2, the iron oxide film formed in the oxidation zone is too thick and peeled off oxides will stick to the rolls resulting in flaws in appearance.

Further, the reason for controlling the dew point of the oxidation zone to about 273K or more is that formation of an iron oxide film sufficient for suppressing external oxidation of Si requires a about 273K or higher dew point. If less than about 273K, a sufficient iron oxide film cannot be formed. The upper limit of the dew point is not particularly set, but considering the effects on deterioration of the facility etc., about 373K or less can be desirable.

The thickness of the oxide film is affected not only by the combustion air ratio and the dew point, but also by the line speed and peak temperature etc., so these are preferably suitably controlled for passage under conditions giving a thickness of the oxide film of about 200 to 2000 Å.

However, to end the reduction of the formed iron oxide film, the reduction time at the $PO_2$ and temperature defined in the claims is preferably made about 20 seconds or more.

Figure 5:
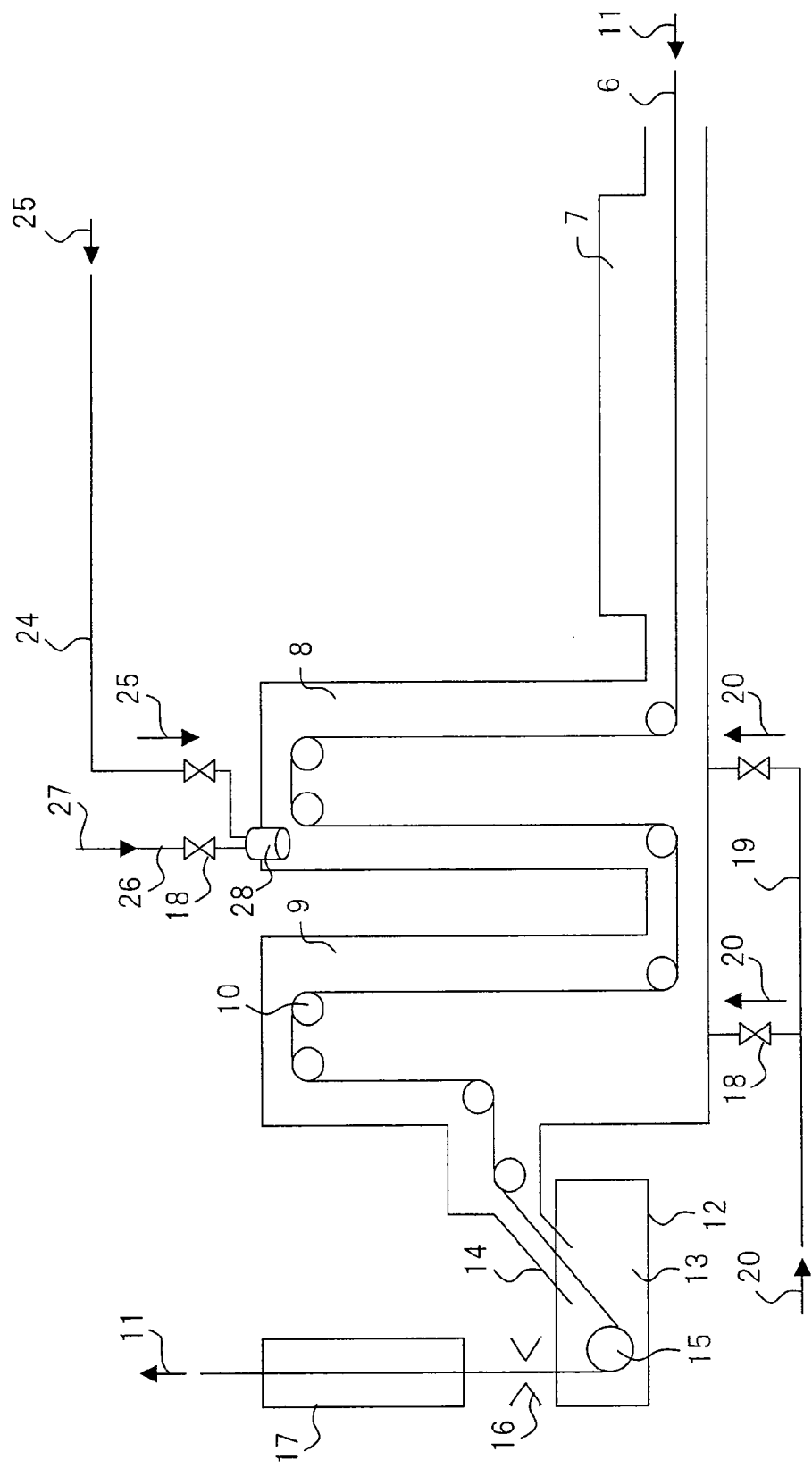
FIG. 5 is a block diagram of a production facility for hot dip galvanized steel sheet according to one exemplary embodiment of the present invention.
Figure 6:
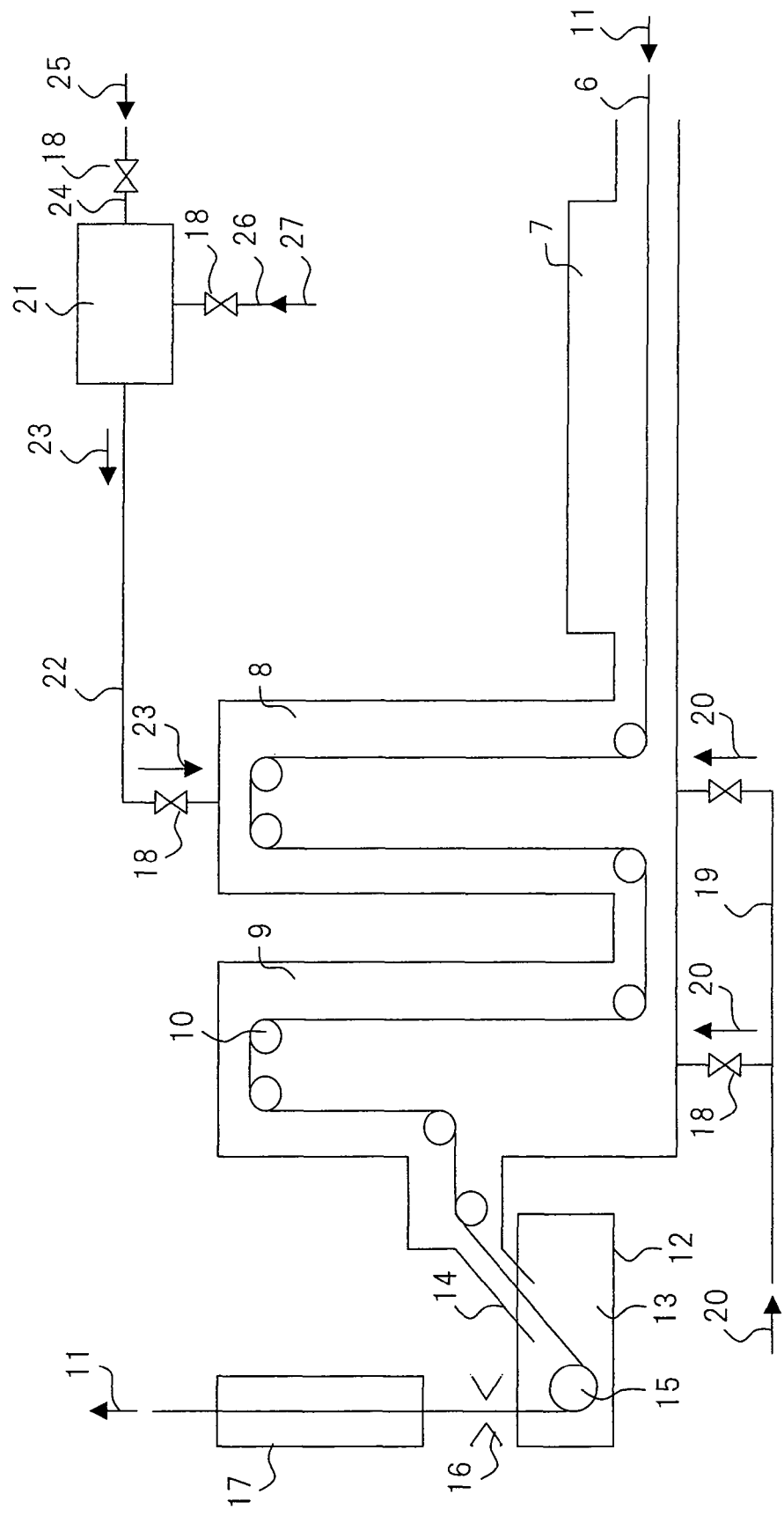
FIG. 6 is a block diagram of the production facility for hot dip galvanized steel sheet according another exemplary embodiment of the present invention.

The above method of production is made possible by installing in the reducing furnace in the continuous hot dip plating facility a device for introducing a gas comprised of $CO_2$ in about 1 to 100 vol % and the balance of $N_2$, $H_2O$, $O_2$, CO, and unavoidable impurities in this way or installing in the reducing furnace a device burning CO or hydrocarbons and generating a gas comprised of $CO_2$ in about 1 to 100 vol % and the balance of $N_2$, $H_2O$, $O_2$, CO and unavoidable impurities. Specific examples of a production facility are shown in FIGS. 5 and 6. Installing in the reducing furnace a device for introducing a gas comprised of $CO_2$ in about 1 to 100 vol % and the balance of $N_2$, $H_2O$, $O_2$, CO, and unavoidable impurities in this way or installing in the reducing furnace a device burning CO or hydrocarbons and generating a gas comprised of $CO_2$ in about 1 to 100 vol % and the balance of $N_2$, $H_2O$, $O_2$, CO and unavoidable impurities would enable control of the reducing furnace to an atmosphere giving the targeted oxide layer.

Next, the reasons for limitation of the other production conditions is provided herein. The object is to obtain a metal structure containing martensite and retained austenite in an amount of about 3 to 20% and to achieve both high strength and good press workability. If the volume percentage of the martensite and retained austenite is less than about 3%, a high strength will not be obtained. On the other hand, if the volume percentage of the martensite and retained austenite exceeds about 20%, while the strength will be high, the steel sheet will deteriorate in workability and the object of the present invention will not be achieved.

The slab used for the hot rolling is not particularly limited. It may be a continuously cast slab or a slab produced by a thin slab caster etc. Further, it may be used for a process like continuous casting-direct rolling (CC-DR) where the sheet is cast and then immediately hot rolled.

The final temperature of the hot rolling has to be the $Ar_3$ point or more from the viewpoint of securing the press formability of the steel sheet. The cooling conditions after the hot rolling and the coiling temperature are not particularly limited, but the coiling temperature is preferably made about 1023K or less so as to avoid greater fluctuation in the properties at the two ends of the coil and to avoid deterioration of the pickling ability due to the increase in scale thickness and further is preferably made about 823K or more since if bainite or martensite is partially formed, edge cracks will easily occur at the time of cold rolling and in extreme cases the sheet will even break. The cold rolling may be performed under the usual conditions. From the viewpoint of preventing ferrite from easily work hardening by finely dispersing the martensite and retained austenite and obtaining the maximum improvement in the workability, the rolling rate can be made about 50% or more. On the other hand, cold rolling by a rolling rate over about 85% requires a tremendous cold rolling load, so is not practical.

When annealing by an in-line annealing type continuous hot dip galvanization facility, the annealing temperature is made the dual-phase coexisting region of ferrite and austenite of about 1023K to 1153K. If the annealing temperature is less than about 1023K, the recrystallization is insufficient and the steel sheet cannot be given the required press workability. Annealing at a temperature over about 1153K causes a rise in production costs and hastens deterioration of the facility, so is not preferable. Further, even if gradually cooling to 923K in the process of dipping into the plating bath and cooling, a sufficient volume percentage of ferrite would not grow, so achieving both high strength and good press workability would be difficult.

The exemplary steel strip is cooled after annealing in the process of dipping into the plating bath. The cooling rate in this case is cooling from the maximum peak temperature to about 923K by an average of about 0.5 to 10 degree/second, then cooling from about 923K to 773K by an average cooling rate of about 3 degree/second or more, further cooling from about 773K by an average cooling rate of about 0.5 degree/second or more through the hot dip galvanization to about 627K and holding the time from about 773K to reaching about 623K after plating to about 25 seconds to 240 seconds.

The rate to about 923K is made an average about 0.5 to 10 degree/second so as to improve the workability by increasing the volume percentage of the ferrite and simultaneously increase the concentration of C in the austenite so as to lower the free energy produced and lower the temperature for starting the martensite transformation to the plating bath temperature or less. Making the average cooling rate to about 923K less than about 0.5 degree/second would require the line in the continuous hot dip galvanization facility to be increased in length and would increase costs, so the average cooling rate to about 923K is made about 0.5 degree/second.

To make the average cooling rate to about 923K less than 0.5 degree/second, it may be considered to lower the maximum peak temperature and anneal the sheet at a temperature with a small volume percentage of austenite, but in this case, the suitable temperature range would become narrower compared with the temperature range allowed in actual operations. If the annealing temperature is even slightly low, austenite would not be formed and the object would not be achieved.

On the other hand, if making the average cooling rate to about 923K over about 10 degree/second, not only would the increase in the volume percentage of ferrite be insufficient, but also the increase in concentration of C in the austenite would be small, so achieving both high strength and good workability would be difficult.

The average cooling rate from about 923K to 773K is made 3 degree/second or more so as to avoid the austenite transforming to pearlite in the middle of the cooling. If the cooling rate is less than about 3 degree/second, even if annealing at the temperature defined in the present invention or cooling to about 923K, formation of pearlite will not be able to be avoided. The upper limit of the average cooling rate is not particularly set, but cooling the steel strip by an average cooling rate of over about 20 degree/second would be difficult in a dry atmosphere.

The average cooling rate from about 773K is made about 0.5 degree/second or more to avoid the austenite transforming to pearlite in the middle of the cooling. If the cooling rate is less than about 0.5 degree/second, even if annealing at the temperature defined in the present invention or cooling to about 773K, formation of pearlite cannot be avoided. The upper limit of the average cooling rate is not particularly set, but cooling steel strip by an average cooling rate of over about 20 degree/second would be difficult in a dry atmosphere.

The reason for holding the time from about 773K to reaching about 623K after plating at about 25 seconds to about 240 seconds is to promote concentration of C in the austenite and obtain excellent workability high strength hot dip galvanization. If the time from about 773K to 623K after plating is less than about 25 seconds, the concentration of C in the austenite becomes insufficient and the concentration of C in the austenite will not reach the level enabling retained austenite at room temperature, while if over about 240 seconds, the bainite transformation may proceed too far, the amount of austenite can become small, and a sufficient amount of retained austenite will not be able to be formed.

In hot dip galvanization with no alloying, the sheet passes through the hot dip galvanization bath while cooling from about 773K to 623K. The average cooling rate and the time from about 773K to 623K are not issues so long as they are in the range of the present invention range. The bath temperature of the hot dip galvanization bath differs depending on the bath composition, but with the range of bath composition of the exemplary embodiment of the present invention, about 673 to 753K is suitable.

The bath composition of the plating bath may be any composition so long as the targeted plated steel sheet can be obtained, but in general a plating bath of a composition close to the targeted plating composition is used.

On the other hand, in the galvannealing, if heating for alloying while the concentration of C in the austenite is insufficient, the amount of austenite will become small and achieving both a high strength and good press workability will become difficult, so the cooling end temperature before the plating is made about 693K to 733K and the time from 773K to the plating bath is made 25 seconds to 240 seconds.

The cooling end temperature was made about 693K to 733K to promote the concentration of C in the austenite and obtain excellent workability high strength galvannealing.

The reason for making the time from about 773K to the plating bath about 25 seconds to about 240 seconds is that if less than about 25 seconds, the concentration of C in the austenite becomes insufficient and therefore the concentration of C in the austenite will not reach the level enabling retained austenite at room temperature, while if over about 240 seconds, the bainite transformation proceeds too far, the amount of austenite becomes smaller, and a sufficient amount of retained austenite cannot be formed.

Further, in the holding period from about 773K to the plating bath, if cooling and holding once to about 673K to 723K in temperature, the concentration of C in the austenite is promoted and excellent workability high strength galvannealing is obtained. However, if continuing dipping the sheet in a about 703K or less plating bath, the sheet will be cooled by the plating bath and solidify, so it is necessary to reheat it to about 703 to 743K in temperature, then perform the hot dip galvanization.

In the production of the galvannealed steel sheet of the present invention, the hot dip galvanization bath used is adjusted in Al concentration to give an effective bath Al concentration C of about 0.07 to 0.105 wt %. Here, this effective Al concentration in the plating bath means the Al concentration in the bath minus the Fe concentration in the bath.

The reason for limiting the effective Al concentration to 0.07 to 0.105 wt % is that if the effective Al concentration is lower than about 0.07%, the Fe—Al—Zn phase forming the alloying barrier at the start of the plating will be insufficiently formed and a brittle Γ phase will be formed thickly at the plated steel sheet interface at the time of plating, so only a galvannealed steel sheet inferior in plating adhesion at the time of working will be able to be obtained. On the other hand, if the effective Al concentration is higher than about 0.105%, a high temperature and long time of alloying will be required and the austenite remaining in the steel will transform to pearlite, so achieving both high strength and good workability will be difficult. Preferably, the concentration is about 0.099 wt % or less.

Further, in the present invention, the alloying is preferably performed at a galvannealing temperature T (K) satisfying:

$$720 \le T \le 690 \times \exp(1.35 \times [\text{Al }\%])$$

where [Al %]: effective bath Al concentration in galvanization bath (wt %)

One of the reasons for limiting the alloying temperature T to about 720K to $690 \times \exp(1.35 \times [\text{Al }\%])$K is that if the galvannealing temperature T is lower than about 720K, the alloying will either not proceed or the alloying will proceed insufficiently resulting in non-alloyed parts and the plating surface being covered by an η phase degrading the shapeability. Further, if T is higher than $690 \times \exp(1.35 \times [\text{Al }\%])$K, the alloying proceeds too far and a brittle Γ phase is thickly formed at the plated steel sheet interface, so the plating adhesion at the time of working falls.

The reason for limiting the time from after hot dip plating to cooling to a temperature of about 673K or less to about 30 seconds to 120 seconds is that if less than about 30 seconds, the alloying is insufficient resulting in non-alloyed parts and the plating surface being covered by an η phase degrading the shapeability, while if over about 120 seconds, the bainite transformation proceeds too far, the amount of austenite becomes smaller, and a sufficient amount of retained austenite cannot be formed.

The heating method in the galvannealing furnace in the present invention is not particularly limited. So long as the temperature of the present invention can be secured, radiant heating by a usual gas furnace or high frequency induction heating may both be used as well. Further, the method of cooling from the maximum peak temperature after the alloying heat is not an issue. So long as blocking the heat after the alloying by an air seal etc., even cooling by standing is sufficient. Gas cooling etc. for more rapid cooling is also not a problem.

EXAMPLES

Example 1

A slab comprised of each of the compositions of Table 1 was heated to 1423K and hot rolled at a final temperature of about 1183 to 1203K to obtain a 4.5 mm hot rolled sheet which was then coiled at about 853 to 953K. This was pickled, then cold rolled to obtain a 1.6 mm cold rolled steel strip, then was plated using an in-line annealing type continuous hot dip galvanization facility under the conditions shown in Table 2 to produce galvannealed steel sheet. The continuous hot dip galvanization facility used was one heating the sheet by a nonoxidizing furnace, then reducing and annealing it in a reduction zone. The nonoxidizing furnace was adjusted to a combustion air ratio of about 1.0 for use as an oxidation zone. The reduction zone was provided with a device for burning a mixed gas of CO and $H_2$ and introducing the $H_2O$ and $CO_2$ produced into $N_2$ gas containing about 10 vol % of $H_2$.

The sheet was annealed while adjusted to give the value shown in Table 2, soaked at the soaking temperature (range from maximum peak temperature−20 degrees to maximum peak temperature) for a soaking time of 60 seconds, then was cooled from the maximum peak temperature to 923K by an average cooling rate of 1 degree/second, then from 923K to 773K by an average cooling rate of 4 degree/second and further cooled from 773K by an average cooling rate of 1.7 degree/second or more down to 723K, was held up to the plating bath at 723K, was conveyed from 773K to the plating bath in 30 seconds, then was hot dip galvanized and alloyed at 773K.

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

$$H_2O=H_2+\tfrac{1}{2}O_2$$

$$CO_2=CO+\tfrac{1}{2}O_2$$

The tensile strength (TS) and elongation (El) were found by cutting out a JIS No. 5 test piece from the steel sheet and running a tensile test at ordinary temperature.

The amount of deposition of the plating was measured by dissolving the plating in hydrochloric acid containing an inhibitor then using the weight method for measurement. The Fe % in the plating was determined by dissolving the plating in hydrochloric acid containing an inhibitor and measurement by ICP.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the mass.

The presence of FeO was determined by measurement by XRD from the steel sheet surface. Sheets where no diffraction peak of FeO was observed were evaluated as Good, while ones where that diffraction peak was observed were evaluated as Poor.

The positions of $(Fe, Mn)SiO_3$, $(Fe, Mn)_2SiO_4$, and $SiO_2$ were evaluated by the following criteria by observation of oxides containing Si from the cross-section of an embedded and polished plating steel sheet by a CMA image:

Positions of $(Fe, Mn)SiO_3$ and $(Fe, Mn)_2SiO_4$

Good: Sheets with oxides where Fe or Mn and Si, O are observed at same positions observed at steel sheet surface Poor: Sheets with oxides where Fe or Mn and Si, O are observed at same positions not observed Position of $SiO_2$ Good: Sheets with oxides where Si and O are observed at same positions observed at inside of steel sheet Poor: Sheets with oxides where Si and O are observed at same positions not observed inside steel sheet The oxides containing Si present in the plating layer were evaluated by observation of embedded and polished plated steel sheet by an SEM image from its cross-section. The state of the oxides was observed by the SEM image. Sheets where the oxides containing Si were observed in the plating layer were evaluated as Good, while those with none observed were evaluated as Poor.

The content of the oxides containing Si in the plating layer was measured by dissolving the plating in hydrochloric acid containing an inhibitor, then separating the oxides containing Si, then measuring the weight.

The positions of the $(Fe, Mn)SiO_3$, $(Fe, Mn)_2SiO_4$, and $SiO_2$ were evaluated by observing the cross-section of embedded and polished plated for oxides containing Si by a CMA image. Sheets with oxides where Fe or Mn and Si, O are observed at the same positions were observed at the steel sheet surface were evaluated as Good, while sheets with oxides where Fe or Mn and Si, O were observed at the same positions were not observed were evaluated as Poor.

The plating appearance was judged by visually observing the entire length of the run coil and scoring the non-plating area percentage as follows. Scores of 3 or more were deemed passing.

4: non-plating area percentage less than 1%

3: non-plating area percentage 1% to 5%

2: non-plating area percentage 5% to less than 10%

1: non-plating area percentage 10% or more

The results of the evaluation are shown in Table 2. Nos. 5, 9, 12, 15, 17, 20, 23, 26, 30, 32, 35, 38, 42, and 45 had furnace log $PO_2$ outside the range of the present invention, so Si oxides concentrated at the steel sheet surface and non-plating occurred leading to judgment of failure in appearance. Nos. 6, 8, 11, 14, 18, 21, 24, 27, 29, 33, 36, 39, 41, and 44 had furnace log $PO_2$ outside the range of the present invention, so the oxides of Fe at the steel sheet surface could not be reduced and non-plating occurred leading to judgment of failure in appearance. The other steel sheets prepared by the method of the present invention were excellent appearance high strength galvannealed steel sheet.

TABLE 1

| | Chemical ingredients (mass %) | | | | | | | |
|---|---|---|---|---|---|---|---|---|
| Symbol | C | Si | Mn | P | S | Al | N | Ni | Cu |
| A | 0.02 | 0.73 | 1.87 | 0.006 | 0.004 | 0.045 | 0.0023 | | |
| B | 0.07 | 0.43 | 2.18 | 0.011 | 0.002 | 0.035 | 0.0028 | | |
| C | 0.07 | 0.66 | 1.55 | 0.006 | 0.003 | 0.283 | 0.0026 | | |
| D | 0.07 | 0.71 | 2.08 | 0.004 | 0.002 | 0.031 | 0.0030 | | |
| E | 0.07 | 1.14 | 1.95 | 0.007 | 0.003 | 0.037 | 0.0027 | | |
| F | 0.08 | 1.65 | 1.80 | 0.008 | 0.003 | 0.027 | 0.0035 | | |
| G | 0.10 | 0.69 | 2.32 | 0.009 | 0.004 | 0.044 | 0.0033 | | |
| H | 0.14 | 0.50 | 1.61 | 0.013 | 0.005 | 0.038 | 0.0042 | | |
| I | 0.13 | 0.36 | 2.11 | 0.011 | 0.003 | 0.026 | 0.0036 | | |
| J | 0.14 | 0.82 | 2.27 | 0.008 | 0.002 | 0.054 | 0.0034 | | |
| K | 0.18 | 0.94 | 2.77 | 0.018 | 0.004 | 0.037 | 0.0039 | | |
| L | 0.08 | 1.83 | 2.35 | 0.004 | 0.005 | 0.063 | 0.0030 | | |
| M | 0.09 | 1.78 | 1.13 | 0.008 | 0.001 | 0.29 | 0.0027 | | |
| N | 0.07 | 1.14 | 1.95 | 0.007 | 0.003 | 0.037 | 0.0027 | 0.5 | 0.1 |
| O | 0.08 | 1.83 | 2.35 | 0.004 | 0.005 | 0.063 | 0.0030 | 1.5 | |

TABLE 2

| Sample No. | Steel sheet symbol | Max. peak temp. T (K) | −0.000034T² + 0.105T − 0.2 [Si%]² + 2.1 [Si%] − 98.8 | Reduction zone logPO2 | −0.000038T² + 0.107T − 90.4 | Tensile strength (MPa) | Elongation (%) | Plating deposition (g/m2) | Plating Fe % | State | Internal oxidation layer of steel sheet Thickness (μm) | Composition | Internal oxidation layer Average content (%) | FeO presence | (Fe,Mn)SiO3, (Fe,Mn)2SiO4 presence/position | SiO2 position | Si oxides of plating layer State | Average content (%) | (Fe,Mn)SiO3, (Fe,Mn)2SiO4 presence/position | Appearance | Remarks |
|---|---|---|---|---|---|---|---|---|---|---|---|---|---|---|---|---|---|---|---|---|---|
| 1 | E | 1093 | −22.5 | −22 | −18.8 | 621 | 36 | 45 | 10.5 | Good | 0.9 | Good | 2.4 | Good | Poor | Good | Good | 0.2 | Good | 4 | Inv. ex. |
| 2 | E | 1103 | −22.2 | −21 | −18.6 | 618 | 36 | 45 | 10.2 | Good | 2.4 | Good | 3.2 | Good | Good | Good | Good | 0.3 | Good | 4 | Inv. ex. |
| 3 | E | 1113 | −21.9 | −20 | −18.4 | 614 | 37 | 45 | 10.7 | Good | 3.1 | Good | 3.8 | Good | Good | Good | Good | 0.4 | Good | 4 | Inv. ex. |
| 4 | E | 1123 | −21.6 | −19 | −18.2 | 623 | 36 | 45 | 10.4 | Good | 4.2 | Good | 4.6 | Good | Good | Good | Good | 0.5 | Good | 4 | Inv. ex. |
| 5 | E | 1093 | −22.5 | −23 | −18.8 | 627 | 36 | 45 | 4.6 | Poor | — | — | — | Good | Poor | Poor | Poor | <0.01 | Poor | 1 | Comp. ex. |
| 6 | E | 1123 | −21.6 | −18 | −18.2 | 610 | 36 | 45 | 6.1 | Poor | — | — | — | Poor | Poor | Poor | Poor | <0.01 | Poor | 2 | Comp. ex. |
| 7 | B | 1033 | −25.8 | −20 | −20.4 | 602 | 35 | 45 | 11.1 | Good | 2.7 | Good | 0.9 | Good | Good | Good | Good | 0.1 | Good | 4 | Inv. ex. |
| 8 | B | 1043 | −25.4 | −19 | −20.1 | 598 | 35 | 45 | 5.8 | Poor | — | — | — | Poor | Poor | Poor | Poor | <0.01 | Poor | 2 | Comp. ex. |
| 9 | B | 1063 | −24.7 | −25 | −19.6 | 609 | 35 | 45 | 4.9 | Poor | — | — | — | Good | Poor | Poor | Poor | <0.01 | Poor | 1 | Comp. ex. |
| 10 | C | 1053 | −24.6 | −20 | −19.9 | 548 | 38 | 45 | 10.6 | Good | 3.2 | Good | 2.1 | Good | Good | Good | Good | 0.2 | Good | 4 | Inv. ex. |
| 11 | C | 1063 | −24.3 | −19 | −19.6 | 543 | 38 | 45 | 6 | Poor | — | — | | | | | | | | | |
| 12 | C | 1083 | −23.7 | −24 | −19.1 | 552 | 38 | 45 | 4.5 | Poor | — | — | | | | | | | | | |
| 13 | D | 1103 | −23.0 | −21 | −18.6 | 729 | 28 | 45 | 9.9 | Good | 2.5 | Good | | | | | | | | | |
| 14 | D | 1103 | −23.0 | −18 | −18.6 | 738 | 28 | 45 | 6.1 | Poor | — | — | | | | | | | | | |
| 15 | D | 1083 | −23.6 | −24 | −19.1 | 733 | 28 | 45 | 4.5 | Poor | — | — | | | | | | | | | |
| 16 | F | 1073 | −22.4 | −21 | −19.3 | 624 | 35 | 45 | 10.8 | Good | 3.8 | Good | | | | | | | | | |
| 17 | F | 1083 | −22.0 | −23 | −19.1 | 617 | 35 | 45 | 4.1 | Poor | — | — | | | | | | | | | |
| 18 | F | 1103 | −21.4 | −18 | −18.6 | 620 | 35 | 45 | 6.2 | Poor | — | — | | | | | | | | | |
| 19 | G | 1043 | −24.9 | −21 | −20.1 | 781 | 29 | 45 | 10 | Good | 3 | Good | | | | | | | | | |
| 20 | G | 1053 | −24.6 | −19 | −19.9 | 785 | 29 | 45 | 4.7 | Poor | — | — | | | | | | | | | |
| 21 | G | 1073 | −23.9 | −24 | −19.3 | 787 | 29 | 45 | 5.8 | Poor | — | — | | | | | | | | | |
| 22 | H | 1063 | −24.6 | −20 | −19.6 | 633 | 26 | 45 | 10.9 | Good | 2.3 | Good | | | | | | | | | |
| 23 | H | 1083 | −24.0 | −18 | −19.1 | 631 | 26 | 45 | 5 | Poor | — | — | | | | | | | | | |
| 24 | H | 1053 | −24.9 | −25 | −19.9 | 639 | 26 | 45 | 5.9 | Poor | — | — | | | | | | | | | |
| 25 | I | 1043 | −25.5 | −21 | −20.1 | 685 | 22 | 45 | 10.3 | Good | 1.9 | Good | | | | | | | | | |
| 26 | I | 1063 | −24.9 | −19 | −19.6 | 672 | 22 | 45 | 5.2 | Poor | — | — | | | | | | | | | |
| 27 | I | 1033 | −25.9 | −26 | −20.4 | 669 | 22 | 45 | 6 | Poor | — | — | | | | | | | | | |
| 28 | J | 1043 | −24.7 | −21 | −20.1 | 832 | 27 | 45 | 10.7 | Good | 4.1 | Good | | | | | | | | | |
| 29 | J | 1093 | −23.1 | −18 | −18.8 | 819 | 27 | 45 | 6.3 | Poor | — | — | | | | | | | | | |
| 30 | J | 1053 | −24.3 | −25 | −19.9 | 825 | 27 | 45 | 4.8 | Poor | — | — | | | | | | | | | |
| 31 | K | 1043 | −24.5 | −21 | −20.1 | 1125 | 8 | 45 | 11 | Good | 4.6 | Good | | | | | | | | | |
| 32 | K | 1053 | −24.1 | −25 | −19.9 | 1121 | 8 | 45 | 4.2 | Poor | — | — | | | | | | | | | |
| 33 | K | 1073 | −23.5 | −20 | −19.3 | 1117 | 8 | 45 | 6.1 | Poor | — | — | | | | | | | | | |
| 34 | L | 1103 | −21.2 | −19 | −18.6 | 879 | 27 | 45 | 10.5 | Good | 5 | Good | | | | | | | | | |
| 35 | L | 1113 | −20.9 | −21 | −18.4 | 884 | 27 | 45 | 3.6 | Poor | — | — | | | | | | | | | |
| 36 | L | 1093 | −21.5 | −18 | −18.8 | 892 | 27 | 45 | 5.8 | Poor | — | — | | | | | | | | | |
| 37 | M | 1103 | −21.2 | −20 | −18.6 | 784 | 27 | 45 | 10 | Good | 4.4 | Good | | | | | | | | | |
| 38 | M | 1113 | −20.9 | −22 | −18.4 | 780 | 27 | 45 | 4 | Poor | — | — | | | | | | | | | |
| 39 | M | 1093 | −21.5 | −18 | −18.8 | 786 | 27 | 45 | 5.7 | Poor | — | — | | | | | | | | | |
| 40 | N | 1073 | −23.1 | −20 | −19.3 | 612 | 37 | 45 | 10.6 | Good | 3.9 | Good | | | | | | | | | |
| 41 | N | 1093 | −22.5 | −18 | −18.8 | 627 | 37 | 45 | 6 | Poor | — | — | | | | | | | | | |
| 42 | N | 1123 | −21.6 | −22 | −18.2 | 618 | 37 | 45 | 4.6 | Poor | — | — | | | | | | | | | |
| 43 | O | 1103 | −21.2 | −20 | −18.6 | 881 | 27 | 45 | 10.1 | Good | 4.8 | Good | | | | | | | | | |
| 44 | O | 1113 | −20.9 | −18 | −18.4 | 876 | 27 | 45 | 5.9 | Poor | — | — | | | | | | | | | |
| 45 | O | 1093 | −21.5 | −22 | −18.8 | 880 | 27 | 45 | 3.5 | Poor | — | — | | | | | | | | | |

TABLE 2-continued

| | | | | | | | | | |
|---|---|---|---|---|---|---|---|---|---|
| 11 | — | Poor | Poor | Poor | Poor | <0.01 | Poor | 2 | Comp. ex. |
| 12 | — | Good | Poor | Poor | Poor | <0.01 | Poor | 1 | Comp. ex. |
| 13 | 2.9 | Good | Good | Good | Good | 0.3 | Good | 4 | Inv. ex. |
| 14 | — | Poor | Poor | Poor | Poor | <0.01 | Poor | 2 | Comp. ex. |
| 15 | — | Good | Poor | Poor | Poor | <0.01 | Poor | 1 | Comp. ex. |
| 16 | 4 | Good | Good | Good | Good | 0.4 | Good | 4 | Inv. ex. |
| 17 | — | Good | Poor | Poor | Poor | <0.01 | Poor | 1 | Comp. ex. |
| 18 | — | Poor | Poor | Poor | Poor | <0.01 | Poor | 2 | Comp. ex. |
| 19 | 1.7 | Good | Good | Good | Good | 0.2 | Good | 4 | Inv. ex. |
| 20 | — | Good | Poor | Poor | Poor | <0.01 | Poor | 2 | Comp. ex. |
| 21 | — | Poor | Poor | Poor | Poor | <0.01 | Poor | 1 | Comp. ex. |
| 22 | 1.3 | Good | Good | Good | Good | 0.1 | Good | 4 | Inv. ex. |
| 23 | — | Good | Poor | Poor | Poor | <0.01 | Poor | 1 | Comp. ex. |
| 24 | — | Poor | Poor | Poor | Poor | <0.01 | Poor | 2 | Comp. ex. |
| 25 | 0.8 | Good | Good | Good | Good | 0.1 | Good | 4 | Inv. ex. |
| 26 | — | Good | Poor | Poor | Poor | <0.01 | Poor | 1 | Comp. ex. |
| 27 | — | Poor | Poor | Poor | Poor | <0.01 | Poor | 2 | Comp. ex. |
| 28 | 1.7 | Good | Good | Good | Good | 0.2 | Good | 4 | Inv. ex. |
| 29 | — | Poor | Poor | Poor | Poor | <0.01 | Poor | 2 | Comp. ex. |
| 30 | — | Good | Poor | Poor | Poor | <0.01 | Poor | 1 | Comp. ex. |
| 31 | 3.5 | Good | Good | Good | Good | 0.4 | Good | 4 | Inv. ex. |
| 32 | — | Good | Poor | Poor | Poor | <0.01 | Poor | 1 | Comp. ex. |
| 33 | — | Poor | Poor | Poor | Poor | <0.01 | Poor | 2 | Comp. ex. |
| 34 | 8.3 | Good | Good | Good | Good | 0.8 | Good | 4 | Inv. ex. |
| 35 | — | Good | Poor | Poor | Poor | <0.01 | Poor | 1 | Comp. ex. |
| 36 | — | Poor | Poor | Poor | Poor | <0.01 | Poor | 2 | Comp. ex. |
| 37 | 5.9 | Good | Good | Good | Good | 0.6 | Good | 4 | Inv. ex. |
| 38 | — | Good | Poor | Poor | Poor | <0.01 | Poor | 1 | Comp. ex. |
| 39 | — | Poor | Poor | Poor | Poor | <0.01 | Poor | 2 | Comp. ex. |
| 40 | 4.2 | Good | Good | Good | Good | 0.4 | Good | 4 | Inv. ex. |
| 41 | — | Poor | Poor | Poor | Poor | <0.01 | Poor | 2 | Comp. ex. |
| 42 | — | Good | Poor | Poor | Poor | <0.01 | Poor | 1 | Comp. ex. |
| 43 | 7.1 | Good | Good | Good | Good | 0.7 | Good | 4 | Inv. ex. |
| 44 | — | Poor | Poor | Poor | Poor | <0.01 | Poor | 2 | Comp. ex. |
| 45 | — | Good | Poor | Poor | Poor | <0.01 | Poor | 1 | Comp. ex. |

Example 2

A slab comprised of each of the compositions of Table 1 was heated to 1423K and hot rolled at a final temperature of 1183 to 1203K to obtain a 4.5 mm hot rolled sheet which was then coiled at 853 to 953K. This was pickled, then cold rolled to obtain a 1.6 mm cold rolled steel strip, then was plated using an in-line annealing type continuous hot dip galvanization facility under the conditions shown in Table 3 to produce galvannealed steel sheet. The continuous hot dip galvanization facility used was one heating the sheet by a nonoxidizing furnace, then reducing and annealing it in a reduction zone. The nonoxidizing furnace and the zone raising the temperature using its waste heat were adjusted to a dew point of 283K for use as an oxidation zone. The reduction zone was provided with a device for burning a mixed gas of CO and $H_2$ and introducing the $H_2O$ and $CO_2$ produced into $N_2$ gas containing 10 vol % of $H_2$.

The sheet was annealed while adjusted to give the value shown in Table 3, soaked at the soaking temperature (range from maximum peak temperature–20 degrees to maximum peak temperature) for a soaking time of 60 seconds, then was cooled from the maximum peak temperature to 923K by an average cooling rate of 1 degree/second, then from 923K to 773K by an average cooling rate of 4 degree/second and further cooled from 773K by an average cooling rate of 1.7 degree/second or more down to 723K, was held up to the plating bath at 723K, was conveyed from 773K to the plating bath in 30 seconds, then was hot dip galvanized and alloyed at 773K.

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

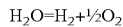

$H_2O=H_2+\frac{1}{2}O_2$

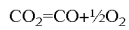

$CO_2=CO+\frac{1}{2}O_2$

The tensile strength (TS) and elongation (El) were found by cutting out a JIS No. 5 test piece from the steel sheet and running a tensile test at ordinary temperature.

The amount of deposition of the plating was measured by dissolving the plating in hydrochloric acid containing an inhibitor then using the weight method for measurement. The Fe % in the plating was determined by dissolving the plating in hydrochloric acid containing an inhibitor and measurement by ICP.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the weight.

The presence of FeO was determined by measurement by XRD from the steel sheet surface. Sheets where no diffraction peak of FeO was observed were evaluated as Good, while ones where that diffraction peak was observed were evaluated as Poor.

The positions of (Fe, Mn)$SiO_3$, (Fe, Mn)$_2SiO_4$, and $SiO_2$ were evaluated by the following criteria by observation of oxides containing Si from the cross-section of an embedded and polished plating steel sheet by a CMA image:

Positions of (Fe, Mn)$SiO_3$ and (Fe, Mn)$_2SiO_4$

Good: Sheets with oxides where Fe or Mn and Si, O are observed at same positions observed at steel sheet surface Poor: Sheets with oxides where Fe or Mn and Si, O are observed at same positions not observed Position of $SiO_2$ Good: Sheets with oxides where Si and O are observed at same positions observed at inside of steel sheet Poor: Sheets with oxides where Si and O are observed at same positions not observed inside steel sheet The oxides containing Si present in the plating layer were evaluated by observation of embedded and polished plated steel sheet by an SEM image from its cross-section. The state of the oxides was observed by the SEM image. Sheets where the oxides containing Si were observed in the plating layer were evaluated as Good, while those with none observed were evaluated as Poor.

The content of the oxides containing Si in the plating layer was measured by dissolving the plating in hydrochloric acid containing an inhibitor, then separating the oxides containing Si, then measuring the mass.

The positions of (Fe, Mn)$SiO_3$, (Fe, Mn)$_2SiO_4$, and $SiO_2$ were evaluated by the following criteria by observation of oxides containing Si from the cross-section of an embedded and polished plating steel sheet by a CMA image. Sheets with oxides where Fe or Mn and Si, O were observed at the same positions were observed at the steel sheet surface were evaluated as Good, while sheets with oxides where Fe or Mn and Si, O were observed at the same positions were not observed were evaluated as Poor.

The plating appearance was judged by visually observing the entire length of the run coil and scoring the non-plating area percentage as follows. Scores of 3 or more were deemed passing.

4: non-plating area percentage less than 1%
3: non-plating area percentage 1% to less than 5%
2: non-plating area percentage 5% to less than 10%
1: non-plating area percentage 10% or more The results of the evaluation are shown in Table 3. Nos. 5, 9, 12, 15, 17, 20, 23, 26, 30, 32, 35, 38, 42, and 45 had furnace log $PO_2$ outside the range of the present invention, so Si oxides concentrated at the steel sheet surface and non-plating occurred leading to judgment of failure in appearance. Nos. 6, 8, 11, 14, 18, 21, 24, 27, 29, 33, 36, 39, 41, and 44 had furnace log $PO_2$ outside the range of the present invention, so oxides of Fe at the steel sheet surface could not be reduced and non-plating occurred leading to judgment of failure in appearance. The other steel sheets prepared by the method of the present invention were excellent appearance high strength galvannealed steel sheet.

TABLE 3

| Sample No. | Steel sheet symbol | Max. peak temp. T (K) | $-0.000034T^2 + 0.105T - 0.2$ $[Si\%]^2 + 2.1$ $[Si\%] - 98.8$ | Reduction zone logPO2 | $-0.000038T^2 + 0.107T - 90.4$ | Tensile strength (MPa) | Elongation (%) | Plating deposition (g/m2) | Plating Fe % | State | Internal oxidation layer of steel sheet Thickness (μm) | Composition |
|---|---|---|---|---|---|---|---|---|---|---|---|---|
| 1 | E | 1093 | −22.5 | −22 | −18.8 | 622 | 36 | 45 | 10.3 | Good | 0.9 | Good |
| 2 | E | 1103 | −22.2 | −21 | −18.6 | 615 | 36 | 45 | 10.4 | Good | 2.4 | Good |

TABLE 3-continued

| | | | | | | | | | | | | |
|---|---|---|---|---|---|---|---|---|---|---|---|---|
| 3 | E | 1113 | −21.9 | −20 | −18.4 | 609 | 37 | 45 | 10.1 | Good | 3.1 | Good |
| 4 | E | 1123 | −21.6 | −19 | −18.2 | 617 | 36 | 45 | 10.8 | Good | 4.2 | Good |
| 5 | E | 1093 | −22.5 | −23 | −18.8 | 623 | 36 | 45 | 5.2 | Poor | — | — |
| 6 | E | 1123 | −21.6 | −18 | −18.2 | 616 | 36 | 45 | 6.5 | Poor | — | — |
| 7 | B | 1033 | −25.8 | −20 | −20.4 | 602 | 35 | 45 | 10.9 | Good | 2.8 | Good |
| 8 | B | 1043 | −25.4 | −19 | −20.1 | 596 | 35 | 45 | 5.6 | Poor | — | — |
| 9 | B | 1063 | −24.7 | −25 | −19.6 | 607 | 35 | 45 | 4.7 | Poor | — | — |
| 10 | C | 1053 | −24.6 | −20 | −19.9 | 546 | 38 | 45 | 10.7 | Good | 3.3 | Good |
| 11 | C | 1063 | −24.3 | −19 | −19.6 | 544 | 38 | 45 | 6.1 | Poor | — | — |
| 12 | C | 1083 | −23.7 | −24 | −19.1 | 553 | 38 | 45 | 4.6 | Poor | — | — |
| 13 | D | 1103 | −23.0 | −21 | −18.6 | 730 | 28 | 45 | 10.2 | Good | 2.4 | Good |
| 14 | D | 1103 | −23.0 | −18 | −18.6 | 739 | 28 | 45 | 6.4 | Poor | — | — |
| 15 | D | 1083 | −23.6 | −24 | −19.1 | 735 | 28 | 45 | 4.9 | Poor | — | — |
| 16 | F | 1073 | −22.4 | −21 | −19.3 | 621 | 35 | 45 | 10.6 | Good | 4 | Good |
| 17 | F | 1083 | −22.0 | −23 | −19.1 | 614 | 35 | 45 | 4.1 | Poor | — | — |
| 18 | F | 1103 | −21.4 | −18 | −18.6 | 617 | 35 | 45 | 6.3 | Poor | — | — |
| 19 | G | 1043 | −24.9 | −21 | −20.1 | 783 | 29 | 45 | 9.9 | Good | 2.9 | Good |
| 20 | G | 1053 | −24.6 | −19 | −19.9 | 777 | 29 | 45 | 4.6 | Poor | — | — |
| 21 | G | 1073 | −23.9 | −24 | −19.3 | 775 | 29 | 45 | 5.7 | Poor | — | — |
| 22 | H | 1063 | −24.6 | −20 | −19.6 | 632 | 26 | 45 | 11.1 | Good | 2.4 | Good |
| 23 | H | 1083 | −24.0 | −18 | −19.1 | 639 | 26 | 45 | 4.9 | Poor | — | — |
| 24 | H | 1053 | −24.9 | −25 | −19.9 | 629 | 26 | 45 | 6.2 | Poor | — | — |
| 25 | I | 1043 | −25.5 | −21 | −20.1 | 668 | 22 | 45 | 10.2 | Good | 2.1 | Good |
| 26 | I | 1063 | −24.9 | −19 | −19.6 | 671 | 22 | 45 | 5.1 | Poor | — | — |
| 27 | I | 1033 | −25.9 | −26 | −20.4 | 675 | 22 | 45 | 5.9 | Poor | — | — |
| 28 | J | 1043 | −24.7 | −21 | −20.1 | 830 | 27 | 45 | 10.7 | Good | 4.3 | Good |
| 29 | J | 1093 | −23.1 | −18 | −18.8 | 820 | 27 | 45 | 6.2 | Poor | — | — |
| 30 | J | 1053 | −24.3 | −25 | −19.9 | 826 | 27 | 45 | 4.9 | Poor | — | — |
| 31 | K | 1043 | −24.5 | −21 | −20.1 | 1124 | 8 | 45 | 10.9 | Good | 4.5 | Good |
| 32 | K | 1053 | −24.1 | −25 | −19.9 | 1118 | 8 | 45 | 4.3 | Poor | — | — |
| 33 | K | 1073 | −23.5 | −20 | −19.3 | 1230 | 8 | 45 | 6.2 | Poor | — | — |
| 34 | L | 1103 | −21.2 | −19 | −18.6 | 877 | 27 | 45 | 9.9 | Good | 4.9 | Good |
| 35 | L | 1113 | −20.9 | −21 | −18.4 | 882 | 27 | 45 | 3.5 | Poor | — | — |
| 36 | L | 1093 | −21.5 | −18 | −18.8 | 889 | 27 | 45 | 5.7 | Poor | — | — |
| 37 | M | 1103 | −21.2 | −20 | −18.6 | 785 | 27 | 45 | 10.5 | Good | 4.4 | Good |
| 38 | M | 1113 | −20.9 | −22 | −18.4 | 781 | 27 | 45 | 3.9 | Poor | — | — |
| 39 | M | 1093 | −21.5 | −18 | −18.8 | 787 | 27 | 45 | 5.8 | Poor | — | — |
| 40 | N | 1073 | −23.1 | −20 | −19.3 | 615 | 37 | 45 | 10.6 | Good | 3.8 | Good |
| 41 | N | 1093 | −22.5 | −18 | −18.8 | 625 | 37 | 45 | 6 | Poor | — | — |
| 42 | N | 1123 | −21.6 | −22 | −18.2 | 618 | 37 | 45 | 4.5 | Poor | — | — |
| 43 | O | 1103 | −21.2 | −20 | −18.6 | 879 | 27 | 45 | 10.3 | Good | 4.8 | Good |
| 44 | O | 1113 | −20.9 | −18 | −18.4 | 873 | 27 | 45 | 6.2 | Poor | — | — |
| 45 | O | 1093 | −21.5 | −22 | −18.8 | 882 | 27 | 45 | 3.3 | Poor | — | — |

| | Internal oxidation layer of steel sheet | | | | Si oxides of plating layer | | | | |
|---|---|---|---|---|---|---|---|---|---|
| Sample No. | Average content (%) | FeO presence | (Fe,Mn)SiO3, (Fe,Mn)2SiO4 presence/ position | SiO2 position | State | Average content (%) | (Fe,Mn)SiO3, (Fe,Mn)2SiO4 presence/ position | Appearance | Remarks |
| 1 | 2.3 | Good | Poor | Good | Good | 0.2 | Good | 4 | Inv. ex. |
| 2 | 3.2 | Good | Good | Good | Good | 0.3 | Good | 4 | " |
| 3 | 3.9 | Good | Good | Good | Good | 0.4 | Good | 4 | " |
| 4 | 4.5 | Good | Good | Good | Good | 0.5 | Good | 4 | " |
| 5 | — | Good | Poor | Poor | Poor | <0.01 | Poor | 1 | Comp. ex. |
| 6 | — | Poor | Poor | Poor | Poor | <0.01 | Poor | 2 | Comp. ex. |
| 7 | 0.8 | Good | Good | Good | Good | 0.1 | Good | 4 | Inv. ex. |
| 8 | — | Poor | Poor | Poor | Poor | <0.01 | Poor | 2 | Comp. ex. |
| 9 | — | Good | Poor | Poor | Poor | <0.01 | Poor | 1 | Comp. ex. |
| 10 | 2.2 | Good | Good | Good | Good | 0.2 | Good | 4 | Inv. ex. |
| 11 | — | Poor | Poor | Poor | Poor | <0.01 | Poor | 2 | Comp. ex. |
| 12 | — | Good | Poor | Poor | Poor | <0.01 | Poor | 1 | Comp. ex. |
| 13 | 3 | Good | Good | Good | Good | 0.3 | Good | 4 | Inv. ex. |
| 14 | — | Poor | Poor | Poor | Poor | <0.01 | Poor | 2 | Comp. ex. |
| 15 | — | Good | Poor | Poor | Poor | <0.01 | Poor | 1 | Comp. ex. |
| 16 | 4.1 | Good | Good | Good | Good | 0.4 | Good | 4 | Inv. ex. |
| 17 | — | Good | Poor | Poor | Poor | <0.01 | Poor | 1 | Comp. ex. |
| 18 | — | Poor | Poor | Poor | Poor | <0.01 | Poor | 2 | Comp. ex. |

TABLE 3-continued

| | | | | | | | | | |
|---|---|---|---|---|---|---|---|---|---|
| 19 | 1.8 | Good | Good | Good | Good | 0.2 | Good | 4 | Inv. ex. |
| 20 | — | Good | Poor | Poor | Poor | <0.01 | Poor | 2 | Comp. ex. |
| 21 | — | Poor | Poor | Poor | Poor | <0.01 | Poor | 1 | Comp. ex. |
| 22 | 1.3 | Good | Good | Good | Good | 0.1 | Good | 4 | Inv. ex. |
| 23 | — | Good | Poor | Poor | Poor | <0.01 | Poor | 1 | Comp. ex. |
| 24 | — | Poor | Poor | Poor | Poor | <0.01 | Poor | 2 | Comp. ex. |
| 25 | 0.9 | Good | Good | Good | Good | 0.1 | Good | 4 | Inv. ex. |
| 26 | — | Good | Poor | Poor | Poor | <0.01 | Poor | 1 | Comp. ex. |
| 27 | — | Poor | Poor | Poor | Poor | <0.01 | Poor | 2 | Comp. ex. |
| 28 | 1.9 | Good | Good | Good | Good | 0.2 | Good | 4 | Inv. ex. |
| 29 | — | Poor | Poor | Poor | Poor | <0.01 | Poor | 2 | Comp. ex. |
| 30 | — | Good | Poor | Poor | Poor | <0.01 | Poor | 1 | Comp. ex. |
| 31 | 3.7 | Good | Good | Good | Good | 0.4 | Good | 4 | Inv. ex. |
| 32 | — | Good | Poor | Poor | Poor | <0.01 | Poor | 1 | Comp. ex. |
| 33 | — | Poor | Poor | Poor | Poor | <0.01 | Poor | 2 | Comp. ex. |
| 34 | 8.2 | Good | Good | Good | Good | 0.8 | Good | 4 | Inv. ex. |
| 35 | — | Good | Poor | Poor | Poor | <0.01 | Poor | 1 | Comp. ex. |
| 36 | — | Poor | Poor | Poor | Poor | <0.01 | Poor | 2 | Comp. ex. |
| 37 | 6.2 | Good | Good | Good | Good | 0.6 | Good | 4 | Inv. ex. |
| 38 | — | Good | Poor | Poor | Poor | <0.01 | Poor | 1 | Comp. ex. |
| 39 | — | Poor | Poor | Poor | Poor | <0.01 | Poor | 2 | Comp. ex. |
| 40 | 4.4 | Good | Good | Good | Good | 0.4 | Good | 4 | Inv. ex. |
| 41 | — | Poor | Poor | Poor | Poor | <0.01 | Poor | 2 | Comp. ex. |
| 42 | — | Good | Poor | Poor | Poor | <0.01 | Poor | 1 | Comp. ex. |
| 43 | 6.8 | Good | Good | Good | Good | 0.7 | Good | 4 | Inv. ex. |
| 44 | — | Poor | Poor | Poor | Poor | <0.01 | Poor | 2 | Comp. ex. |
| 45 | — | Good | Poor | Poor | Poor | <0.01 | Poor | 1 | Comp. ex. |

Example 3

A slab of each composition shown in Table 1 was heated to 1423K and hot rolled at a final temperature of 1183 to 1203K to obtain a 4.5 mm hot rolled sheet which was then coiled at 853 to 953K. This was pickled, then cold rolled to obtain a 1.6 mm cold rolled steel strip, then was plated using an in-line annealing type continuous hot dip galvanization facility under the conditions shown in Table 3 to produce hot dip galvannealed steel sheet. The continuous hot dip galvanization facility used was one heating the sheet by a nonoxidizing furnace, then reducing and annealing it in a reduction zone. The nonoxidizing furnace and the zone raising the temperature using its waste heat were adjusted to a dew point of 283K for use as an oxidation zone, while the nonoxidizing furnace was adjusted to a combustion air ratio of 1.0 for use as an oxidation zone. The reduction zone was provided with a device for burning a mixed gas of CO and $H_2$ and introducing the $H_2O$ and $CO_2$ produced into $N_2$ gas containing 10 vol % of $H_2$. The log $PO_2$ of the oxygen potential in the furnace was adjusted to give the value shown in Table 3.

The sheet was annealed while adjusted to give the value shown in Table 3 and was soaked at the soaking temperature (range from maximum peak temperature–20 degrees to maximum peak temperature) for a soaking time of 60 seconds.

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

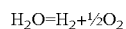

$$H_2O = H_2 + \tfrac{1}{2}O_2$$

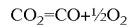

$$CO_2 = CO + \tfrac{1}{2}O_2$$

The tensile strength (TS) and elongation (El) were found by cutting out a JIS No. 5 test piece from the steel sheet and running a tensile test at ordinary temperature.

The amount of deposition of the plating was measured by dissolving the plating in hydrochloric acid containing an inhibitor then using the weight method for measurement. The Fe % in the plating was determined by dissolving the plating in hydrochloric acid containing an inhibitor and measurement by ICP.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the weight.

The oxides containing Si present in the plating layer were evaluated by observation of embedded and polished plated steel sheet by an SEM image from its cross-section. The state of the oxides was observed by the SEM image. Sheets where the oxides containing Si were observed in the plating layer were evaluated as Good, while those with none observed were evaluated as Poor.

The content of the oxides containing Si in the plating layer was measured by dissolving the plating in hydrochloric acid containing an inhibitor, then separating the oxides containing Si, then measuring the weight.

The plating appearance was judged by scoring the non-plating area percentage of the coil as follows: Scores of 3 or more were deemed passing.

4: non-plating area percentage less than 1%
3: non-plating area percentage 1% to less than 5%
2: non-plating area percentage 5% to less than 10%
1: non-plating area percentage 10% or more The results of the evaluation are shown in Table 3. The method of the present invention enables high strength hot dip galvannealed steel sheet excellent in plating wettability to be produced.

In particular, the methods of production shown in Nos. 1, 2, 3, 4, 6, 7, 9, 10, 11, 12, 15, 16, 17, 18, 19, 20, 24, 25, 26, 28, 29, and 30 are suitable in cooling rate in the annealing furnace, effective Al concentration in the hot dip galvanization bath, and alloying temperature, so can produce excellent workability high strength galvannealed steel sheet.

TABLE 4

| Sample No. | Steel sheet symbol | Max. peak temp. at annealing (K) | Reduction zone log PO2 | Aver. cooling rate to 650 K (°/sec) | Aver. cooling rate to 500 K (°/sec) | Cooling end temp. (K) | Aver. cooling rate to cooling end (°/sec) | Hold. time 500° C. to plating bath (sec) | Eff. Al conc. (%) | Bath temp. (K) | Galvannealing temp. (K) | Time to 400° C. (sec) |
|---|---|---|---|---|---|---|---|---|---|---|---|---|
| 1 | A | 1043 | −22 | 5 | 15 | 723 | 10 | 5 | 0.098 | 723 | 773 | 60 |
| 2 | B | 1033 | −23 | 2 | 8 | 723 | 1.7 | 30 | 0.098 | 723 | 773 | 60 |
| 3 | B | 1033 | −23 | 2 | 8 | 738 | 1.2 | 30 | 0.098 | 738 | 773 | 60 |
| 4 | B | 1033 | −23 | 2 | 8 | 713 | 2 | 30 | 0.098 | 713 | 773 | 60 |
| 5 | B | 993 | −23 | 2 | 8 | 723 | 1.7 | 30 | 0.098 | 723 | 773 | 60 |
| 6 | C | 1053 | −22 | 3 | 10 | 723 | 1.3 | 40 | 0.098 | 723 | 763 | 60 |
| 7 | C | 1053 | −22 | 3 | 10 | 723 | 1.3 | 40 | 0.098 | 723 | 783 | 50 |
| 8 | C | 1073 | −22 | 3 | 6 | 723 | 1.7 | 30 | 0.098 | 723 | 823 | 50 |
| 9 | D | 1043 | −22 | 1 | 6 | 723 | 1.4 | 35 | 0.098 | 723 | 773 | 60 |
| 10 | D | 1103 | −19 | 1 | 6 | 723 | 1.4 | 35 | 0.098 | 723 | 758 | 70 |
| 11 | E | 1053 | −21 | 2 | 7 | 723 | 1.7 | 30 | 0.097 | 723 | 773 | 60 |
| 12 | E | 1093 | −20 | 1 | 4 | 723 | 1.7 | 30 | 0.097 | 723 | 773 | 60 |
| 13 | E | 1093 | −20 | 15 | 18 | 723 | 10 | 5 | 0.097 | 723 | 773 | 60 |
| 14 | E | 1093 | −20 | 1 | 4 | 723 | 2.5 | 20 | 0.097 | 723 | 773 | 60 |
| 15 | E | 1093 | −20 | 1 | 4 | 723 | 1.7 | 150 | 0.097 | 723 | 753 | 80 |
| 16 | F | 1073 | −20 | 2 | 4 | 723 | 1.4 | 35 | 0.095 | 723 | 763 | 60 |
| 17 | G | 1043 | −21 | 0.8 | 3 | 723 | 1 | 50 | 0.098 | 723 | 773 | 60 |
| 18 | H | 1063 | −21 | 2 | 4 | 723 | 1.7 | 30 | 0.098 | 723 | 773 | 60 |
| 19 | I | 1033 | −20 | 2 | 10 | 723 | 1.7 | 30 | 0.098 | 723 | 773 | 60 |
| 20 | J | 1043 | −22 | 3 | 12 | 723 | 1.7 | 30 | 0.098 | 723 | 773 | 60 |
| 21 | J | 1043 | −22 | 3 | 12 | 723 | 1.7 | 30 | 0.098 | 723 | 823 | 50 |
| 22 | J | 1043 | −22 | 0.3 | 15 | 723 | 1.7 | 30 | 0.098 | 723 | 773 | 60 |
| 23 | J | 1043 | −22 | 5 | 1 | 723 | 0.6 | 90 | 0.098 | 723 | 773 | 60 |
| 24 | K | 1043 | −21 | 2 | 4 | 723 | 1.7 | 30 | 0.098 | 723 | 773 | 60 |
| 25 | L | 1103 | −20 | 2 | 4 | 723 | 1.7 | 30 | 0.095 | 738 | 773 | 60 |
| 26 | L | 1103 | −20 | 2 | 4 | 743 | 1.7 | 30 | 0.095 | 738 | 773 | 60 |
| 27 | L | 1103 | −20 | 2 | 4 | 738 | 1.7 | 30 | 0.095 | 723 | 813 | 60 |
| 28 | M | 1103 | −20 | 2 | 4 | 723 | 1.7 | 30 | 0.095 | 723 | 773 | 60 |
| 29 | N | 1073 | −21 | 2 | 7 | 723 | 1.7 | 30 | 0.097 | 723 | 773 | 60 |
| 30 | O | 1103 | −20 | 2 | 4 | 723 | 1.7 | 30 | 0.095 | 723 | 773 | 60 |

| Sample No. | Tensile strength (MPa) | Elongation (%) | Plating adhesion (g/m2) | Plating Fe (%) | Si internal oxidation layer of steel sheet | | | Si oxidation layer of plating layer | | App. | Rem. |
|---|---|---|---|---|---|---|---|---|---|---|---|
| | | | | | State | Thickness (μm) | Comp. | Aver. cont. (%) | State | Aver. cont. (%) | | |
| 1 | 423 | 38 | 36 | 10.5 | Good | 1 | Good | 1.8 | Good | 0.2 | 4 | Ex. |
| 2 | 597 | 35 | 37 | 10.6 | Good | 0.6 | Good | 1.1 | Good | 0.1 | 4 | " |
| 3 | 610 | 34 | 35 | 10.7 | Good | 0.6 | Good | 1.1 | Good | 0.1 | 4 | " |
| 4 | 595 | 35 | 38 | 10.5 | Good | 0.6 | Good | 1.1 | Good | 0.1 | 4 | " |
| 5 | 967 | 5 | 36 | 10.8 | Good | 0.6 | Good | 1.1 | Good | 0.1 | 4 | " |
| 6 | 543 | 38 | 35 | 9.8 | Good | 1 | Good | 1.7 | Good | 0.2 | 4 | " |

TABLE 4-continued

| | | | | | | | | | | | | |
|---|---|---|---|---|---|---|---|---|---|---|---|---|
| 7 | 522 | 35 | 37 | 11.4 | Good | 1 | Good | 1.7 | Good | 0.2 | 4 | " |
| 8 | 516 | 26 | 38 | 12.5 | Good | 1 | Good | 1.7 | Good | 0.2 | 4 | " |
| 9 | 595 | 36 | 40 | 10.7 | Good | 1 | Good | 1.8 | Good | 0.2 | 4 | " |
| 10 | 734 | 28 | 36 | 9.5 | Good | 1 | Good | 1.8 | Good | 0.2 | 4 | " |
| 11 | 600 | 37 | 35 | 10.4 | Good | 1.5 | Good | 2.8 | Good | 0.3 | 4 | " |
| 12 | 611 | 36 | 36 | 10.8 | Good | 1.5 | Good | 2.8 | Good | 0.3 | 4 | " |
| 13 | 718 | 14 | 39 | 10.6 | Good | 1.5 | Good | 2.8 | Good | 0.3 | 4 | " |
| 14 | 604 | 29 | 36 | 10.7 | Good | 1.5 | Good | 2.8 | Good | 0.3 | 4 | " |
| 15 | 627 | 39 | 36 | 10.2 | Good | 1.5 | Good | 2.8 | Good | 0.3 | 4 | " |
| 16 | 620 | 35 | 37 | 9.9 | Good | 2.2 | Good | 4 | Good | 0.4 | 4 | " |
| 17 | 777 | 29 | 38 | 10.5 | Good | 1 | Good | 1.7 | Good | 0.2 | 4 | " |
| 18 | 627 | 26 | 37 | 10.7 | Good | 1 | Good | 1.3 | Good | 0.1 | 4 | " |
| 19 | 683 | 22 | 36 | 10.3 | Good | 0.6 | Good | 0.9 | Good | 0.1 | 4 | " |
| 20 | 828 | 27 | 39 | 10.5 | Good | 1.2 | Good | 2.1 | Good | 0.2 | 4 | " |
| 21 | 670 | 18 | 41 | 12.6 | Good | 1.2 | Good | 2.1 | Good | 0.2 | 4 | " |
| 22 | 695 | 18 | 38 | 10.8 | Good | 1.2 | Good | 2.1 | Good | 0.2 | 4 | " |
| 23 | 645 | 19 | 35 | 10.5 | Good | 1.2 | Good | 2.1 | Good | 0.2 | 4 | " |
| 24 | 1120 | 8 | 36 | 10.6 | Good | 1.5 | Good | 2.3 | Good | 0.2 | 4 | " |
| 25 | 875 | 27 | 37 | 10.4 | Good | 2.7 | Good | 4.5 | Good | 0.5 | 4 | " |
| 26 | 875 | 27 | 38 | 10.7 | Good | 2.7 | Good | 4.5 | Good | 0.5 | 4 | " |
| 27 | 798 | 21 | 38 | 12.7 | Good | 2.7 | Good | 4.5 | Good | 0.5 | 4 | " |
| 28 | 783 | 27 | 36 | 10.6 | Good | 2.5 | Good | 4.4 | Good | 0.4 | 4 | " |
| 29 | 600 | 37 | 35 | 10.5 | Good | 1.5 | Good | 2.8 | Good | 0.3 | 4 | " |
| 30 | 875 | 27 | 37 | 10.8 | Good | 2.7 | Good | 4.5 | Good | 0.4 | 4 | " |

Example 4

A slab of the composition shown by E in Table 1 was heated to 1423K and hot rolled at a final temperature of 1183 to 1203K to obtain a 4.5 mm hot rolled sheet which was then coiled at 853 to 953K. This was pickled, then cold rolled to obtain a 1.6 mm cold rolled steel strip, then was plated using a continuous hot dip galvanization facility using an all radiant tube type annealing furnace under the conditions shown in Table 5 to produce galvannealed steel sheet. The reduction zone was provided with a device for burning a mixed gas of CO and $H_2$ and introducing the $H_2O$, $CO_2$ produced and introduced $H_2O$ and $CO_2$ into $N_2$ gas containing 10 vol % of $H_2$.

The sheet was annealed while adjusted to give the value shown in Table 5, soaked at the soaking temperature (range from maximum peak temperature−20 degrees to maximum peak temperature) for a soaking time of 60 seconds, then was cooled from the maximum peak temperature to 923K by an average cooling rate of 1 degree/second, then from 923K to 773K by an average cooling rate of 4 degree/second and further cooled from 773K by an average cooling rate of 1.7 degree/second or more down to 723K, was held until the plating bath at 723K, was conveyed from 773K to the plating bath in 30 seconds, then was hot dip galvanized and alloyed at 773K.

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

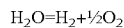

$H_2O = H_2 + \frac{1}{2}O_2$

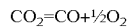

$CO_2 = CO + \frac{1}{2}O_2$

The tensile strength (TS) and elongation (El) were found by cutting out a JIS No. 5 test piece from the steel sheet and running a tensile test at ordinary temperature.

The amount of deposition of the plating was measured by dissolving the plating in hydrochloric acid containing an inhibitor then using the weight method for measurement. The Fe % in the plating was determined by dissolving the plating in hydrochloric acid containing an inhibitor and measurement by ICP.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the weight.

The presence of FeO is determined by measurement by XRD from the steel sheet surface. Sheets where no diffraction peak of FeO was observed were evaluated as Good, while ones where that diffraction peak was observed were evaluated as Poor.

The positions of $(Fe, Mn)SiO_3$, $(Fe, Mn)_2SiO_4$, and $SiO_2$ were evaluated by the following criteria by observation of oxides containing Si from the cross-section of an embedded and polished plating steel sheet by a CMA image:

Positions of $(Fe, Mn)SiO_3$ and $(Fe, Mn)_2SiO_4$

Good: Sheets with oxides where Fe or Mn and Si, O are observed at same positions observed at steel sheet surface Poor: Sheets with oxides where Fe or Mn and Si, O are observed at same positions not observed Position of $SiO_2$ Good: Sheets with oxides where Si and O are observed at same positions observed at inside of steel sheet Poor: Sheets with oxides where Si and O are observed at same positions not observed inside steel sheet The oxides containing Si present in the plating layer were evaluated by observation of embedded and polished plated steel sheet by an SEM image from its cross-section. The state of the oxides was observed by the SEM image. Sheets where the oxides containing Si were observed in the plating layer were evaluated as Good, while those with none observed were evaluated as Poor.

The content of the oxides containing Si in the plating layer was measured by dissolving the plating in hydrochloric acid containing an inhibitor, then separating the oxides containing Si, then measuring the weight.

The positions of the (Fe, Mn)$SiO_3$, (Fe, Mn)$_2SiO_4$, and $SiO_2$ were evaluated by observing the cross-section of embedded and polished plated for oxides containing Si by a CMA image. Sheets with oxides where Fe or Mn and Si, O are observed at the same positions were observed at the steel sheet surface were evaluated as Good, while sheets with oxides where Fe or Mn and Si, O were observed at same positions were not observed were evaluated as Poor.

The plating appearance was judged by visually observing the entire length of the run coil and scoring the non-plating area percentage as follows. Scores of 3 or more were deemed passing.
4: non-plating area percentage less than 1%
3: non-plating area percentage 1% to 5%
2: non-plating area percentage 5% to less than 10%
1: non-plating area percentage 10% or more The results of the evaluation are shown in Table 5. No. 5 had a furnace log $PO_2$ outside the range of the present invention, so Si oxides concentrated at the steel sheet surface and non-plating occurred leading to judgment of failure in appearance. No. 6 had a furnace log $PO_2$ outside the range of the present invention, oxides of Fe formed at the steel sheet surface and non-plating occurred leading to judgment of failure in appearance. The other steel sheets prepared by the method of the present invention were excellent appearance high strength galvannealed steel sheet.

853 to 953K. This was pickled, then cold rolled to obtain a 1.6 mm cold rolled steel strip, then run using an in-line annealing type continuous hot dip galvanization facility under the conditions shown in Table 7 to produce hot dip galvanized steel sheet. The continuous hot dip galvanization facility used was one heating the sheet by a nonoxidizing furnace, then reducing and annealing it in a reduction zone. The nonoxidizing furnace was adjusted to a combustion air ratio of 1.0 for use as an oxidation zone. The reduction zone was provided with a device for burning a mixed gas of CO and $H_2$ and introducing the $H_2O$ and $CO_2$ produced into $N_2$ gas containing 10 vol% of $H_2$.

The sheet was annealed while adjusted to give the value shown in Table 7, soaked at the soaking temperature (range from maximum peak temperature−20 degrees to maximum peak temperature) for a soaking time of 60 seconds, then was cooled from the maximum peak temperature to 923K by an average cooling rate of 1 degree/second, then from 923K to 773K by an average cooling rate of 4 degree/second and further cooled from 773K by an average cooling rate of 1.7 degree/second or more down to 723K and was held at 723K until the plating bath, was conveyed from 773K to the plating bath in 30 seconds, then was hot dip plated in a Zn—Mg—Al—Si plating bath of a bath temperature of 723K for 3 seconds, was wiped by $N_2$ to adjust the amount of deposition of the plating, then was cooled to 623K over 20 seconds. The composition of the plating layer of each obtained plated steel sheet was Mg: 3%, Al: 11%, and Si: 0.15%.

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

TABLE 5

| Sample No. | Steel sheet symbol | Max. peak temp. T (K) | $-0.000034T^2 + 0.105T - 0.2$ $[Si\%]^2 + 2.1[Si\%] - 98.8$ | Reduction zone logPO2 | $-0.000038T^2 + 0.107T - 90.4$ | Tensile strength (MPa) | Elongation (%) | Plating deposition (g/m2) | Plating Fe % | Internal oxidation layer of steel sheet | |
|---|---|---|---|---|---|---|---|---|---|---|---|
| | | | | | | | | | | State | Thickness (μm) |
| 1 | E | 1093 | −22.5 | −22 | −18.8 | 621 | 36 | 45 | 10.7 | Good | 1 |
| 2 | E | 1103 | −22.2 | −21 | −18.6 | 618 | 36 | 45 | 10.8 | Good | 2.5 |
| 3 | E | 1113 | −21.9 | −20 | −18.4 | 614 | 37 | 45 | 11.1 | Good | 3.2 |
| 4 | E | 1123 | −21.6 | −19 | −18.2 | 623 | 36 | 45 | 10.5 | Good | 4.4 |
| 5 | E | 1093 | −22.5 | −23 | −18.8 | 627 | 36 | 45 | 4.8 | Poor | — |
| 6 | E | 1123 | −21.6 | −18 | −18.2 | 610 | 36 | 45 | 6.2 | Poor | — |

| | Internal oxidation layer of steel sheet | | | | Si oxides of plating layer | | | | | |
|---|---|---|---|---|---|---|---|---|---|---|
| Sample No. | Composition | Average content (%) | FeO presence | (Fe,Mn)SiO3, (Fe,Mn)2SiO4 presence/position | SiO2 position | State | Average content (%) | (Fe,Mn)SiO3, (Fe,Mn)2SiO4 presence/position | Appearance | Remarks |
| 1 | Good | 2.4 | Good | Poor | Good | Good | 0.2 | Good | 4 | Inv. ex. |
| 2 | Good | 3.2 | Good | Good | Good | Good | 0.3 | Good | 4 | " |
| 3 | Good | 3.8 | Good | Good | Good | Good | 0.4 | Good | 4 | " |
| 4 | Good | 4.6 | Good | Good | Good | Good | 0.5 | Good | 4 | " |
| 5 | — | — | Good | Poor | Poor | Poor | <0.01 | Poor | 1 | Comp. ex. |
| 6 | — | — | Poor | Poor | Poor | Poor | <0.01 | Poor | 2 | " |

Example 5

A slab of each of the compositions of Table 6 was heated to 1423K and hot rolled at a final temperature of 1183 to 1203K to obtain a 4.5 mm hot rolled sheet which was then coiled at

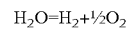
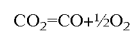

The tensile strength (TS) and elongation (El) were found by cutting out a JIS No. 5 test piece from the steel sheet and running a tensile test at ordinary temperature. The amount of deposition of the plating was measured by dissolving the plating in hydrochloric acid containing an inhibitor then using the weight method for measurement of the mass.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the mass.

The presence of FeO was determined by measurement by XRD from the steel sheet surface. Sheets where no diffraction peak of FeO was observed were evaluated as Good, while ones where that diffraction peak was observed were evaluated as Poor The positions of $(Fe, Mn)SiO_3$, $(Fe, Mn)_2SiO_4$, and $SiO_2$ were evaluated by the following criteria by observation of oxides containing Si from the cross-section of an embedded and polished plating steel sheet by a CMA image:

Positions of $(Fe, Mn)SiO_3$ and $(Fe, Mn)_2SiO_4$

Good: Sheets with oxides where Fe or Mn and Si, O are observed at same positions observed at steel sheet surface Poor: Sheets with oxides where Fe or Mn and Si, O are observed at same positions not observed Position of $SiO_2$ Good: Sheets with oxides where Si and O are observed at same positions observed in steel sheet further inside from oxides where Fe or Mn and Si, O are observed at same positions Fair: Sheets with oxides where Si and O are observed at same positions observed at inside of steel sheet Poor: Sheets with oxides where Si and O are observed at same positions not observed inside steel sheet The plating appearance was judged by visually observing the entire length of the run coil and scoring the non-plating area percentage as follows. Scores of 3 or more were deemed passing.

4: non-plating area percentage less than 1%
3: non-plating area percentage 1% to 5%
2: non-plating area percentage 5% to less than 10%
1: non-plating area percentage 10% or more The adhesion was evaluated by attaching adhesive tape to the hot dip plated steel sheet after the Dupont impact test, then peeling it off. Sheets with no plating peeled off were evaluated as Good, while sheets with plating peeled off were evaluated as Poor. The Dupont test was performed using an impact head with ½ inch roundness at its front end and dropping a weight of 1 kg from a height of 1 m.

The results of the evaluation are shown in Table 7 and Table 8 (Table 7 continuation). Nos. 3, 6, 9, 12, 17, 20, 23, 26, 29, 33, 35, 38, 41, 45, 48 had furnace log $PO_2$ outside the range of the present invention, so Si oxides concentrated at the steel sheet surface and non-plating and a drop in adhesion occurred leading to judgment of failure. Nos. 2, 5, 8, 11, 18, 21, 24, 27, 30, 32, 36, 39, 42, 44, and 47 had furnace log $PO_2$ outside the range of the present invention, so oxides of Fe at the steel sheet surface could not be reduced and non-plating and a drop in adhesion occurred leading to judgment of failure. The other steel sheets prepared by the method of the present invention were excellent plateability, adhesion, shapeability, and corrosion resistance high strength hot dip galvanized steel sheet.

TABLE 6

| Symbol | Chemical ingredients (mass %) | | | | | | | | |
|---|---|---|---|---|---|---|---|---|---|
| | C | Si | Mn | P | S | Al | N | Ni | Cu |
| A | 0.02 | 0.73 | 1.87 | 0.006 | 0.004 | 0.045 | 0.0023 | | |
| B | 0.07 | 0.43 | 2.18 | 0.011 | 0.002 | 0.035 | 0.0028 | | |
| C | 0.07 | 0.66 | 1.55 | 0.006 | 0.003 | 0.283 | 0.0026 | | |
| D | 0.07 | 0.71 | 2.08 | 0.004 | 0.002 | 0.031 | 0.0030 | | |
| E | 0.07 | 1.14 | 1.95 | 0.007 | 0.003 | 0.037 | 0.0027 | | |
| F | 0.08 | 1.65 | 1.80 | 0.008 | 0.003 | 0.027 | 0.0035 | | |
| G | 0.10 | 0.69 | 2.32 | 0.009 | 0.004 | 0.044 | 0.0033 | | |
| H | 0.14 | 0.50 | 1.61 | 0.013 | 0.005 | 0.038 | 0.0042 | | |
| I | 0.13 | 0.36 | 2.11 | 0.011 | 0.003 | 0.026 | 0.0036 | | |
| J | 0.14 | 0.82 | 2.27 | 0.008 | 0.002 | 0.054 | 0.0034 | | |
| K | 0.18 | 0.94 | 2.77 | 0.018 | 0.004 | 0.037 | 0.0039 | | |
| L | 0.08 | 1.83 | 2.35 | 0.004 | 0.005 | 0.063 | 0.0030 | | |
| M | 0.09 | 1.78 | 1.13 | 0.008 | 0.001 | 0.29 | 0.0027 | | |
| N | 0.07 | 1.14 | 1.95 | 0.007 | 0.003 | 0.037 | 0.0027 | 0.5 | 0.1 |
| O | 0.08 | 1.83 | 2.35 | 0.004 | 0.005 | 0.063 | 0.0030 | 1.5 | |

TABLE 7

| Sample No. | Steel sheet symbol | Maximum peak temperature T (K) | $-0.000034T^2 + 0.105T - 0.2 [Si\%]^2 + 2.1 [Si\%] - 98.8$ | Reduction zone logPO2 | $-0.000038T^2 + 0.107T - 90.4$ | Tensile strength (MPa) | Elongation (%) | Plating deposition (g/m2) |
|---|---|---|---|---|---|---|---|---|
| 1 | A | 1073 | −23.9 | −21 | −19.3 | 422 | 40 | 100 |
| 2 | A | 1053 | −24.5 | −19 | −19.9 | 418 | 40 | 100 |
| 3 | A | 1063 | −24.2 | −25 | −19.6 | 420 | 40 | 100 |
| 4 | B | 1033 | −25.8 | −20 | −20.4 | 602 | 37 | 100 |
| 5 | B | 1043 | −25.4 | −19 | −20.1 | 598 | 37 | 100 |
| 6 | B | 1063 | −24.7 | −25 | −19.6 | 609 | 37 | 100 |
| 7 | C | 1053 | −24.6 | −20 | −19.9 | 548 | 40 | 100 |
| 8 | C | 1063 | −24.3 | −19 | −19.6 | 543 | 40 | 100 |
| 9 | C | 1083 | −23.7 | −24 | −19.1 | 552 | 40 | 100 |
| 10 | D | 1103 | −23.0 | −21 | −18.6 | 729 | 30 | 100 |
| 11 | D | 1103 | −23.0 | −18 | −18.6 | 738 | 30 | 100 |
| 12 | D | 1083 | −23.6 | −24 | −19.1 | 733 | 30 | 100 |
| 13 | E | 1093 | −22.5 | −22 | −18.8 | 621 | 38 | 100 |
| 14 | E | 1103 | −22.2 | −21 | −18.6 | 618 | 38 | 100 |

TABLE 7-continued

| Sample No. | Steel sheet symbol | Maximum peak temperature T (K) | $-0.000034T^2 + 0.105T - 0.2[Si\%]^2 + 2.1[Si\%] - 98.8$ | Reduction zone logPO2 | $-0.000038T^2 + 0.107T - 90.4$ | Tensile strength (MPa) | Elongation (%) | Plating deposition (g/m2) |
|---|---|---|---|---|---|---|---|---|
| 15 | E | 1113 | −21.9 | −20 | −18.4 | 614 | 38 | 100 |
| 16 | E | 1123 | −21.6 | −19 | −18.2 | 623 | 38 | 100 |
| 17 | E | 1093 | −22.5 | −23 | −18.8 | 627 | 38 | 100 |
| 18 | E | 1123 | −21.6 | −18 | −18.2 | 610 | 38 | 100 |
| 19 | F | 1073 | −22.4 | −21 | −19.3 | 624 | 37 | 100 |
| 20 | F | 1083 | −22.0 | −23 | −19.1 | 617 | 37 | 100 |
| 21 | F | 1103 | −21.4 | −18 | −18.6 | 620 | 37 | 100 |
| 22 | G | 1043 | −24.9 | −21 | −20.1 | 781 | 31 | 100 |
| 23 | G | 1053 | −24.6 | −19 | −19.9 | 785 | 31 | 100 |
| 24 | G | 1073 | −23.9 | −24 | −19.3 | 787 | 31 | 100 |
| 25 | H | 1063 | −24.6 | −20 | −19.6 | 633 | 28 | 100 |
| 26 | H | 1083 | −24.0 | −18 | −19.1 | 631 | 28 | 100 |
| 27 | H | 1053 | −24.9 | −25 | −19.9 | 639 | 28 | 100 |
| 28 | I | 1043 | −25.5 | −21 | −20.1 | 685 | 24 | 100 |
| 29 | I | 1063 | −24.9 | −19 | −19.6 | 672 | 24 | 100 |
| 30 | I | 1033 | −25.9 | −26 | −20.4 | 669 | 24 | 100 |
| 31 | J | 1043 | −24.7 | −21 | −20.1 | 832 | 29 | 100 |
| 32 | J | 1093 | −23.1 | −18 | −18.8 | 819 | 29 | 100 |
| 33 | J | 1053 | −24.3 | −25 | −19.9 | 825 | 29 | 100 |
| 34 | K | 1043 | −24.5 | −21 | −20.1 | 1125 | 10 | 100 |
| 35 | K | 1053 | −24.1 | −25 | −19.9 | 1121 | 10 | 100 |
| 36 | K | 1073 | −23.5 | −20 | −19.3 | 1117 | 10 | 100 |
| 37 | L | 1103 | −21.2 | −19 | −−18.6 | 879 | 29 | 100 |
| 38 | L | 1113 | −20.9 | −21 | −18.4 | 884 | 29 | 100 |
| 39 | L | 1093 | −21.5 | −18 | −18.8 | 892 | 29 | 100 |
| 40 | M | 1103 | −21.2 | −20 | −18.6 | 784 | 29 | 100 |
| 41 | M | 1113 | −20.9 | −22 | −18.4 | 780 | 29 | 100 |
| 42 | M | 1093 | −21.5 | −18 | −18.8 | 786 | 29 | 100 |
| 43 | N | 1073 | −23.1 | −20 | −19.3 | 612 | 39 | 100 |
| 44 | N | 1093 | −22.5 | −18 | −18.8 | 627 | 39 | 100 |
| 45 | N | 1123 | −21.6 | −22 | −18.2 | 618 | 39 | 100 |
| 46 | O | 1103 | −21.2 | −20 | −18.6 | 881 | 29 | 100 |
| 47 | O | 1113 | −20.9 | −18 | −18.4 | 876 | 29 | 100 |
| 48 | O | 1093 | −21.5 | −22 | −18.8 | 880 | 29 | 100 |

TABLE 8

(Table 7 continuation)

| | | Si internal oxide layer of steel sheet | | | | | | | | |
|---|---|---|---|---|---|---|---|---|---|---|
| Sample No. | Steel sheet symbol | Condition | Thickness (μm) | Composition | Average content (%) | FeO presence | (Fe,Mn)SiO3, (Fe,Mn)2SiO4 presence/ position | SiO2 position | Non-plating score | Plating adhesion | Remarks |
| 1 | A | Good | 2.9 | Good | 2.7 | Good | Good | Good | 4 | Good | Inv. ex. |
| 2 | A | Poor | — | — | — | Poor | Poor | Poor | 2 | Poor | Comp. ex. |
| 3 | A | Poor | — | — | — | Good | Poor | Poor | 1 | Poor | " |
| 4 | B | Good | 2.7 | Good | 0.9 | Good | Good | Good | 4 | Good | Inv. ex. |
| 5 | B | Poor | — | — | — | Poor | Poor | Poor | 2 | Poor | Comp. ex. |
| 6 | B | Poor | — | — | — | Good | Poor | Poor | 1 | Poor | " |
| 7 | C | Good | 3.2 | Good | 2.1 | Good | Good | Good | 4 | Good | Inv. ex. |
| 8 | C | Poor | — | — | — | Poor | Poor | Poor | 2 | Poor | Comp. ex. |
| 9 | C | Poor | — | — | — | Good | Poor | Poor | 1 | Poor | " |
| 10 | D | Good | 2.5 | Good | 2.9 | Good | Good | Good | 4 | Good | Inv. ex. |
| 11 | D | Poor | — | — | — | Poor | Poor | Poor | 2 | Poor | Comp. ex. |
| 12 | D | Poor | — | — | — | Good | Poor | Poor | 1 | Poor | " |
| 13 | E | Good | 0.9 | Good | 2.4 | Good | Good | Good | 4 | Good | Inv. ex. |
| 14 | E | Good | 2.4 | Good | 3.2 | Good | Good | Good | 4 | Good | " |
| 15 | E | Good | 3.1 | Good | 3.8 | Good | Good | Good | 4 | Good | " |
| 16 | E | Good | 4.2 | Good | 4.6 | Good | Good | Good | 4 | Good | " |
| 17 | E | Poor | — | — | — | Good | Poor | Poor | 1 | Poor | Comp. ex. |
| 18 | E | Poor | — | — | — | Poor | Poor | Poor | 2 | Poor | " |
| 19 | F | Good | 3.8 | Good | 4 | Good | Good | Good | 4 | Good | Inv. ex. |
| 20 | F | Poor | — | — | — | Good | Poor | Poor | 1 | Poor | Comp. ex. |
| 21 | F | Poor | — | — | — | Poor | Poor | Poor | 2 | Poor | " |
| 22 | G | Good | 3 | Good | 1.7 | Good | Good | Good | 4 | Good | Inv. ex. |
| 23 | G | Poor | — | — | — | Good | Poor | Poor | 1 | Poor | Comp. ex. |
| 24 | G | Poor | — | — | — | Poor | Poor | Poor | 2 | Poor | " |
| 25 | H | Good | 2.3 | Good | 1.3 | Good | Good | Good | 4 | Good | Inv. ex. |
| 26 | H | Poor | — | — | — | Good | Poor | Poor | 1 | Poor | Comp. ex. |

TABLE 8-continued (Table 7 continuation)

Si internal oxide layer of steel sheet

| Sample No. | Steel sheet symbol | Condition | Thickness (μm) | Composition | Average content (%) | FeO presence | (Fe,Mn)SiO3, (Fe,Mn)2SiO4 presence/ position | SiO2 position | Non-plating score | Plating adhesion | Remarks |
|---|---|---|---|---|---|---|---|---|---|---|---|
| 27 | H | Poor | — | — | — | Poor | Poor | Poor | 2 | Poor | " |
| 28 | I | Good | 1.9 | Good | 0.8 | Good | Good | Good | 4 | Good | Inv. ex. |
| 29 | I | Poor | — | — | — | Good | Poor | Poor | 1 | Poor | Comp. ex. |
| 30 | I | Poor | — | — | — | Poor | Poor | Poor | 2 | Poor | " |
| 31 | J | Good | 4.1 | Good | 1.7 | Good | Good | Good | 4 | Good | Inv. ex. |
| 32 | J | Poor | — | — | — | Poor | Poor | Poor | 2 | Poor | Comp. ex. |
| 33 | J | Poor | — | — | — | Good | Poor | Poor | 1 | Poor | " |
| 34 | K | Good | 4.6 | Good | 3.5 | Good | Good | Good | 4 | Good | Inv. ex. |
| 35 | K | Poor | — | — | — | Good | Poor | Poor | 1 | Poor | Comp. ex. |
| 36 | K | Poor | — | — | — | Poor | Poor | Poor | 2 | Poor | " |
| 37 | L | Good | 5 | Good | 8.3 | Good | Good | Good | 4 | Good | Inv. ex. |
| 38 | L | Poor | — | — | — | Good | Poor | Poor | 1 | Poor | Comp. ex. |
| 39 | L | Poor | — | — | — | Poor | Poor | Poor | 2 | Poor | " |
| 40 | M | Good | 4.4 | Good | 5.9 | Good | Good | Good | 4 | Good | Inv. ex. |
| 41 | M | Poor | — | — | — | Good | Poor | Poor | 1 | Poor | Comp. ex. |
| 42 | M | Poor | — | — | — | Poor | Poor | Poor | 2 | Poor | " |
| 43 | N | Good | 3.9 | Good | 4.2 | Good | Good | Good | 4 | Good | Inv. ex. |
| 44 | N | Poor | — | — | — | Poor | Poor | Poor | 2 | Poor | Comp. ex. |
| 45 | N | Poor | — | — | — | Good | Poor | Poor | 1 | Poor | " |
| 46 | O | Good | 4.8 | Good | 7.1 | Good | Good | Good | 4 | Good | Inv. ex. |
| 47 | O | Poor | — | — | — | Poor | Poor | Poor | 2 | Poor | Comp. ex. |
| 48 | O | Poor | — | — | — | Good | Poor | Poor | 1 | Poor | " |

Example 6

A slab of each of the compositions of Table 6 was heated to 1423K and hot rolled at a final temperature of 1183 to 1203K to obtain a 4.5 mm hot rolled sheet which was then coiled at 853 to 953K. This was pickled, then cold rolled to obtain a 1.6 mm cold rolled steel strip, then plated using an in-line annealing type continuous hot dip galvanization facility under the conditions shown in Table 9 to produce hot dip galvanized steel sheet. The continuous hot dip galvanization facility used was one heating the sheet by a nonoxidizing furnace, then reducing and annealing it in a reduction zone. The nonoxidizing furnace was adjusted to a combustion air ratio of 1.0 for use as an oxidation zone. The reduction zone was provided with a device for burning a mixed gas of CO and $H_2$ and introducing the $H_2O$ and $CO_2$ produced into $N_2$ gas containing 10 vol % of $H_2$. The log $PO_2$ of the oxygen potential in the furnace was adjusted to give the value shown in Table 9.

The sheet was annealed while adjusted to give the value shown in Table 9, soaked at the soaking temperature (range from maximum peak temperature−20 degrees to maximum peak temperature) for a soaking time of 60 seconds, then was cooled from the maximum peak temperature to 923K by an average cooling rate of 1 degree/second, then from 923K to 773K by an average cooling rate of 4 degree/second and further cooled from 773K by an average cooling rate of 1.7 degree/second or more down to 723K and was held at 723K until the plating bath, was conveyed from 773K to the plating bath in 30 seconds, then was hot dip plated in an Zn—Mg—Al plating bath or an Zn—Mg—Al—Si plating bath for 3 seconds, was wiped by $N_2$ to adjust the amount of deposition of the plating, then was cooled to 623K over 20 seconds. The composition of the plating layer of each obtained plated steel sheet was as shown in Table 10 (Table 9 continuation).

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

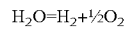

$H_2O = H_2 + \frac{1}{2}O_2$

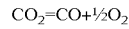

$CO_2 = CO + \frac{1}{2}O_2$

The tensile strength (TS) and elongation (El) were found by cutting out a JIS No. 5 test piece from the steel sheet and running a tensile test at ordinary temperature.

The amount of deposition of the plating was determined by dissolving the plating in hydrochloric acid containing an inhibitor and measuring the mass by the weighing method. The composition of the plating layer was determined by dissolving the plating in hydrochloric acid containing an inhibitor and measuring it by chemical analysis.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the mass.

The presence of FeO was determined by measurement by XRD from the steel sheet surface. Sheets where no diffraction peak of FeO was observed were evaluated as Good, while ones where that diffraction peak was observed were evaluated as Poor The positions of (Fe, Mn)SiO$_3$, (Fe, Mn)$_2$SiO$_4$, and SiO$_2$ were evaluated by the following criteria by observation of oxides containing Si from the cross-section of an embedded and polished plating steel sheet by a CMA image:

Positions of (Fe, Mn)SiO$_3$ and (Fe, Mn)$_2$SiO$_4$

Good: Sheets with oxides where Fe or Mn and Si, O are observed at same positions observed at steel sheet surface Poor: Sheets with oxides where Fe or Mn and Si, O are observed at same positions not observed Position of SiO$_2$ Good: Sheets with oxides where Si and O are observed at same positions observed in steel sheet further inside from oxides where Fe or Mn and Si, O are observed at same positions Fair: Sheets with oxides where Si and O are observed at same positions observed at inside of steel sheet Poor: Sheets with oxides where Si and O are observed at same positions not observed inside steel sheet The plating appearance was judged by visually observing the entire length of the run coil and scoring the non-plating area percentage as follows. Scores of 3 or more were deemed passing.

4: non-plating area percentage less than 1%

3: non-plating area percentage 1% to 5%

2: non-plating area percentage 5% to less than 10%

1: non-plating area percentage 10% or more

The adhesion was evaluated by attaching adhesive tape to the hot dip plated steel sheet after the Dupont impact test, then peeling it off. Sheets with no plating peeled off were evaluated as Good, while sheets with plating peeled off were evaluated as Poor. The Dupont test was performed using an impact head with ½ inch roundness at its front end and dropping a weight of 1 kg from a height of 1 m.

The results of the evaluation are shown in Table 10 (Table 9 continuation). No. 1 had an Al concentration in the plating layer outside of the range of the present invention, so a Zn—Fe alloying reaction occurred and the plating adhesion dropped leading to judgment of failure. No. 16 had an Al concentration and an Si concentration in the plating layer outside the range of the present invention, so the plating adhesion dropped leading to judgment of failure of the samples. The other steel sheets prepared by the method of the present invention were high strength hot dip galvanized steel sheets excellent in plateability and adhesion.

TABLE 9

| Sample No. | Steel sheet symbol | Maximum peak temperature T (K) | $[Si\%]^2 + 2.1 [Si\%] - 98.8$ | Reduction zone logPO2 | $-0.000038T^2 + 0.107T - 90.4$ | Tensile strength (MPa) | Elongation (%) |
|---|---|---|---|---|---|---|---|
| 1 | E | 1113 | −21.9 | −20 | −18.4 | 622 | 38 |
| 2 | E | 1113 | −21.9 | −20 | −18.4 | 608 | 38 |
| 3 | E | 1113 | −21.9 | −20 | −18.4 | 619 | 38 |
| 4 | E | 1113 | −21.9 | −20 | −18.4 | 610 | 38 |
| 5 | E | 1113 | −21.9 | −20 | −18.4 | 621 | 38 |
| 6 | E | 1113 | −21.9 | −20 | −18.4 | 614 | 38 |
| 7 | E | 1113 | −21.9 | −20 | −18.4 | 624 | 38 |
| 8 | E | 1113 | −21.9 | −20 | −18.4 | 618 | 38 |
| 9 | E | 1113 | −21.9 | −20 | −18.4 | 606 | 38 |
| 10 | E | 1113 | −21.9 | −20 | −18.4 | 620 | 38 |
| 11 | E | 1113 | −21.9 | −20 | −18.4 | 612 | 38 |
| 12 | E | 1113 | −21.9 | −20 | −18.4 | 607 | 38 |
| 13 | E | 1113 | −21.9 | −20 | −18.4 | 617 | 38 |
| 14 | E | 1113 | −21.9 | −20 | −18.4 | 613 | 38 |
| 15 | E | 1113 | −21.9 | −20 | −18.4 | 623 | 38 |
| 16 | E | 1113 | −21.9 | −20 | −18.4 | 609 | 38 |
| 17 | E | 1113 | −21.9 | −20 | −18.4 | 616 | 38 |
| 18 | E | 1113 | −21.9 | −20 | −18.4 | 605 | 38 |
| 19 | E | 1113 | −21.9 | −20 | −18.4 | 613 | 38 |
| 20 | E | 1113 | −21.9 | −20 | −18.4 | 625 | 37 |
| 21 | E | 1113 | −21.9 | −20 | −18.4 | 615 | 38 |
| 22 | E | 1113 | −21.9 | −20 | −18.4 | 611 | 38 |
| 23 | E | 1113 | −21.9 | −20 | −18.4 | 608 | 38 |
| 24 | D | 1103 | −23.0 | −21 | −18.6 | 728 | 30 |
| 25 | D | 1103 | −23.0 | −21 | −18.6 | 725 | 30 |
| 26 | D | 1103 | −23.0 | −21 | −18.6 | 731 | 30 |
| 27 | D | 1103 | −23.0 | −21 | −18.6 | 729 | 30 |
| 28 | D | 1103 | −23.0 | −21 | −18.6 | 732 | 30 |
| 29 | J | 1043 | −24.7 | −21 | −20.1 | 832 | 29 |
| 30 | J | 1043 | −24.7 | −21 | −20.1 | 835 | 29 |
| 31 | J | 1043 | −24.7 | −21 | −20.1 | 829 | 29 |
| 32 | J | 1043 | −24.7 | −21 | −20.1 | 827 | 29 |
| 33 | J | 1043 | −24.7 | −21 | −20.1 | 830 | 29 |
| 34 | L | 1103 | −21.2 | −19 | −18.6 | 879 | 29 |
| 35 | L | 1103 | −21.2 | −19 | −18.6 | 881 | 29 |
| 36 | L | 1103 | −21.2 | −19 | −18.6 | 878 | 29 |
| 37 | L | 1103 | −21.2 | −19 | −18.6 | 883 | 29 |
| 38 | L | 1103 | −21.2 | −19 | −18.6 | 877 | 29 |

TABLE 10

(Table 9 continuation)

| | | Zn—Al—Mg—Si-based plated steel sheet | | | | Si internal oxide layer of steel sheet | | | |
|---|---|---|---|---|---|---|---|---|---|
| Sample No. | Steel sheet symbol | Plating Al % | Plating Mg % | Plating Si % | Plating deposition (g/m2) | State | Thickness (μm) | Composition | Average content (%) |
| 1 | E | 0.02 | 0.5 | 0 | 140 | Good | 3.1 | Good | 3.8 |
| 2 | E | 0.05 | 0.5 | 0 | 140 | Good | 3.5 | Good | 4.0 |
| 3 | E | 0.1 | 0.5 | 0 | 140 | Good | 3.0 | Good | 3.6 |
| 4 | E | 0.5 | 0.5 | 0 | 140 | Good | 3.4 | Good | 3.9 |
| 5 | E | 1 | 0.5 | 0 | 140 | Good | 2.9 | Good | 3.7 |
| 6 | E | 5 | 0.5 | 0 | 140 | Good | 3.3 | Good | 3.8 |
| 7 | E | 10 | 0.5 | 0 | 140 | Good | 2.8 | Good | 3.9 |
| 8 | E | 12 | 0.5 | 0 | 140 | Good | 3.2 | Good | 3.7 |
| 9 | E | 0.4 | 0.01 | 0 | 140 | Good | 2.7 | Good | 4.0 |
| 10 | E | 0.4 | 0.1 | 0 | 140 | Good | 3.3 | Good | 3.6 |
| 11 | E | 5 | 0.1 | 0 | 140 | Good | 2.8 | Good | 3.9 |
| 12 | E | 0.4 | 1 | 0 | 140 | Good | 3.4 | Good | 4.0 |
| 13 | E | 0.4 | 2.6 | 0 | 140 | Good | 2.9 | Good | 3.6 |
| 14 | E | 6 | 3.2 | 0 | 140 | Good | 3.2 | Good | 3.7 |
| 15 | E | 10 | 5 | 0 | 140 | Good | 2.7 | Good | 3.8 |
| 16 | E | 12 | 3.4 | 0 | 140 | Good | 3.1 | Good | 3.9 |
| 17 | E | 20 | 3.5 | 0.3 | 140 | Good | 3.5 | Good | 3.7 |
| 18 | E | 10 | 2.1 | 0.2 | 140 | Good | 3.0 | Good | 3.6 |
| 19 | E | 10 | 5 | 0.5 | 140 | Good | 3.3 | Good | 3.8 |
| 20 | E | 11 | 3.3 | 0.01 | 140 | Good | 2.8 | Good | 4.0 |
| 21 | E | 20 | 3.6 | 2 | 140 | Good | 3.2 | Good | 3.7 |
| 22 | E | 7 | 2.8 | 0.005 | 140 | Good | 2.7 | Good | 3.9 |
| 23 | E | 11 | 3.1 | 0.2 | 140 | Good | 3.1 | Good | 3.6 |
| 24 | D | 0.4 | 0.5 | 0 | 140 | Good | 2.5 | Good | 2.9 |
| 25 | D | 5 | 0.1 | 0 | 140 | Good | 2.4 | Good | 3.1 |
| 26 | D | 6 | 2.7 | 0 | 140 | Good | 2.7 | Good | 3.0 |
| 27 | D | 7 | 3 | 0.006 | 140 | Good | 2.5 | Good | 2.8 |
| 28 | D | 11 | 2.9 | 0.23 | 140 | Good | 2.6 | Good | 2.9 |
| 29 | J | 0.4 | 0.5 | 0 | 140 | Good | 4.1 | Good | 1.7 |
| 30 | J | 4.5 | 0.1 | 0 | 140 | Good | 4.2 | Good | 1.6 |
| 31 | J | 5.8 | 2.6 | 0 | 140 | Good | 4.0 | Good | 1.7 |
| 32 | J | 7.1 | 2.9 | 0.007 | 140 | Good | 3.9 | Good | 1.7 |
| 33 | J | 11.5 | 3.2 | 0.22 | 140 | Good | 3.8 | Good | 1.6 |
| 34 | L | 0.3 | 0.4 | 0 | 140 | Good | 5.0 | Good | 8.3 |
| 35 | L | 4.2 | 0.1 | 0 | 140 | Good | 4.9 | Good | 8.0 |
| 36 | L | 5.6 | 2.5 | 0 | 140 | Good | 5.2 | Good | 8.4 |
| 37 | L | 6.5 | 2.8 | 0.008 | 140 | Good | 5.1 | Good | 8.2 |
| 38 | L | 10.5 | 2.8 | 0.018 | 140 | Good | 4.8 | Good | 8.1 |

| | Si internal oxide layer of steel sheet | | | | | |
|---|---|---|---|---|---|---|
| Sample No. | Presence of FeO | (Fe,Mn)SiO3, (Fe,Mn)2SiO4 presence/position | SiO2 presence position | Non-plating score | Plating adhesion | Remarks |
| 1 | Good | Good | Good | 4 | Poor | Comp. ex. |
| 2 | Good | Good | Good | 4 | Good | Inv. ex. |
| 3 | Good | Good | Good | 4 | Good | " |
| 4 | Good | Good | Good | 4 | Good | " |
| 5 | Good | Good | Good | 4 | Good | " |
| 6 | Good | Good | Good | 4 | Good | " |
| 7 | Good | Good | Good | 4 | Good | " |
| 8 | Good | Good | Good | 4 | Good | " |
| 9 | Good | Good | Good | 4 | Good | " |
| 10 | Good | Good | Good | 4 | Good | " |
| 11 | Good | Good | Good | 4 | Good | " |
| 12 | Good | Good | Good | 4 | Good | " |
| 13 | Good | Good | Good | 4 | Good | " |
| 14 | Good | Good | Good | 4 | Good | " |
| 15 | Good | Good | Good | 4 | Good | " |
| 16 | Good | Good | Good | 4 | Poor | Comp. ex. |
| 17 | Good | Good | Good | 4 | Good | Inv. ex. |
| 18 | Good | Good | Good | 4 | Good | " |
| 19 | Good | Good | Good | 4 | Good | " |
| 20 | Good | Good | Good | 4 | Good | " |
| 21 | Good | Good | Good | 4 | Good | " |
| 22 | Good | Good | Good | 4 | Good | " |
| 23 | Good | Good | Good | 4 | Good | " |
| 24 | Good | Good | Good | 4 | Good | " |
| 25 | Good | Good | Good | 4 | Good | " |
| 26 | Good | Good | Good | 4 | Good | " |

TABLE 10-continued (Table 9 continuation)

| | | | | | | |
|---|---|---|---|---|---|---|
| 27 | Good | Good | Good | 4 | Good | " |
| 28 | Good | Good | Good | 4 | Good | " |
| 29 | Good | Good | Good | 4 | Good | " |
| 30 | Good | Good | Good | 4 | Good | " |
| 31 | Good | Good | Good | 4 | Good | " |
| 32 | Good | Good | Good | 4 | Good | " |
| 33 | Good | Good | Good | 4 | Good | " |
| 34 | Good | Good | Good | 4 | Good | " |
| 35 | Good | Good | Good | 4 | Good | " |
| 36 | Good | Good | Good | 4 | Good | " |
| 37 | Good | Good | Good | 4 | Good | " |
| 38 | Good | Good | Good | 4 | Good | " |

Example 7

A slab of each of the compositions of Table 6 was heated to 1423K and hot rolled at a final temperature of 1183 to 1203K to obtain a 4.5 mm hot rolled sheet which was then coiled at 853 to 953K. This was pickled, then cold rolled to obtain a 1.6 mm cold rolled steel strip, then plated using an in-line annealing type continuous hot dip galvanization facility under the conditions shown in Table 11 to produce hot dip galvanized steel sheet. The continuous hot dip galvanization facility used was one heating the sheet by a nonoxidizing furnace, then reducing and annealing it in a reduction zone. The nonoxidizing furnace was adjusted to a combustion air ratio of 1.0 for use as an oxidation zone. The reduction zone was provided with a device for burning a mixed gas of CO and $H_2$ and introducing the $H_2O$ and $CO_2$ produced into $N_2$ gas containing 10 vol % of $H_2$. The log $PO_2$ of the oxygen potential in the furnace was adjusted to give the value shown in Table 11.

The sheet was annealed while adjusted to give the value shown in Table 11 and soaked at the soaking temperature (range from maximum peak temperature–20 degrees to maximum peak temperature) for a soaking time of 60 seconds.

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

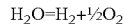

$$H_2O = H_2 + \tfrac{1}{2}O_2$$

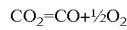

$$CO_2 = CO + \tfrac{1}{2}O_2$$

The tensile strength (TS) and elongation (El) were found by cutting out a JIS No. 5 test piece from the steel sheet and running a tensile test at ordinary temperature.

The sheet was hot dip plated in a Zn—Mg—Al—Si plating bath for 3 seconds and wiped by $N_2$ to adjust the amount of deposition of the plating to 100 g/m² per side. The composition of the plating layer of the obtained plated steel sheet was Mg: 3%, Al: 11%, and Si: 0.15%.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the mass.

The presence of FeO was determined by measurement by XRD from the steel sheet surface. Sheets where no diffraction peak of FeO was observed were evaluated as Good, while ones where that diffraction peak was observed were evaluated as Poor.

The positions of (Fe, Mn)$SiO_3$, (Fe, Mn)$_2SiO_4$, and $SiO_2$ were evaluated by the following criteria by observation of oxides containing Si from the cross-section of an embedded and polished plating steel sheet by a CMA image:

Positions of (Fe, Mn)$SiO_3$ and (Fe, Mn)$_2SiO_4$

Good: Sheets with oxides where Fe or Mn and Si, O are observed at same positions observed at steel sheet surface Poor: Sheets with oxides where Fe or Mn and Si, O are observed at same positions not observed Position of $SiO_2$ Good: Sheets with oxides where Si and O are observed at same positions observed in steel sheet further inside from oxides where Fe or Mn and Si, O are observed at same positions Fair: Sheets with oxides where Si and O are observed at same positions observed at inside of steel sheet Poor: Sheets with oxides where Si and O are observed at same positions not observed inside steel sheet The plating appearance was judged by visually observing the entire length of the run coil and scoring the non-plating area percentage as follows. Scores of 3 or more were deemed passing.

4: non-plating area percentage less than 1%
3: non-plating area percentage 1% to 5%
2: non-plating area percentage 5% to less than 10%
1: non-plating area percentage 10% or more The adhesion was evaluated by attaching adhesive tape to the hot dip plated steel sheet after the Dupont impact test, then peeling it off. Sheets with no plating peeled off were evaluated as Good, while sheets with plating peeled off were evaluated as Poor. The Dupont test was performed using an impact head with ½ inch roundness at its front end and dropping a weight of 1 kg from a height of 1 m.

The results of the evaluation are shown in Table 11. The method of the present invention enabled production of high strength hot dip galvanized steel sheet excellent in plateability and adhesion.

TABLE 11

| Sample No. | Steel sheet symbol | Maximum peak temperature after annealing (K) | Reduction zone logPO2 | Average cooling rate to 923 K (°/sec) | Average cooling rate to 773 K (°/sec) | Cooling end temperature (K) | Average cooling rate to cooling end (°/sec) | Holding time from 773 K to 623 K (sec) | Tensile strength (MPa) | Elongation (%) |
|---|---|---|---|---|---|---|---|---|---|---|
| 1 | A | 1043 | −22 | 5 | 15 | 723 | 10 | 30 | 423 | 40 |
| 2 | B | 1033 | −23 | 2 | 8 | 723 | 1.7 | 45 | 597 | 37 |
| 3 | B | 1033 | −23 | 2 | 8 | 738 | 1.2 | 45 | 610 | 36 |
| 4 | B | 1033 | −23 | 2 | 8 | 713 | 2 | 45 | 595 | 37 |
| 5 | B | 993 | −23 | 2 | 8 | 723 | 1.7 | 45 | 967 | 7 |
| 6 | C | 1053 | −22 | 3 | 10 | 723 | 1.3 | 55 | 543 | 40 |
| 7 | C | 1053 | −22 | 3 | 10 | 723 | 1.3 | 55 | 522 | 37 |
| 8 | C | 1073 | −22 | 3 | 6 | 723 | 1.7 | 45 | 516 | 28 |
| 9 | D | 1043 | −22 | 1 | 6 | 723 | 1.4 | 50 | 595 | 38 |
| 10 | D | 1103 | −19 | 1 | 6 | 723 | 1.4 | 50 | 734 | 30 |
| 11 | E | 1053 | −21 | 2 | 7 | 723 | 1.7 | 45 | 600 | 39 |
| 12 | E | 1093 | −20 | 1 | 4 | 723 | 1.7 | 45 | 611 | 38 |
| 13 | E | 1093 | −20 | 15 | 18 | 723 | 10 | 30 | 718 | 16 |
| 14 | E | 1093 | −20 | 1 | 4 | 723 | 2.5 | 40 | 604 | 31 |
| 15 | E | 1093 | −20 | 1 | 4 | 723 | 1.7 | 165 | 627 | 41 |
| 16 | F | 1073 | −20 | 2 | 4 | 723 | 1.4 | 50 | 620 | 37 |
| 17 | G | 1043 | −21 | 0.8 | 3 | 723 | 1 | 65 | 777 | 31 |
| 18 | H | 1063 | −21 | 2 | 4 | 723 | 1.7 | 45 | 627 | 28 |
| 19 | I | 1033 | −20 | 2 | 10 | 723 | 1.7 | 45 | 683 | 24 |
| 20 | J | 1043 | −22 | 3 | 12 | 723 | 1.7 | 45 | 828 | 29 |
| 21 | J | 1043 | −22 | 3 | 12 | 723 | 1.7 | 45 | 670 | 20 |
| 22 | J | 1043 | −22 | 0.3 | 15 | 723 | 1.7 | 45 | 695 | 20 |
| 23 | J | 1043 | −22 | 5 | 1 | 723 | 0.6 | 105 | 645 | 21 |
| 24 | K | 1043 | −21 | 2 | 4 | 723 | 1.7 | 45 | 1120 | 10 |
| 25 | L | 1103 | −20 | 2 | 4 | 723 | 1.7 | 45 | 875 | 29 |
| 26 | L | 1103 | −20 | 2 | 4 | 743 | 1.7 | 45 | 875 | 29 |
| 27 | L | 1103 | −20 | 2 | 4 | 738 | 1.7 | 45 | 798 | 23 |
| 28 | M | 1103 | −20 | 2 | 4 | 723 | 1.7 | 45 | 783 | 29 |
| 29 | N | 1073 | −21 | 2 | 7 | 723 | 1.7 | 45 | 600 | 39 |
| 30 | O | 1103 | −20 | 2 | 4 | 723 | 1.7 | 45 | 875 | 29 |

| Sample No. | Si internal oxidation layer of steel sheet | | | | | | Appearance | Plating adhesion | Remarks |
| | State | Thickness (μm) | Composition | Average content (%) | Presence of FeO | (Fe,Mn)SiO3, (Fe,Mn):SiO4 presence/position | $SiO_2$ presence position | | | |
|---|---|---|---|---|---|---|---|---|---|---|
| 1 | Good | 1 | Good | 1.8 | Good | Good | Good | 4 | Good | Inv. ex. |
| 2 | Good | 0.6 | Good | 1.1 | Good | Good | Good | 4 | Good | " |
| 3 | Good | 0.6 | Good | 1.1 | Good | Good | Good | 4 | Good | " |
| 4 | Good | 0.6 | Good | 1.1 | Good | Good | Good | 4 | Good | " |
| 5 | Good | 0.6 | Good | 1.1 | Good | Good | Good | 4 | Good | " |
| 6 | Good | 1 | Good | 1.7 | Good | Good | Good | 4 | Good | " |
| 7 | Good | 1 | Good | 1.7 | Good | Good | Good | 4 | Good | " |
| 8 | Good | 1 | Good | 1.7 | Good | Good | Good | 4 | Good | " |
| 9 | Good | 1 | Good | 1.8 | Good | Good | Good | 4 | Good | " |
| 10 | Good | 1 | Good | 1.8 | Good | Good | Good | 4 | Good | " |
| 11 | Good | 1.5 | Good | 2.8 | Good | Good | Good | 4 | Good | " |
| 12 | Good | 1.5 | Good | 2.8 | Good | Good | Good | 4 | Good | " |
| 13 | Good | 1.5 | Good | 2.8 | Good | Good | Good | 4 | Good | " |
| 14 | Good | 1.5 | Good | 2.8 | Good | Good | Good | 4 | Good | " |
| 15 | Good | 1.5 | Good | 2.8 | Good | Good | Good | 4 | Good | " |
| 16 | Good | 2.2 | Good | 4 | Good | Good | Good | 4 | Good | " |
| 17 | Good | 1 | Good | 1.7 | Good | Good | Good | 4 | Good | " |
| 18 | Good | 1 | Good | 1.3 | Good | Good | Good | 4 | Good | " |
| 19 | Good | 0.6 | Good | 0.9 | Good | Good | Good | 4 | Good | " |
| 20 | Good | 1.2 | Good | 2.1 | Good | Good | Good | 4 | Good | " |
| 21 | Good | 1.2 | Good | 2.1 | Good | Good | Good | 4 | Good | " |
| 22 | Good | 1.2 | Good | 2.1 | Good | Good | Good | 4 | Good | " |
| 23 | Good | 1.2 | Good | 2.1 | Good | Good | Good | 4 | Good | " |
| 24 | Good | 1.5 | Good | 2.3 | Good | Good | Good | 4 | Good | " |
| 25 | Good | 2.7 | Good | 4.5 | Good | Good | Good | 4 | Good | " |
| 26 | Good | 2.7 | Good | 4.5 | Good | Good | Good | 4 | Good | " |
| 27 | Good | 2.7 | Good | 4.5 | Good | Good | Good | 4 | Good | " |
| 28 | Good | 2.5 | Good | 4.4 | Good | Good | Good | 4 | Good | " |
| 29 | Good | 1.5 | Good | 2.8 | Good | Good | Good | 4 | Good | " |
| 30 | Good | 2.7 | Good | 4.5 | Good | Good | Good | 4 | Good | " |

Example 8

A slab of each composition of Table 12 was heated to 1423K and hot rolled at a final temperature of 1183 to 1203K to obtain a 4.5 mm hot rolled sheet which was then coiled at 853 to 953K. This was pickled, then cold rolled to obtain a 1.6 mm cold rolled steel strip, then run using an in-line annealing type continuous hot dip galvanization facility under the conditions shown in Table 13 to produce hot dip galvanized steel sheet. The continuous hot dip galvanization facility used was one heating the sheet by a nonoxidizing furnace, then reducing and annealing it in a reduction zone. The nonoxidizing furnace was adjusted to a combustion air ratio of 1.0 for use as an oxidation zone. The reduction zone was provided with a device for burning a mixed gas of CO and $H_2$ and introducing the $H_2O$ and $CO_2$ produced into $N_2$ gas containing 10 vol % of $H_2$.

The sheet was annealed while adjusted to give the value shown in Table 13, was soaked at the soaking temperature (range from maximum peak temperature–20 degrees to maximum peak temperature) for a soaking time of 60 seconds, then was cooled from the maximum peak temperature to 923K by an average cooling rate of 1 degree/second, then from 923K to 773K by an average cooling rate of 4 degree/second and further cooled from 773K by an average cooling rate of 1.7 degree/second or more down to 723K and was held at 723K until the plating bath, was conveyed from 773K to the plating bath in 30 seconds, then was hot dip plated in a Zn—Al plating bath of a bath temperature of 723K for 3 seconds, was wiped by $N_2$ to adjust the amount of deposition of the plating, then was cooled to 623K over 20 seconds. The composition of the plating layer of each obtained plated steel sheet was as shown in Table 13 and Table 14 (Table 13 continuation).

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

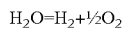

$$H_2O = H_2 + \tfrac{1}{2}O_2$$

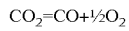

$$CO_2 = CO + \tfrac{1}{2}O_2$$

The tensile strength (TS) and elongation (El) were found by cutting out a JIS No. 5 test piece from the steel sheet and running a tensile test at ordinary temperature.

The amount of deposition of the plating was measured by dissolving the plating in hydrochloric acid containing an inhibitor then using the weight method for measurement.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the weight.

The presence of FeO was determined by measurement by XRD from the steel sheet surface. Sheets where no diffraction peak of FeO was observed were evaluated as Good, while ones where that diffraction peak was observed were evaluated as Poor The positions of $(Fe, Mn)SiO_3$, $(Fe, Mn)_2SiO_4$, and $SiO_2$ were evaluated by the following criteria by observation of oxides containing Si from the cross-section of an embedded and polished plating steel sheet by a CMA image:

Positions of $(Fe, Mn)SiO_3$ and $(Fe, Mn)_2SiO_4$

Good: Sheets with oxides where Fe or Mn and Si, O are observed at same positions observed at steel sheet surface Poor: Sheets with oxides where Fe or Mn and Si, O are observed at same positions not observed Position of $SiO_2$ Good: Sheets with oxides where Si and O are observed at same positions observed in steel sheet further inside from oxides where Fe or Mn and Si, O are observed at same positions Fair: Sheets with oxides where Si and O are observed at same positions observed at inside of steel sheet Poor: Sheets with oxides where Si and O are observed at same positions not observed inside steel sheet The Fe—Zn-based intermetallic compounds present in the plating layer were evaluated by embedding a cross-section of the plated steel sheet in a direction perpendicular to the rolling to a depth of 2 cm, polishing it, then observing the cross-section by an SEM image. The grain size of the Fe—Zn-based intermetallic compounds was the average of the measured long axis and short axis of the observed crystal. The average grain size was the average of the values of 4 to 10 crystals selected from the observed crystals with large grain sizes. For the observed sheets of the inventions this time, four or more crystals were examined in each case.

The plating appearance was judged by visually observing the entire length of the run coil and scoring the non-plating area percentage as follows. Scores of 3 or more were deemed passing.

4: non-plating area percentage less than 1%
3: non-plating area percentage 1% to 5%
2: non-plating area percentage 5% to less than 10%
1: non-plating area percentage 10% or more The powdering property was evaluated by attaching tape to the plated steel sheet, then bending the sheet by 180 degrees, bending it back, removing the tape, and deeming the width of the plating adhered to the tape as the peeled width. Sheets with a peeled width of 3 mm or less were evaluated as Good, while those with a peeled width of over 3 mm were evaluated as Poor.

The plating adhesion was evaluated by attaching adhesive tape to the hot dip plated steel sheet after the Dupont impact test, then peeling it off. Sheets with no plating peeled off were evaluated as Good, while sheets with plating peeled off were evaluated as Poor. The Dupont test was performed using an impact head with ½ inch roundness at its front end and dropping a weight of 3 kg from a height of 1 m.

The results of the evaluation are shown in Table 13 and Table 14 (Table 13 continuation). Nos. 3, 6, 9, 12, 17, 20, 23, 26, 29, 33, 35, 38, 41, 45, and 48 had furnace log $PO_2$ outside the range of the present invention, so Si oxides concentrated at the steel sheet surface resulting in non-plating and a drop in plating adhesion leading to judgment of failure of the samples. Nos. 2, 5, 8, 11, 18, 21, 24, 27, 30, 32, 36, 39, 42, 44, and 47 had furnace log $PO_2$ outside the range of the present invention, so the oxides of Fe at the steel sheet surface could not be reduced resulting in non-plating and a drop in plating adhesion leading to judgment of failure of the samples. The other steel sheets prepared by the method of the present invention were high strength hot dip galvanized steel sheet excellent in plateability and adhesion.

TABLE 12

| Symbol | C | Si | Mn | P | S | Al | N | Ni | Cu |
|---|---|---|---|---|---|---|---|---|---|
| A | 0.02 | 0.73 | 1.87 | 0.006 | 0.004 | 0.045 | 0.0023 | | |
| B | 0.07 | 0.43 | 2.18 | 0.011 | 0.002 | 0.035 | 0.0028 | | |
| C | 0.07 | 0.66 | 1.55 | 0.006 | 0.003 | 0.283 | 0.0026 | | |
| D | 0.07 | 0.71 | 2.08 | 0.004 | 0.002 | 0.031 | 0.0030 | | |
| E | 0.07 | 1.14 | 1.95 | 0.007 | 0.003 | 0.037 | 0.0027 | | |
| F | 0.08 | 1.65 | 1.80 | 0.008 | 0.003 | 0.027 | 0.0035 | | |
| G | 0.10 | 0.69 | 2.32 | 0.009 | 0.004 | 0.044 | 0.0033 | | |
| H | 0.14 | 0.50 | 1.61 | 0.013 | 0.005 | 0.038 | 0.0042 | | |
| I | 0.13 | 0.36 | 2.11 | 0.011 | 0.003 | 0.026 | 0.0036 | | |
| J | 0.14 | 0.82 | 2.27 | 0.008 | 0.002 | 0.054 | 0.0034 | | |
| K | 0.18 | 0.94 | 2.77 | 0.018 | 0.004 | 0.037 | 0.0039 | | |
| L | 0.08 | 1.83 | 2.35 | 0.004 | 0.005 | 0.063 | 0.0030 | | |
| M | 0.09 | 1.78 | 1.13 | 0.008 | 0.001 | 0.29 | 0.0027 | | |
| N | 0.07 | 1.14 | 1.95 | 0.007 | 0.003 | 0.037 | 0.0027 | 0.5 | 0.1 |
| O | 0.08 | 1.83 | 2.35 | 0.004 | 0.005 | 0.063 | 0.0030 | 1.5 | |

TABLE 13

| Sample No. | Steel sheet symbol | Maximum peak temperature T (K) | $-0.000034T^2 + 0.105T - 0.2[Si\%]^2 + 2.1[Si\%] - 98.8$ | Reduction zone logPO2 | $-0.000038T^2 + 0.107T - 90.4$ | Tensile strength (MPa) | Elongation (%) | Hot dip galvanized steel sheet Plating Al % | Plating Fe % | Plating deposition (g/m2) |
|---|---|---|---|---|---|---|---|---|---|---|
| 1 | A | 1073 | −23.9 | −21 | −19.3 | 422 | 40 | 0.4 | 0.5 | 100 |
| 2 | A | 1053 | −24.5 | −19 | −19.9 | 418 | 40 | 0.27 | 0.07 | 100 |
| 3 | A | 1063 | −24.2 | −25 | −19.6 | 420 | 40 | 0.27 | 0.07 | 100 |
| 4 | B | 1033 | −25.8 | −20 | −20.4 | 602 | 37 | 0.4 | 0.5 | 100 |
| 5 | B | 1043 | −25.4 | −19 | −20.1 | 598 | 37 | 0.27 | 0.07 | 100 |
| 6 | B | 1063 | −24.7 | −25 | −19.6 | 609 | 37 | 0.27 | 0.07 | 100 |
| 7 | C | 1053 | −24.6 | −20 | −19.9 | 548 | 40 | 0.4 | 0.5 | 100 |
| 8 | C | 1063 | −24.3 | −19 | −19.6 | 543 | 40 | 0.27 | 0.07 | 100 |
| 9 | C | 1083 | −23.7 | −24 | −19.1 | 552 | 40 | 0.27 | 0.07 | 100 |
| 10 | D | 1103 | −23.0 | −21 | −18.6 | 729 | 30 | 0.4 | 0.5 | 100 |
| 11 | D | 1103 | −23.0 | −18 | −18.6 | 738 | 30 | 0.27 | 0.07 | 100 |
| 12 | D | 1083 | −23.6 | −24 | −19.1 | 733 | 30 | 0.27 | 0.07 | 100 |
| 13 | E | 1093 | −22.5 | −22 | −18.8 | 621 | 38 | 0.4 | 0.5 | 100 |
| 14 | E | 1103 | −22.2 | −21 | −18.6 | 618 | 38 | 0.4 | 0.5 | 100 |
| 15 | E | 1113 | −21.9 | −20 | −18.4 | 614 | 38 | 0.4 | 0.5 | 100 |
| 16 | E | 1123 | −21.6 | −19 | −18.2 | 623 | 38 | 0.4 | 0.5 | 100 |
| 17 | E | 1093 | −22.5 | −23 | −18.8 | 627 | 38 | 0.27 | 0.07 | 100 |
| 18 | E | 1123 | −21.6 | −18 | −18.2 | 610 | 38 | 0.27 | 0.07 | 100 |
| 19 | F | 1073 | −22.4 | −21 | −19.3 | 624 | 37 | 0.4 | 0.5 | 100 |
| 20 | F | 1083 | −22.0 | −23 | −19.1 | 617 | 37 | 0.27 | 0.07 | 100 |
| 21 | F | 1103 | −21.4 | −18 | −18.6 | 620 | 37 | 0.27 | 0.07 | 100 |
| 22 | G | 1043 | −24.9 | −21 | −20.1 | 781 | 31 | 0.4 | 0.5 | 100 |
| 23 | G | 1053 | −24.6 | −19 | −19.9 | 785 | 31 | 0.27 | 0.07 | 100 |
| 24 | G | 1073 | −23.9 | −24 | −19.3 | 787 | 31 | 0.27 | 0.07 | 100 |
| 25 | H | 1063 | −24.6 | −20 | −19.6 | 633 | 28 | 0.4 | 0.5 | 100 |
| 26 | H | 1083 | −24.0 | −18 | −19.1 | 631 | 28 | 0.27 | 0.07 | 100 |
| 27 | H | 1053 | −24.9 | −25 | −19.9 | 639 | 28 | 0.27 | 0.07 | 100 |
| 28 | I | 1043 | −25.5 | −21 | −20.1 | 685 | 24 | 0.4 | 0.5 | 100 |
| 29 | I | 1063 | −24.9 | −19 | −19.6 | 672 | 24 | 0.27 | 0.07 | 100 |
| 30 | I | 1033 | −25.9 | −26 | −20.4 | 669 | 24 | 0.27 | 0.07 | 100 |
| 31 | J | 1043 | −24.7 | −21 | −20.1 | 832 | 29 | 0.4 | 0.5 | 100 |
| 32 | J | 1093 | −23.1 | −18 | −18.8 | 819 | 29 | 0.27 | 0.07 | 100 |
| 33 | J | 1053 | −24.3 | −25 | −19.9 | 825 | 29 | 0.27 | 0.07 | 100 |
| 34 | K | 1043 | −24.5 | −21 | −20.1 | 1125 | 10 | 0.4 | 0.5 | 100 |
| 35 | K | 1053 | −24.1 | −25 | −19.9 | 1121 | 10 | 0.27 | 0.07 | 100 |
| 36 | K | 1073 | −23.5 | −20 | −19.3 | 1117 | 10 | 0.27 | 0.07 | 100 |
| 37 | L | 1103 | −21.2 | −19 | −−18.6 | 879 | 29 | 0.4 | 0.5 | 100 |
| 38 | L | 1113 | −20.9 | −21 | −18.4 | 884 | 29 | 0.27 | 0.07 | 100 |
| 39 | L | 1093 | −21.5 | −18 | −18.8 | 892 | 29 | 0.27 | 0.07 | 100 |
| 40 | M | 1103 | −21.2 | −20 | −18.6 | 784 | 29 | 0.4 | 0.5 | 100 |
| 41 | M | 1113 | −20.9 | −22 | −18.4 | 780 | 29 | 0.27 | 0.07 | 100 |
| 42 | M | 1093 | −21.5 | −18 | −18.8 | 786 | 29 | 0.27 | 0.07 | 100 |
| 43 | N | 1073 | −23.1 | −20 | −19.3 | 612 | 39 | 0.4 | 0.5 | 100 |
| 44 | N | 1093 | −22.5 | −18 | −18.8 | 627 | 39 | 0.27 | 0.07 | 100 |
| 45 | N | 1123 | −21.6 | −22 | −18.2 | 618 | 39 | 0.27 | 0.07 | 100 |
| 46 | O | 1103 | −21.2 | −20 | −18.6 | 881 | 29 | 0.4 | 0.5 | 100 |
| 47 | O | 1113 | −20.9 | −18 | −18.4 | 876 | 29 | 0.27 | 0.07 | 100 |
| 48 | O | 1093 | −21.5 | −22 | −18.8 | 880 | 29 | 0.27 | 0.07 | 100 |

TABLE 14

(Table 13 continuation)

| | | Si internal oxide layer of steel sheet | | | | | Average grain size of inter-metallic compounds (μm) | Non-plating score | Powdering | Plating adhesion | Remarks |
|---|---|---|---|---|---|---|---|---|---|---|---|
| Sample No. | Condition | Thickness (μm) | Composition | Average content (%) | FeO presence | (Fe,Mn)SiO3, (Fe,Mn)2SiO4 presence/position | SiO2 position | | | | |
| 1 | Good | 2.9 | Good | 2.7 | Good | Good | Good | 1.1 | 4 | Good | Good | Inv. ex. |
| 2 | Poor | — | — | — | Poor | Poor | Poor | 0 | 2 | Poor | Poor | Comp. ex. |
| 3 | Poor | — | — | — | Good | Poor | Poor | 0 | 1 | Good | Poor | " |
| 4 | Good | 2.7 | Good | 0.9 | Good | Good | Good | 0.6 | 4 | Good | Good | Inv. ex. |
| 5 | Poor | — | — | — | Poor | Poor | Poor | 0 | 2 | Poor | Poor | Comp. ex. |
| 6 | Poor | — | — | — | Good | Poor | Poor | 0 | 1 | Good | Poor | " |
| 7 | Good | 3.2 | Good | 2.1 | Good | Good | Good | 0.8 | 4 | Good | Good | Inv. ex. |
| 8 | Poor | — | — | — | Poor | Poor | Poor | 0 | 2 | Poor | Poor | Comp. ex. |
| 9 | Poor | — | — | — | Good | Poor | Poor | 0 | 1 | Good | Poor | " |
| 10 | Good | 2.5 | Good | 2.9 | Good | Good | Good | 1 | 4 | Good | Good | Inv. ex. |
| 11 | Poor | — | — | — | Poor | Poor | Poor | 0 | 2 | Poor | Poor | Comp. ex. |
| 12 | Poor | — | — | — | Good | Poor | Poor | 0 | 1 | Good | Poor | " |
| 13 | Good | 0.9 | Good | 2.4 | Good | Good | Good | 1.8 | 4 | Good | Good | Inv. ex. |
| 14 | Good | 2.4 | Good | 3.2 | Good | Good | Good | 2 | 4 | Good | Good | " |
| 15 | Good | 3.1 | Good | 3.8 | Good | Good | Good | 1.9 | 4 | Good | Good | " |
| 16 | Good | 4.2 | Good | 4.6 | Good | Good | Good | 1.7 | 4 | Good | Good | " |
| 17 | Poor | — | — | — | Good | Poor | Poor | 0 | 1 | Good | Poor | Comp. ex. |
| 18 | Poor | — | — | — | Poor | Poor | Poor | 0 | 2 | Poor | Poor | " |
| 19 | Good | 3.8 | Good | 4 | Good | Good | Good | 2.5 | 4 | Good | Good | Inv. ex. |
| 20 | Poor | — | — | — | Good | Poor | Poor | 0 | 1 | Good | Poor | Comp. ex. |
| 21 | Poor | — | — | — | Poor | Poor | Poor | 0 | 2 | Poor | Poor | " |
| 22 | Good | 3 | Good | 1.7 | Good | Good | Good | 0.9 | 4 | Good | Good | Inv. ex. |
| 23 | Poor | — | — | — | Good | Poor | Poor | 0 | 1 | Good | Poor | Comp. ex. |
| 24 | Poor | — | — | — | Poor | Poor | Poor | 0 | 2 | Poor | Poor | " |
| 25 | Good | 2.3 | Good | 1.3 | Good | Good | Good | 0.7 | 4 | Good | Good | Inv. ex. |
| 26 | Poor | — | — | — | Good | Poor | Poor | 0 | 1 | Good | Poor | Comp. ex. |
| 27 | Poor | — | — | — | Poor | Poor | Poor | 0 | 2 | Poor | Poor | " |
| 28 | Good | 1.9 | Good | 0.8 | Good | Good | Good | 0.5 | 4 | Good | Good | Inv. ex. |
| 29 | Poor | — | — | — | Good | Poor | Poor | 0 | 1 | Good | Poor | Comp. ex. |
| 30 | Poor | — | — | — | Poor | Poor | Poor | 0 | 2 | Poor | Poor | " |
| 31 | Good | 4.1 | Good | 1.7 | Good | Good | Good | 1.2 | 4 | Good | Good | Inv. ex. |
| 32 | Poor | — | — | — | Poor | Poor | Poor | 0 | 2 | Poor | Poor | Comp. ex. |
| 33 | Poor | — | — | — | Good | Poor | Poor | 0 | 1 | Good | Poor | " |
| 34 | Good | 4.6 | Good | 3.5 | Good | Good | Good | 1.5 | 4 | Good | Good | Inv. ex. |
| 35 | Poor | — | — | — | Good | Poor | Poor | 0 | 1 | Good | Poor | Comp. ex. |
| 36 | Poor | — | — | — | Poor | Poor | Poor | 0 | 2 | Poor | Poor | " |
| 37 | Good | 5 | Good | 8.3 | Good | Good | Good | 2.8 | 4 | Good | Good | Inv. ex. |
| 38 | Poor | — | — | — | Good | Poor | Poor | 0 | 1 | Good | Poor | Comp. ex. |
| 39 | Poor | — | — | — | Poor | Poor | Poor | 0 | 2 | Poor | Poor | " |
| 40 | Good | 4.4 | Good | 5.9 | Good | Good | Good | 2.7 | 4 | Good | Good | Inv. ex. |
| 41 | Poor | — | — | — | Good | Poor | Poor | 0 | 1 | Good | Poor | Comp. ex. |
| 42 | Poor | — | — | — | Poor | Poor | Poor | 0 | 2 | Poor | Poor | " |
| 43 | Good | 3.9 | Good | 4.2 | Good | Good | Good | 2 | 4 | Good | Good | Inv. ex. |
| 44 | Poor | — | — | — | Poor | Poor | Poor | 0 | 2 | Poor | Poor | Comp. ex. |
| 45 | Poor | — | — | — | Good | Poor | Poor | 0 | 1 | Good | Poor | " |
| 46 | Good | 4.8 | Good | 7.1 | Good | Good | Good | 2.9 | 4 | Good | Good | Inv. ex. |
| 47 | Poor | — | — | — | Poor | Poor | Poor | 0 | 2 | Poor | Poor | Comp. ex. |
| 48 | Poor | — | — | — | Good | Poor | Poor | 0 | 1 | Good | Poor | " |

Example 9

A slab of each of the compositions of Table 12 was heated to 1423K and hot rolled at a final temperature of 1183 to 1203K to obtain a 4.5 mm hot rolled sheet which was then coiled at 853 to 953K. This was pickled, then cold rolled to obtain a 1.6 mm cold rolled steel strip, then plated using an in-line annealing type continuous hot dip galvanization facility under the conditions shown in Table 15 to produce hot dip galvanized steel sheet. The continuous hot dip galvanization facility used was one heating the sheet by a nonoxidizing furnace, then reducing and annealing it in a reduction zone. The nonoxidizing furnace was adjusted to a combustion air ratio of 1.0 for use as an oxidation zone. The reduction zone was provided with a device for burning a mixed gas of CO and $H_2$ and introducing the $H_2O$ and $CO_2$ produced into $N_2$ gas containing 10 vol % of $H_2$. The log $PO_2$ of the oxygen potential in the furnace was adjusted to give the value shown in Table 15.

The sheet was annealed while adjusted to give the value shown in Table 3, soaked at the soaking temperature (range from maximum peak temperature−20 degrees to maximum peak temperature) for a soaking time of 60 seconds, then was cooled from the maximum peak temperature to 923K by an average cooling rate of 1 degree/second, then from 923K to 773K by an average cooling rate of 4 degree/second and further cooled from 773K by an average cooling rate of 1.7 degree/second or more down to 723K and was held at 723K until the plating bath, was conveyed from 773K to the plating bath in 30 seconds, then was hot dip plated in a Zn—Al plating bath for 3 seconds, was wiped by $N_2$ to adjust the amount of deposition of the plating, then was cooled to 623K over 20 seconds. The composition of the plating layer of each obtained plated steel sheet was as shown in Table 15 and Table 16 (Table 15 continuation).

The $PO_2$ in the reducing furnace was found using the furnace hydrogen concentration, water vapor concentration, $CO_2$ concentration, and CO concentration, the measured value of the atmosphere temperature, and the equilibrium constants $K_1$ and $K_2$ of the equilibrium reactions:

$$H_2O = H_2 + \tfrac{1}{2}O_2$$

$$CO_2 = CO + \tfrac{1}{2}O_2$$

The tensile strength (TS) and elongation (El) were found by cutting out a JIS No. 5 test piece from the steel sheet and running a tensile test at ordinary temperature. The amount of deposition of the plating was measured by dissolving the plating in hydrochloric acid containing an inhibitor then using the weight method for measurement. The composition of the plating layer was determined by dissolving the plating in hydrochloric acid containing an inhibitor and measuring it by chemical analysis.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the weight.

The presence of FeO was determined by measurement by XRD from the steel sheet surface. Sheets where no diffraction peak of FeO was observed were evaluated as Good, while ones where that diffraction peak was observed were evaluated as Poor The positions of $(Fe, Mn)SiO_3$, $(Fe, Mn)_2SiO_4$, and $SiO_2$ were evaluated by the following criteria by observation of oxides containing Si from the cross-section of an embedded and polished plating steel sheet by a CMA image:

Positions of $(Fe, Mn)SiO_3$ and $(Fe, Mn)_2SiO_4$

Good: Sheets with oxides where Fe or Mn and Si, O are observed at same positions observed at steel sheet surface Poor: Sheets with oxides where Fe or Mn and Si, O are observed at same positions not observed Position of $SiO_2$ Good: Sheets with oxides where Si and O are observed at same positions observed in steel sheet further inside from oxides where Fe or Mn and Si, O are observed at same positions Fair: Sheets with oxides where Si and O are observed at same positions observed at inside of steel sheet Poor: Sheets with oxides where Si and O are observed at same positions not observed inside steel sheet The Fe—Zn-based intermetallic compounds present in the plating layer were evaluated by embedding a cross-section of the plated steel sheet in a direction perpendicular to the rolling to a depth of 2 cm, polishing it, then observing the cross-section by an SEM image. The grain size of the Fe—Zn-based intermetallic compounds was the average of the measured long axis and short axis of the observed crystal. The average grain size was the average of the values of 4 to 10 crystals selected from the observed crystals with large grain sizes. For the observed sheets of the inventions this time, four or more crystals were examined in each case. Further, in the comparative example of No. 11, no Fe—Zn-based intermetallic compounds were observed, but thick Fe—Al-based intermetallic compounds were observed.

The plating appearance was judged by visually observing the entire length of the run coil and scoring the non-plating area percentage as follows. Scores of 3 or more were deemed passing.

4: non-plating area percentage less than 1%
3: non-plating area percentage 1% to 5%
2: non-plating area percentage 5% to less than 10%
1: non-plating area percentage 10% or more The plating adhesion was evaluated by attaching adhesive tape to the hot dip plated steel sheet after the Dupont impact test, then peeling it off. Sheets with no plating peeled off were evaluated as Good, while sheets with plating peeled off were evaluated as Poor. The Dupont test was performed using an impact head with ½ inch roundness at its front end and dropping a weight of 3 kg from a height of 1 m.

The results of the evaluation are shown in Table 15 and Table 16 (Table 15 continuation). No. 1 had an Al concentration in the plating layer outside the range of the present invention, so the Zn—Fe alloying reaction proceeded too far, a brittle alloy layer developed at the base iron interface, and the plating adhesion dropped leading to judgment of failure of the sample. No. 11 had an Al concentration in the plating layer outside the range of the present invention, so the Fe—Al alloying reaction proceeded too far and the plating adhesion dropped leading to judgment of failure of the sample. The other steel sheets prepared by the method of the present invention were high strength hot dip galvanized steel sheet excellent in plateability and adhesion.

TABLE 15

| Sample No. | Steel sheet symbol | Maximum peak temperature T (K) | $[Si\%]^2 + 2.1[Si\%] - 98.8$ | Reduction zone $\log PO_2$ | $-0.00038T^2 + 0.107T - 90.4$ | Tensile strength (MPa) | Elongation (%) | Hot dip galvanized steel sheet | | Plating deposition (g/m2) |
|---|---|---|---|---|---|---|---|---|---|---|
| | | | | | | | | Plating Al % | Plating Fe % | |
| 1 | E | 1113 | −21.9 | −20 | −18.4 | 622 | 38 | 0.02 | 2.8 | 140 |
| 2 | E | 1113 | −21.9 | −20 | −18.4 | 608 | 38 | 0.05 | 2.4 | 140 |
| 3 | E | 1113 | −21.9 | −20 | −18.4 | 619 | 38 | 0.1 | 1.7 | 140 |
| 4 | E | 1113 | −21.9 | −20 | −18.4 | 610 | 38 | 0.2 | 1 | 140 |
| 5 | E | 1113 | −21.9 | −20 | −18.4 | 621 | 38 | 0.4 | 0.5 | 140 |

TABLE 15-continued

| Sample No. | Steel sheet symbol | Maximum peak temperature T (K) | $[Si\%]^2 + 2.1[Si\%] - 98.8$ | Reduction zone logPO2 | $-0.00038T^2 + 0.107T - 90.4$ | Tensile strength (MPa) | Elongation (%) | Hot dip galvanized steel sheet Plating Al % | Plating Fe % | Plating deposition (g/m2) |
|---|---|---|---|---|---|---|---|---|---|---|
| 6 | E | 1113 | −21.9 | −20 | −18.4 | 614 | 38 | 0.7 | 0.1 | 140 |
| 7 | E | 1113 | −21.9 | −20 | −18.4 | 624 | 38 | 1 | 0.05 | 140 |
| 8 | E | 1113 | −21.9 | −20 | −18.4 | 618 | 38 | 4 | 0.07 | 140 |
| 9 | E | 1113 | −21.9 | −20 | −18.4 | 606 | 38 | 5 | 0.1 | 140 |
| 10 | E | 1113 | −21.9 | −20 | −18.4 | 620 | 38 | 10 | 0.4 | 140 |
| 11 | E | 1113 | −21.9 | −20 | −18.4 | 609 | 38 | 11 | 0.6 | 140 |
| 12 | D | 1103 | −23.0 | −21 | −18.6 | 728 | 30 | 0.1 | 1.7 | 140 |
| 13 | D | 1103 | −23.0 | −21 | −18.6 | 725 | 30 | 0.2 | 1 | 140 |
| 14 | D | 1103 | −23.0 | −21 | −18.6 | 731 | 30 | 0.4 | 0.5 | 140 |
| 15 | D | 1103 | −23.0 | −21 | −18.6 | 729 | 30 | 1 | 0.05 | 140 |
| 16 | D | 1103 | −23.0 | −21 | −18.6 | 732 | 30 | 5 | 0.1 | 140 |
| 17 | J | 1043 | −24.7 | −21 | −20.1 | 832 | 29 | 0.1 | 1.7 | 140 |
| 18 | J | 1043 | −24.7 | −21 | −20.1 | 835 | 29 | 0.2 | 1 | 140 |
| 19 | J | 1043 | −24.7 | −21 | −20.1 | 829 | 29 | 0.4 | 0.5 | 140 |
| 20 | J | 1043 | −24.7 | −21 | −20.1 | 827 | 29 | 1 | 0.05 | 140 |
| 21 | J | 1043 | −24.7 | −21 | −20.1 | 830 | 29 | 5 | 0.1 | 140 |
| 22 | L | 1103 | −21.2 | −19 | −18.6 | 879 | 29 | 0.1 | 1.7 | 140 |
| 23 | L | 1103 | −21.2 | −19 | −18.6 | 881 | 29 | 0.2 | 1 | 140 |
| 24 | L | 1103 | −21.2 | −19 | −18.6 | 878 | 29 | 0.4 | 0.5 | 140 |
| 25 | L | 1103 | −21.2 | −19 | −18.6 | 883 | 29 | 1 | 0.05 | 140 |
| 26 | L | 1103 | −21.2 | −19 | −18.6 | 877 | 29 | 5 | 0.1 | 140 |

TABLE 16

(Table 15 continuation)

| Sample No. | Si internal oxide layer of steel sheet State | Thickness (μm) | Composition | Average content (%) | Presence of FeO | (Fe,Mn)SiO3, (Fe,Mn)2SiO4 presence/position | SiO2 presence position | Average grain size of inter-metallic compounds (μm) | Non-plating score | Plating adhesion | Remarks |
|---|---|---|---|---|---|---|---|---|---|---|---|
| 1 | Good | 3.1 | Good | 3.8 | Good | Good | Good | 5 | 4 | Poor | Comp. ex. |
| 2 | Good | 3.5 | Good | 4.0 | Good | Good | Good | 3 | 4 | Good | Inv. ex. |
| 3 | Good | 3.0 | Good | 3.6 | Good | Good | Good | 2 | 4 | Good | " |
| 4 | Good | 3.4 | Good | 3.9 | Good | Good | Good | 1.5 | 4 | Good | " |
| 5 | Good | 2.9 | Good | 3.7 | Good | Good | Good | 1 | 4 | Good | " |
| 6 | Good | 3.3 | Good | 3.8 | Good | Good | Good | 0.8 | 4 | Good | " |
| 7 | Good | 2.8 | Good | 3.9 | Good | Good | Good | 0.5 | 4 | Good | " |
| 8 | Good | 3.2 | Good | 3.7 | Good | Good | Good | 0.6 | 4 | Good | " |
| 9 | Good | 2.7 | Good | 4.0 | Good | Good | Good | 0.7 | 4 | Good | " |
| 10 | Good | 3.3 | Good | 3.6 | Good | Good | Good | 0.5 | 4 | Good | " |
| 11 | Good | 3.1 | Good | 3.9 | Good | Good | Good | 0 | 4 | Poor | Comp. ex. |
| 12 | Good | 2.5 | Good | 2.9 | Good | Good | Good | 1.8 | 4 | Good | Inv. ex. |
| 13 | Good | 2.4 | Good | 3.1 | Good | Good | Good | 1.3 | 4 | Good | " |
| 14 | Good | 2.7 | Good | 3.0 | Good | Good | Good | 0.7 | 4 | Good | " |
| 15 | Good | 2.5 | Good | 2.8 | Good | Good | Good | 0.5 | 4 | Good | " |
| 16 | Good | 2.6 | Good | 2.9 | Good | Good | Good | 0.5 | 4 | Good | " |
| 17 | Good | 4.1 | Good | 1.7 | Good | Good | Good | 1.8 | 4 | Good | " |
| 18 | Good | 4.2 | Good | 1.6 | Good | Good | Good | 1.3 | 4 | Good | " |
| 19 | Good | 4.0 | Good | 1.7 | Good | Good | Good | 0.7 | 4 | Good | " |
| 20 | Good | 3.9 | Good | 1.7 | Good | Good | Good | 0.5 | 4 | Good | " |
| 21 | Good | 3.8 | Good | 1.6 | Good | Good | Good | 0.5 | 4 | Good | " |
| 22 | Good | 5.0 | Good | 8.3 | Good | Good | Good | 2.2 | 4 | Good | " |
| 23 | Good | 4.9 | Good | 8.0 | Good | Good | Good | 1.6 | 4 | Good | " |
| 24 | Good | 5.2 | Good | 8.4 | Good | Good | Good | 0.9 | 4 | Good | " |
| 25 | Good | 5.1 | Good | 8.2 | Good | Good | Good | 0.6 | 4 | Good | " |
| 26 | Good | 4.8 | Good | 8.1 | Good | Good | Good | 0.7 | 4 | Good | " |

Example 10

A slab of each of the compositions of Table 12 was heated to 1423K and hot rolled at a final temperature of 1183 to 1203K to obtain a 4.5 mm hot rolled sheet which was then coiled at 853 to 953K. This was pickled, then cold rolled to obtain a 1.6 mm cold rolled steel strip, then plated using an in-line annealing type continuous hot dip galvanization facility under the conditions shown in Table 17 to produce hot dip galvanized steel sheet. The continuous hot dip galvanization facility used was one heating the sheet by a nonoxidizing furnace, then reducing and annealing it in a reduction zone. The nonoxidizing furnace was adjusted to a combustion air ratio of 1.0 for use as an oxidation zone. The reduction zone was provided with a device for burning a mixed gas of CO and H₂ and introducing the H₂O and CO₂ produced into N₂ gas containing 10 vol % of H₂. The log PO₂ of the oxygen potential in the furnace was adjusted to give the value shown in Table 17.

The sheet was annealed while adjusted to give the value shown in Table 17 and soaked at the soaking temperature (range from maximum peak temperature−20 degrees to maximum peak temperature) for a soaking time of 60 seconds.

The PO₂ in the reducing furnace was found using the furnace hydrogen concentration, water vapor concentration, CO₂ concentration, and CO concentration, the measured value of the atmosphere temperature, and the equilibrium constants K₁ and K₂ of the equilibrium reactions:

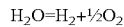

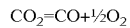

The tensile strength (TS) and elongation (El) were found by cutting out a JIS No. 5 test piece from the steel sheet and running a tensile test at ordinary temperature.

The sheet was hot dip plated in a Zn—Al plating bath for 3 seconds and wiped with N₂ to adjust the amount of deposition of plating to 100 g/m² per side. The composition of the plating layer of each obtained plated steel sheet was Al: 0.4 to 0.5% and Fe: 0.4 to 0.6%.

The oxides containing Si present at the crystal grain boundaries and in the crystal grains of the steel sheet were evaluated by observation of embedded and polished plated steel sheet by an SEM image from its cross-section. The state of the internal oxide layer was observed by an SEM image. Sheets with oxides containing Si observed at the crystal grain boundaries and in the crystal grains were evaluated as Good, while those with none observed were evaluated as Poor. The thickness of the internal oxide layer was similarly observed by an SEM image. The thickness from the interface of the steel sheet and plating layer to the part where the oxides were observed at the crystal grain boundaries and in the crystal grains was measured. The composition of the internal oxide layer was analyzed using an EDX attached to an SEM. Sheets with peaks of Si and O observed were evaluated as Good, while those with none observed were evaluated as Poor.

The content of the oxides containing Si in the steel sheet was measured by dissolving the plating in hydrochloric acid containing an inhibitor, then dissolving the layer containing the oxides containing Si in the steel sheet by an acid to separate the oxides containing Si, then measuring the weight.

The presence of FeO was determined by measurement by XRD from the steel sheet surface. Sheets where no diffraction peak of FeO was observed were evaluated as Good, while ones where that diffraction peak was observed were evaluated as Poor.

The positions of (Fe, Mn)SiO₃, (Fe, Mn)₂SiO₄, and SiO₂ were evaluated by the following criteria by observation of oxides containing Si from the cross-section of an embedded and polished plating steel sheet by a CMA image:

Positions of (Fe, Mn)SiO₃ and (Fe, Mn)₂SiO₄

Good: Sheets with oxides where Fe or Mn and Si, O are observed at same positions observed at steel sheet surface Poor: Sheets with oxides where Fe or Mn and Si, O are observed at same positions not observed Position of SiO₂

Good: Sheets with oxides where Si and O are observed at same positions observed in steel sheet further inside from oxides where Fe or Mn and Si, O are observed at same positions Fair: Sheets with oxides where Si and O are observed at same positions observed at inside of steel sheet Poor: Sheets with oxides where Si and O are observed at same positions not observed inside steel sheet The Fe—Zn-based intermetallic compounds present in the plating layer were evaluated by embedding a cross-section of the plated steel sheet in a direction perpendicular to the rolling to a depth of 2 cm, polishing it, then observing the cross-section by an SEM image. The average grain size of the Fe—Zn-based intermetallic compounds of each obtained plating steel sheet was 0.5 to 3 μm. For the observed sheets of the inventions this time, four or more crystals were examined in each case.

The plating appearance was judged by visually observing the entire length of the run coil and scoring the non-plating area percentage as follows. Scores of 3 or more were deemed passing.

4: non-plating area percentage less than 1%
3: non-plating area percentage 1% to 5%
2: non-plating area percentage 5% to less than 10%
1: non-plating area percentage 10% or more The plating adhesion was evaluated by attaching adhesive tape to the hot dip plated steel sheet after the Dupont impact test, then peeling it off. Sheets with no plating peeled off were evaluated as Good, while sheets with plating peeled off were evaluated as Poor. The Dupont test was performed using an impact head with ½ inch roundness at its front end and dropping a weight of 3 kg from a height of 1 m.

The results of the evaluation are shown in Table 17 and Table 18 (Table 17 continuation). The method of the present invention enabled high strength hot dip galvanized steel sheet excellent in plateability and adhesion to be produced.

TABLE 17

| Sample No. | Steel sheet symbol | Maximum peak temperature after annealing (K) | Reduction zone logPO2 | Average cooling rate to 923 K (°/sec) | Average cooling rate to 773 K (°/sec) | Cooling end temperature (K) | Average cooling rate to cooling end (°/sec) | Holding time from 773 K to 623 K (sec) | Tensile strength (MPa) | Elongation (%) |
|---|---|---|---|---|---|---|---|---|---|---|
| 1 | A | 1043 | −22 | 5 | 15 | 723 | 10 | 30 | 423 | 40 |
| 2 | B | 1033 | −23 | 2 | 8 | 723 | 1.7 | 45 | 597 | 37 |
| 3 | B | 1033 | −23 | 2 | 8 | 738 | 1.2 | 45 | 610 | 36 |
| 4 | B | 1033 | −23 | 2 | 8 | 713 | 2 | 45 | 595 | 37 |
| 5 | B | 993 | −23 | 2 | 8 | 723 | 1.7 | 45 | 967 | 7 |
| 6 | C | 1053 | −22 | 3 | 10 | 723 | 1.3 | 55 | 543 | 40 |
| 7 | C | 1053 | −22 | 3 | 10 | 723 | 1.3 | 55 | 522 | 37 |
| 8 | C | 1073 | −22 | 3 | 6 | 723 | 1.7 | 45 | 516 | 28 |
| 9 | D | 1043 | −22 | 1 | 6 | 723 | 1.4 | 50 | 595 | 38 |
| 10 | D | 1103 | −19 | 1 | 6 | 723 | 1.4 | 50 | 734 | 30 |
| 11 | E | 1053 | −21 | 2 | 7 | 723 | 1.7 | 45 | 600 | 39 |

TABLE 17-continued

| Sample No. | Steel sheet symbol | Maximum peak temperature after annealing (K) | Reduction zone logPO2 | Average cooling rate to 923 K (°/sec) | Average cooling rate to 773 K (°/sec) | Cooling end temperature (K) | Average cooling rate to cooling end (°/sec) | Holding time from 773 K to 623 K (sec) | Tensile strength (MPa) | Elongation (%) |
|---|---|---|---|---|---|---|---|---|---|---|
| 12 | E | 1093 | −20 | 1 | 4 | 723 | 1.7 | 45 | 611 | 38 |
| 13 | E | 1093 | −20 | 15 | 18 | 723 | 10 | 30 | 718 | 16 |
| 14 | E | 1093 | −20 | 1 | 4 | 723 | 2.5 | 40 | 604 | 31 |
| 15 | E | 1093 | −20 | 1 | 4 | 723 | 1.7 | 165 | 627 | 41 |
| 16 | F | 1073 | −20 | 2 | 4 | 723 | 1.4 | 50 | 620 | 37 |
| 17 | G | 1043 | −21 | 0.8 | 3 | 723 | 1 | 65 | 777 | 31 |
| 18 | H | 1063 | −21 | 2 | 4 | 723 | 1.7 | 45 | 627 | 28 |
| 19 | I | 1033 | −20 | 2 | 10 | 723 | 1.7 | 45 | 683 | 24 |
| 20 | J | 1043 | −22 | 3 | 12 | 723 | 1.7 | 45 | 828 | 29 |
| 21 | J | 1043 | −22 | 3 | 12 | 723 | 1.7 | 45 | 670 | 20 |
| 22 | J | 1043 | −22 | 0.3 | 15 | 723 | 1.7 | 45 | 695 | 20 |
| 23 | J | 1043 | −22 | 5 | 1 | 723 | 0.6 | 105 | 645 | 21 |
| 24 | K | 1043 | −21 | 2 | 4 | 723 | 1.7 | 45 | 1120 | 10 |
| 25 | L | 1103 | −20 | 2 | 4 | 723 | 1.7 | 45 | 875 | 29 |
| 26 | L | 1103 | −20 | 2 | 4 | 743 | 1.7 | 45 | 875 | 29 |
| 27 | L | 1103 | −20 | 2 | 4 | 738 | 1.7 | 45 | 798 | 23 |
| 28 | M | 1103 | −20 | 2 | 4 | 723 | 1.7 | 45 | 783 | 29 |
| 29 | N | 1073 | −21 | 2 | 7 | 723 | 1.7 | 45 | 600 | 39 |
| 30 | O | 1103 | −20 | 2 | 4 | 723 | 1.7 | 45 | 875 | 29 |

TABLE 18

(Table 17 continuation)

| Sample No. | Si internal oxide layer of steel sheet | | | | | | | | | |
|---|---|---|---|---|---|---|---|---|---|---|
| | State | Thickness (μm) | Composition | Average content (%) | Presence of FeO | (Fe,Mn)SiO3, (Fe,Mn):SiO4 presence/position | SiO2 presence position | Appearance | Plating adhesion | Remarks |
| 1 | Good | 1 | Good | 1.8 | Good | Good | Good | 4 | Good | Inv. ex. |
| 2 | Good | 0.6 | Good | 1.1 | Good | Good | Good | 4 | Good | " |
| 3 | Good | 0.6 | Good | 1.1 | Good | Good | Good | 4 | Good | " |
| 4 | Good | 0.6 | Good | 1.1 | Good | Good | Good | 4 | Good | " |
| 5 | Good | 0.6 | Good | 1.1 | Good | Good | Good | 4 | Good | " |
| 6 | Good | 1 | Good | 1.7 | Good | Good | Good | 4 | Good | " |
| 7 | Good | 1 | Good | 1.7 | Good | Good | Good | 4 | Good | " |
| 8 | Good | 1 | Good | 1.7 | Good | Good | Good | 4 | Good | " |
| 9 | Good | 1 | Good | 1.8 | Good | Good | Good | 4 | Good | " |
| 10 | Good | 1 | Good | 1.8 | Good | Good | Good | 4 | Good | " |
| 11 | Good | 1.5 | Good | 2.8 | Good | Good | Good | 4 | Good | " |
| 12 | Good | 1.5 | Good | 2.8 | Good | Good | Good | 4 | Good | " |
| 13 | Good | 1.5 | Good | 2.8 | Good | Good | Good | 4 | Good | " |
| 14 | Good | 1.5 | Good | 2.8 | Good | Good | Good | 4 | Good | " |
| 15 | Good | 1.5 | Good | 2.8 | Good | Good | Good | 4 | Good | " |
| 16 | Good | 2.2 | Good | 4 | Good | Good | Good | 4 | Good | " |
| 17 | Good | 1 | Good | 1.7 | Good | Good | Good | 4 | Good | " |
| 18 | Good | 1 | Good | 1.3 | Good | Good | Good | 4 | Good | " |
| 19 | Good | 0.6 | Good | 0.9 | Good | Good | Good | 4 | Good | " |
| 20 | Good | 1.2 | Good | 2.1 | Good | Good | Good | 4 | Good | " |
| 21 | Good | 1.2 | Good | 2.1 | Good | Good | Good | 4 | Good | " |
| 22 | Good | 1.2 | Good | 2.1 | Good | Good | Good | 4 | Good | " |
| 23 | Good | 1.2 | Good | 2.1 | Good | Good | Good | 4 | Good | " |
| 24 | Good | 1.5 | Good | 2.3 | Good | Good | Good | 4 | Good | " |
| 25 | Good | 2.7 | Good | 4.5 | Good | Good | Good | 4 | Good | " |
| 26 | Good | 2.7 | Good | 4.5 | Good | Good | Good | 4 | Good | " |
| 27 | Good | 2.7 | Good | 4.5 | Good | Good | Good | 4 | Good | " |
| 28 | Good | 2.5 | Good | 4.4 | Good | Good | Good | 4 | Good | " |
| 29 | Good | 1.5 | Good | 2.8 | Good | Good | Good | 4 | Good | " |
| 30 | Good | 2.7 | Good | 4.5 | Good | Good | Good | 4 | Good | " |

INDUSTRIAL APPLICABILITY

The present invention can provide high strength hot dip galvanized steel sheet and high strength galvannealed steel sheet with good plateability, shapeability, and adhesion and with excellent corrosion resistance and methods for production of the same.

The foregoing merely illustrates the exemplary principles of the present invention. Various modifications and alterations to the described embodiments will be apparent to those skilled in the art in view of the teachings herein. It will thus be appreciated that those skilled in the art will be able to devise numerous modification to the exemplary embodiments of the present invention which, although not explicitly shown or described herein, embody the principles of the invention and are thus within the spirit and scope of the invention. All publications, applications and patents cited above are incorporated herein by reference in their entireties.

DESCRIPTION OF NOTATIONS 1 plating layer
2 high strength steel sheet
3 internal oxide layer
4a oxides containing Si present in the crystal grains
4b oxides containing Si present at the crystal grain boundaries
4c Fe—Zn-based intermetallic compounds
5 oxides containing Si present in plating layer
6 high strength steel sheet
7 heating zone of annealing furnace
8 soaking zone of annealing furnace
9 cooling zone of annealing furnace
10 furnace roll
11 steel sheet advancing direction
12 zinc pot
13 hot dip zinc
14 snout
15 sink roll
16 gas wiping nozzle
17 galvannealing furnace
18 gas flow rate regulator
19 gas reducing piping
20 reducing gas flow direction
21 combustion device
22 combustion gas ping
23 combustion gas flow direction
24 fuel gas piping
25 fuel gas flow direction
26 air piping
27 air flow direction
28 combustion device installed in furnace

The invention claimed is:

1. A hot dip galvanized steel sheet excellent in shapeability and plateability, comprising
- at least one high strength steel sheet portion containing, by mass %, C: 0.05 to 0.25%, Si: 0.3 to 2.5%, Mn: 1.5 to 2.8%, P: 0.03% or less, S: 0.02% or less, Al: 0.005 to 0.5%, N: 0.0060% or less, and the balance of Fe and unavoidable impurities;
- a galvanized layer containing Al: 0.05 to 10 mass % and Fe: 0.05 to 3 mass % and the balance of Zn and unavoidable impurities on the at least one high strength steel sheet portion;
- oxides containing Si selected from at least one of $SiO_2$, $FeSiO_3$, $Fe_2SiO_4$, $MnSiO_3$, and $Mn_2SiO_4$, in an average content of 0.6 to 10 mass % at crystal grain boundaries and in crystal grains of the at least one high strength steel sheet portion of 5 μm or less from an interface between the at least one high strength steel sheet portion and the galvanized layer; and
- Fe—Zn alloy with an average grain size of 0.5 to 3 μm is created on the interface between the at least one high strength steel sheet portion and the galvanized layer and into the galvanized layer,
- wherein the oxides containing Si include at least one of $FeSiO_3$, $Fe_2SiO_4$, $MnSiO_3$, or $Mn_2SiO_4$ provided on the interface between the at least one high strength steel sheet portion and the galvanized layer, and
- wherein the oxides containing Si further include $SiO_2$ provided in the at least one high strength steel sheet portion of 5 μm or less from an interface between the at least one high strength sheet portion and the galvanized layer.

2. The hot dip galvanized steel sheet according to claim 1, wherein the at least one high strength steel sheet portion provides a relationship between a tensile strength F (MPa) and an elongation L(%) that satisfies the equation $L \geq 51 - 0.035 \times F$.

3. A hot dip galvanized steel sheet excellent in shapeability and plateability, comprising:
- at least one high strength steel sheet portion containing, by mass %, C: 0.05 to 0.25%, Si: 0.3 to 2.5%, Mn: 1.5 to 2.8%, P: 0.03% or less, S: 0.02% or less, Al: 0.005 to 0.5%, N: 0.0060% or less, and the balance of Fe and unavoidable impurities;
- a galvanized layer containing Al: 0.05 to 10 mass % and Fe: 0.05 to 3 mass % and the balance of Zn and unavoidable impurities on the at least one high strength steel sheet portion;
- oxides containing Si in an average content of 0.6 to 10 mass % at the crystal grain boundaries and in crystal grains of the at least one high strength steel sheet portion of 5 μm or less from an interface between the at least one high strength steel sheet portion and the galvanized layer; and
- Fe—Zn alloy with an average grain size of 0.5 to 3 μm created on the interface between the at least one high strength steel sheet portion and the galvanized layer and into the galvanized layer in a ratio of 1 grain/500 μm or more,
- wherein the oxides containing Si include at least one of $FeSiO_3$, $Fe_2SiO_4$, $MnSiO_3$, or $Mn_2SiO_4$ provided on the interface between the at least one high strength steel sheet portion and the galvanized layer, and
- wherein the oxides containing Si further include $SiO_2$ provided in the at least one high strength steel sheet portion of 5 μm or less from an interface between the at least one high strength sheet portion and the galvanized layer.

4. The hot dip galvanized steel sheet according to claim 3, wherein the at least one high strength steel sheet portion provides a relationship between a tensile strength F (MPa) and an elongation L(%) that satisfies the equation $L \geq 51 - 0.035 \times F$.

5. A hot dip galvanized steel sheet excellent in shapeability and plateability, comprising:
- at least one high strength steel sheet portion containing, by mass %, C: 0.05 to 0.25%, Si: 0.3 to 2.5%, Mn: 1.5 to 2.8%, P: 0.03% or less, S: 0.02% or less, Al: 0.005 to 0.5%, N: 0.0060% or less, and the balance of Fe and unavoidable impurities;
- a galvanized layer containing Al: 0.05 to 10 mass % and Mg: 0.01 to 5 mass % and the balance of Zn and unavoidable impurities on the at least one high strength steel sheet portion; and
- oxides containing Si in an average content of 0.6 to 10 mass % at the crystal grain boundaries and in the crystal grains of the at least one high strength steel sheet portion of 5 μm or less from an interface between the at least one high strength steel sheet portion and the galvanized layer,
- wherein the oxides containing Si include at least one of $FeSiO_3$, $Fe_2SiO_4$, $MnSiO_3$, or $Mn_2SiO_4$ provided on the interface between the at least one high strength steel sheet portion and the galvanized layer, and
- wherein the oxides containing Si further include $SiO_2$ provided in the at least one high strength steel sheet portion of 5 µm or less from an interface between the at least one high strength sheet portion and the galvanized layer.

6. The hot dip galvanized steel sheet according to claim 5, wherein the at least one high strength steel sheet portion provides a relationship between a tensile strength F (MPa) and an elongation L(%) that satisfies the equation L≥51−0.035×F.

7. A hot dip galvanized steel sheet excellent in shapeability and plateability, comprising:
at least one high strength steel sheet portion containing, by mass %, C: 0.05 to 0.25%, Si: 0.3 to 2.5%, Mn: 1.5 to 2.8%, P: 0.03% or less, S: 0.02% or less, Al: 0.005 to 0.5%, N: 0.0060% or less, and the balance of Fe and unavoidable impurities;
a galvanized layer containing Al: 4 to 20 mass %, Mg: 2 to 5 mass %, and Si: 0 to 0.5 mass % and the balance of Zn and unavoidable impurities on the at least one high strength steel sheet portion;
oxides containing Si in an average content of 0.6 to 10 mass % at crystal grain boundaries and in crystal grains of the at least one high strength steel sheet portion of 5 µm or less from the interface between the at least one high strength steel sheet portion and the galvanized layer,
wherein the oxides containing Si include at least one of $FeSiO_3$, $Fe_2SiO_4$, $MnSiO_3$, or $Mn_2SiO_4$ provided on the interface between the at least one high strength steel sheet portion and the galvanized layer, and
wherein the oxides containing Si further include $SiO_2$ provided in the at least one high strength steel sheet portion of 5 µm or less from an interface between the at least one high strength sheet portion and the galvanized layer.

8. The hot dip galvanized steel sheet according to claim 7, wherein the at least one high strength steel sheet portion provides a relationship between a tensile strength F (MPa) and an elongation L(%) that satisfies the equation L≥51−0.035×F.

9. A galvannealed steel sheet excellent in shapeability and plateability, comprising:
at least one high strength steel sheet portion containing, by mass %, C: 0.05 to 0.25%, Si: 0.3 to 2.5%, Mn: 1.5 to 2.8%, P: 0.03% or less, S: 0.02% or less, Al: 0.005 to 0.5%, N: 0.0060% or less, and the balance of Fe and unavoidable impurities;
a zinc alloy plating layer containing Fe and the balance of Zn and unavoidable impurities on the at least one high strength steel sheet portion;
first oxides containing Si in an average content of 0.6 to 10 mass % at crystal grain boundaries and in crystal grains of the at least one high strength steel sheet portion of 5 µm or less from an interface between the at least one high strength steel sheet portion and the plating layer; and
second oxides containing Si in an average content of 0.5 to 1.5 mass % in the plating layer,
wherein each of the first and second oxides containing Si include at least one of $FeSiO_3$, $Fe_2SiO_4$, $MnSiO_3$, or $Mn_2SiO_4$, and
wherein the first oxides containing Si include $SiO_2$.

10. The steel sheet according to claim 9, wherein the at least one high strength steel sheet portion provides a relationship between a tensile strength F (MPa) and an elongation L(%) that satisfies the equation L≥51−0.035×F.

* * * * *